United States Patent
Nagai et al.

(10) Patent No.: US 7,162,862 B2
(45) Date of Patent: Jan. 16, 2007

(54) AIR-FUEL RATIO CONTROL APPARATUS FOR INTERNAL COMBUSTION ENGINE

(75) Inventors: Toshinari Nagai, Sunto-gun (JP); Akihiro Katayama, Toyota (JP); Naoto Kato, Susono (JP); Yukio Kuroda, Susono (JP); Yasuhiro Kuze, Susono (JP); Hiroshi Sawada, Gotenba (JP); Takahiro Uchida, Susono (JP); Naoki Baba, Aichi (JP); Shinji Kojima, Aichi (JP)

(73) Assignee: Toyota Jidosha Kabushiki Kaisha, Toyoto (JP)

( * ) Notice: Subject to any disclaimer, the term of this patent is extended or adjusted under 35 U.S.C. 154(b) by 0 days.

(21) Appl. No.: 10/479,948

(22) PCT Filed: Jun. 18, 2002

(86) PCT No.: PCT/JP02/06071

§ 371 (c)(1),
(2), (4) Date: Jan. 24, 2004

(87) PCT Pub. No.: WO02/103181

PCT Pub. Date: Dec. 27, 2002

(65) Prior Publication Data

US 2004/0144079 A1   Jul. 29, 2004

(30) Foreign Application Priority Data

Jun. 18, 2001   (JP) ............................. 2001-183493

(51) Int. Cl.
*F01N 3/00*   (2006.01)

(52) U.S. Cl. .............................. 60/285; 60/276; 60/277
(58) Field of Classification Search .................. 60/276, 60/285, 299, 277
See application file for complete search history.

(56) References Cited

U.S. PATENT DOCUMENTS

| 5,357,749 | A | | 10/1994 | Ohsuga et al. | |
| 5,377,484 | A | * | 1/1995 | Shimizu ....................... | 60/276 |
| 5,595,060 | A | * | 1/1997 | Togai et al. .................. | 60/274 |
| 5,678,402 | A | * | 10/1997 | Kitagawa et al. ............. | 60/276 |
| 5,758,490 | A | * | 6/1998 | Maki et al. ................... | 60/274 |
| 5,924,281 | A | | 7/1999 | Yasui et al. | |
| 5,983,627 | A | * | 11/1999 | Asik ........................... | 60/274 |
| 6,047,542 | A | | 4/2000 | Kinugasa et al. | |
| 6,502,388 | B1 | * | 1/2003 | Takaku et al. ................ | 60/285 |

FOREIGN PATENT DOCUMENTS

DE    100 01 133 A1   12/2000

(Continued)

*Primary Examiner*—Thomas Denion
*Assistant Examiner*—Diem Tran
(74) *Attorney, Agent, or Firm*—Oliff & Berridge, PLC

(57) ABSTRACT

An air-fuel ratio control apparatus estimates, on the basis of an exhaust air-fuel ratio of exhaust gas flowing into an exhaust purifying catalyst unit disposed in an exhaust passage of an engine, an emission of at least one specific component contained in exhaust gas flowing out of the exhaust purifying catalyst unit. The air-fuel ratio control apparatus performs the estimation by use of a model, and controls the air-fuel ratio in such a manner that the estimation value reaches a target state. The model is previously determined in consideration of the mass balance of the specific component.

23 Claims, 26 Drawing Sheets

FOREIGN PATENT DOCUMENTS

| | | |
|---|---|---|
| EP | 0 799 987 A2 | 10/1997 |
| EP | 1 091 109 A2 | 4/2001 |
| EP | 1 091 110 A2 | 4/2001 |
| EP | 1 243 769 A1 | 9/2002 |
| JP | A-4-259641 | 9/1992 |
| JP | A 5-195842 | 8/1993 |
| JP | A 6-249028 | 9/1994 |
| JP | A-7-197836 | 8/1995 |
| JP | A-7-279707 | 10/1995 |
| JP | A 7-305644 | 11/1995 |
| JP | A 9-72235 | 3/1997 |
| JP | A 9-273438 | 10/1997 |
| JP | A-10-159632 | 6/1998 |
| JP | A-11-93734 | 4/1999 |
| JP | A 2000-45752 | 2/2000 |
| JP | A 2000-328992 | 11/2000 |

\* cited by examiner

AIR-FUEL RATIO CONTROL APPARATUS FOR INTERNAL COMBUSTION ENGINE

TECHNICAL FIELD

The present invention relates to an air-fuel ratio control apparatus for an internal combustion engine.

BACKGROUND ART

Conventionally, in order to purify exhaust gas from an internal combustion engine, an emission purifying catalyst unit (three-way catalyst unit) is disposed in an exhaust passage, and feedback control is performed on the basis of an air-fuel ratio detected by means of an air-fuel ratio sensor provided in the exhaust passage in such a manner that the air-fuel ratio of an air-fuel mixture supplied to an engine attains a stoichiometric air-fuel ratio (theoretical value). Thus, nitrogen oxides ($NO_x$), carbon monoxide (CO), and hydrocarbons (HC) are reduced concurrently. Accurate performance of the above-mentioned feedback control is effective for improving the degree of purification of exhaust gas from an internal combustion engine.

Moreover, in an effort to further improve the exhaust purifying performance of an emission purifying catalyst unit, studies have been conducted on a method for effectively utilizing an oxygen storing function (action) of the emission purifying catalyst unit. In this method, when a to-be-removed substance contained in exhaust gas is oxidized or reduced, oxygen stored in the emission purifying catalyst unit or the oxygen storing function of the emission purifying catalyst unit is utilized.

A control apparatus disclosed in Japanese Patent Application Laid-Open (kokai) No. H5-195842 is an apparatus designed so as to utilize such an oxygen storing function. Specifically, the apparatus is designed so as to estimate the amount of oxygen stored in the entirety of an emission purifying catalyst unit (oxygen storage amount, actual charge level of oxygen) on the basis of a product of an intake-air flow rate, an oxygen content of air, and a deviation from the lambda value 1 (stoichiometric air-fuel ratio), and to control the air-fuel ratio in such a manner that the oxygen storage amount attains a fixed target value.

However, the above-described control is adapted to maintain the oxygen storage amount at a level in the vicinity of the target value, and thus, has a problem of being unable to perform air-fuel ratio control for reducing emission of one or more specific components of exhaust gas to a desired level or less, or air-fuel ratio control for maintaining, to a level near the desired level, the oxygen storage amount stored in an upstream portion of a catalyst unit, rather than the oxygen storage amount stored in the entire catalyst unit.

In view of the foregoing, the present inventor has developed a method for estimating the emission of a specific component of exhaust gas (or a representative value representing a state of the exhaust gas) that flows out of an emission purifying catalyst unit (and that is purified by the emission purifying catalyst unit); and has found that the exhaust purifying performance of the emission purifying catalyst unit can be improved through performance of air-fuel ratio control in such a manner that the estimation value attains a target state.

DISCLOSURE OF THE INVENTION

An object of the present invention is to provide an air-fuel ratio control apparatus for an internal combustion engine, which apparatus can improve the exhaust gas purifying efficiency of an emission purifying catalyst unit by estimating the emission of a specific component of exhaust gas (or a representative value representing a state of the exhaust gas) that flows out of the emission purifying catalyst unit, and performing air-fuel ratio control on the basis of the estimated value.

An engine whose air-fuel ratio is controlled by an air-fuel ratio control apparatus of the present invention includes an exhaust purifying catalyst unit. The air-fuel ratio control apparatus comprises: estimation means for estimating, on the basis of an exhaust air-fuel ratio of exhaust gas flowing into the exhaust purifying catalyst unit, an estimation value which is an emission of a specific component contained in exhaust gas flowing out of the exhaust purifying catalyst unit or at least one representative value indicating the state of the exhaust gas flowing out of the exhaust purifying catalyst unit; target setting means for setting a target state regarding the estimating value estimated by the estimation means; and air-fuel ratio control means for controlling the air-fuel ratio of the engine in such a manner that the estimation value estimated by the estimation means reaches the target state set by the target setting means.

By virtue of the above-described configuration, the air-fuel ratio is controlled in such a manner that the estimation value which is an emission of a specific component contained in exhaust gas flowing out of the exhaust purifying catalyst unit or at least one representative value indicating the state of the flowing-out exhaust gas reaches the target state. Therefore, the exhaust purifying performance can be improved.

Further, in one embodiment of the present invention, the estimation value estimated by the estimation means is an estimation value after a predetermined period of time which indicates a predicted value that the emission or representative value assumes after elapse of a predetermined period of time (i.e., at a point in time which is later than the present time by the predetermined period of time). By virtue of this configuration, quicker air-fuel ratio control becomes possible, whereby the exhaust purifying performance can be improved.

In another embodiment of the present invention, the air-fuel ratio control apparatus further comprises ignition timing control means for controlling ignition timing of the engine, and the air-fuel ratio control means has a function of arbitrarily controlling the opening of a throttle value for adjusting an intake air amount of the engine. In this embodiment, when the air-fuel ratio is controlled by use of the air-fuel ratio control means in such a manner that the estimation value after the predetermined period of time estimated by the estimation means reaches the predetermined target state, control for opening the throttle valve is delayed by the air-fuel ratio control means, and the ignition timing is advanced by the ignition timing control means.

This configuration enables improvement of the exhaust purifying performance by the air-fuel ratio control, while suppressing a drop in engine torque.

In another embodiment of the present invention, the estimation means estimates at least one estimation value relating to a component whose emission increases when the air-fuel ratio is on the rich side, and at least one estimation value relating to a component whose emission increases when the air-fuel ratio is on the lean side; and the target setting means sets a target state for each estimation value.

Further, in the air-fuel ratio control apparatus, the target state set by the target setting means may be a state in which the estimation value falls within a predetermined range.

Further, the target setting means may set, as the target state, a state in which the estimation values becomes equal to each other.

Further, the estimation means may reflect a predicted value of a throttle opening in the estimation of the estimation value.

Further, the estimation means may reflect a fuel behavior model in the estimation of the estimation value.

In another embodiment of the present invention, the estimation means estimates the estimation value for a specific region of a plurality of regions defined by dividing the exhaust purifying catalyst unit in the flow direction of exhaust gas; the target setting means sets a target state regarding the estimation value for the specific region; and the air-fuel ratio control means controls the air-fuel ratio in such a manner that the estimation value for the specific region reaches the target state set for the specific region.

By virtue of this configuration, the state of the exhaust gas in the specific region can be caused to approach the desired state.

Further, the estimation means may be configured to set the specific region in the side located upstream of (on the upstream side of) the furthest downstream region among the plurality of regions.

By virtue of this configuration, a specific region in the side located upstream of the furthest downstream region is used for the air-fuel ratio control. Therefore, quick air-fuel ratio control becomes possible, and even when the result of control at the specific region differs from the target state, the exhaust gas can be purified by the catalytic action of a downstream region(s), whereby the exhaust purifying performance can be improved.

In this case, the estimation means may be configured to change the specific region in accordance with the operating condition of the engine. This further improves the exhaust purifying performance.

Moreover, the air-fuel ratio control apparatus may be configured in such a manner that the estimation means selects two regions as the specific region and estimates estimation values for these specific regions; the target setting means sets a target state regarding each of the estimation values for the specific regions; and the air-fuel ratio control means controls the air-fuel ratio in such a manner that the estimation values for the specific regions reach the corresponding target states. Since this configuration enables more accurate air-fuel ratio control, the exhaust purifying performance can be further improved.

Further, in the case where a plurality of specific regions are selected as described above, in order to perform more accurate air-fuel ratio control, the air-fuel ratio control means may be configured to individually set, for each specific region, a degree of influence on the air-fuel ratio control.

Further, the air-fuel ratio control means may be configured to change the degree of influence of each specific region in accordance with an operating condition of the engine.

In another embodiment of the present embodiment, the air-fuel ratio control means comprises a downstream air-fuel ratio sensor for detecting the exhaust air-fuel ratio of the exhaust gas flowing out of the exhaust purifying catalyst unit; and estimation model correction means for correcting the estimation model on the basis of the estimation value estimated by the estimation means and a result of detection by the downstream air-fuel ratio sensor. This configuration improves the accuracy of estimation of the estimation value by the estimation model.

In another embodiment of the present embodiment, the air-fuel ratio control means comprises a downstream air-fuel ratio sensor for detecting the exhaust air-fuel ratio of the exhaust gas flowing out of the exhaust purifying catalyst unit; and sensor diagnosis means for diagnosing the downstream air-fuel ratio sensor on the basis of the estimation value estimated by the estimation means and a result of detection by the downstream air-fuel ratio sensor. This configuration enables diagnosis of the sensor.

In another embodiment of the present embodiment, in the case where an upstream exhaust purifying catalyst unit and a downstream exhaust purifying catalyst unit are provided in the exhaust passage as the exhaust purifying catalyst unit, the estimation means estimates the estimation value for both the upstream and downstream exhaust purifying catalyst units.

In this case, in the case where the air-fuel ratio control apparatus further comprises an intermediate air-fuel ratio sensor for detecting an exhaust air-fuel ratio of exhaust gas flowing out of the upstream exhaust purifying catalyst unit and flowing into the downstream exhaust purifying catalyst unit, the air-fuel ratio control means is preferably configured to control the exhaust air-fuel ratio of the exhaust gas flowing out of the upstream exhaust purifying catalyst unit and flowing into the downstream exhaust purifying catalyst unit on the basis of the estimation value regarding the upstream exhaust purifying catalyst unit and a result of detection by the intermediate air-fuel ratio sensor.

Moreover, preferably, the estimation value regarding the upstream exhaust purifying catalyst unit relates to an excess-deficient amount of oxygen in exhaust gas; and the target setting means sets the target state regarding the estimation value in such a manner that a cumulative value of the excess-deficient amount of oxygen in the exhaust gas flowing into the downstream exhaust purifying catalyst unit becomes zero.

The present invention also provides an air-fuel ratio control apparatus for an internal combustion engine in which an exhaust purifying catalyst unit is disposed in an exhaust passage, the catalyst unit including a space through which inflow gas passes, and a coating layer exposed to the space and carrying a substance for providing a catalytic function and a substance for providing an oxygen storage-release function. The air-fuel ratio control apparatus comprises: estimation means for estimating, as estimation values, values corresponding to emissions of specific components contained in exhaust gas of the engine having passed through the entirety or a portion of the exhaust purifying catalyst unit; and air-fuel ratio control means for controlling the air-fuel ratio of the exhaust gas flowing into the exhaust purifying catalyst unit in such a manner that at least one of the estimation values estimated by the estimation means reaches a predetermined target state.

By virtue of the above-described configuration, the air-fuel ratio is controlled in accordance with the estimated emission (concentration or the like) of the specific component of the exhaust gas, whereby the exhaust purifying performance is improved.

In this case, the specific component is at least one component selected from the group consisting of reduction components which are contained in the exhaust gas of the engine flowing into the exhaust purifying catalyst unit and having a reducing function, and storage components which are contained in the exhaust gas and capable of supplying oxygen to the reduction components; and the estimation means estimates the estimation value on the basis of an estimation model which is formed in consideration of the mass balance of the specific component.

Moreover, the model of the estimation means can be formed as follows. Attention is paid to a specific region among a plurality of regions obtained by dividing the exhaust purifying catalyst unit in the flow direction of exhaust gas; and the estimation model is formed on the basis of an amount of the specific component flowing into the space of the specific region, an amount of the specific component flowing out of the space of the specific region, and an amount of the specific component diffused from the space of the specific region to the coating layer in the specific region.

Moreover, the estimation model of the estimation means is formed on the basis of an amount of the specific component diffused from the space of the specific region to the coating layer in the specific region, and an amount of the specific component consumed at the coating layer.

In the case where emissions of a specific component is estimated by use of such a model, the specific component is preferably oxygen, or oxygen and carbon monoxide, in view of easiness of calculation.

BEST MODE FOR CARRYING OUT THE INVENTION

Figure 1:
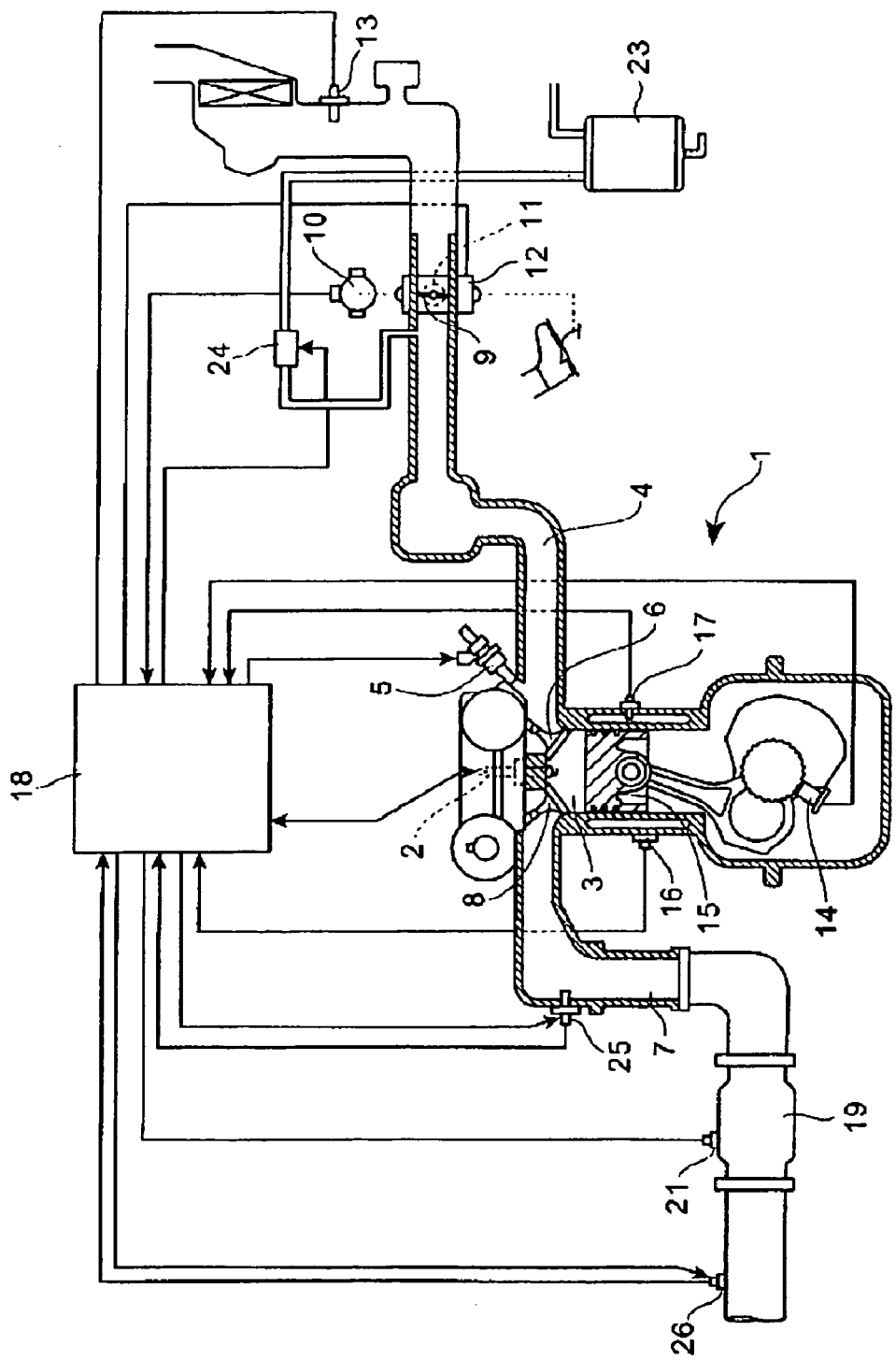
FIG. 1 is a cross-sectional view showing an internal combustion engine which includes an embodiment of a control apparatus of the present invention.

Embodiments of an air-fuel ratio control apparatus of the present invention will now be described with reference to the drawings. FIG. 1 shows the configuration of an internal combustion engine which incorporates the air-fuel ratio control apparatus. The air-fuel ratio control apparatus controls an engine 1 of an internal combustion type.

The engine 1 is a multi-cylinder engine, and FIG. 1 shows only one cylinder of the engine in cross section. The engine 1 generates drive torque by igniting an air-fuel mixture within each cylinder 3 by use of a spark plug 2. The engine 1 takes in the cylinder 3 an air-fuel mixture which is formed through mixing of air taken from the outside via an intake passage 4 and fuel injected from an injector 5. An intake valve 6 is provided so as to establish and break communication between the interior of the cylinder 3 and the intake passage 4. An exhaust passage 7 is provided so as to discharge, as exhaust gas, the air-fuel mixture having been burned in the cylinder 3. An exhaust valve 8 is provided so as to establish and break communication between the interior of the cylinder 3 and the exhaust passage 7.

A throttle valve 9 is provided in the intake passage 4 so as to adjust the amount of intake air taken into the cylinder 3. A throttle position sensor 10 is connected to the throttle valve 9 in order to detect the opening thereof. Further, the throttle valve 9 is connected to a throttle motor 11, which opens and closes the throttle valve 9. An accelerator position sensor 12 is disposed in the vicinity of the throttle valve 9 so as to detect an amount of operation of an accelerator pedal (accelerator opening). By virtue of the above configuration, the opening of the throttle valve 9 is electronically controlled. In other words, the engine 1 employs an electronic control throttle system.

Moreover, the engine 1 includes an air flow meter 13 for detecting the amount of intake air (intake air flow rate); a crank position sensor 14 for detecting the position of a crankshaft and generating a signal, from which the position of a piston 15 within the cylinder 3 and engine rotation speed NE are determined; a knock sensor 16 for detecting knocking of the engine 1; and a water temperature sensor 17 for detecting the temperature of cooling water.

An emission purifying catalyst unit (catalyst converter; hereinafter may be simply referred to as "catalyst unit") 19 is disposed in the exhaust passage 7. In some cases, a plurality of such catalyst units are provided in the exhaust passage. For example, a plurality of catalyst units may be provided in series with respect to the flow of exhaust gas. In an engine having split exhaust passages, a single catalyst unit may be provided in each of the split exhaust passages (more specifically, in the case of a four-cylinder engine, one catalyst unit is disposed at a location where exhaust pipes of two cylinders merge, and another catalyst unit is disposed at a location where exhaust pipes of the remaining two cylinders merge). In the present embodiment, the single catalyst unit 19 is disposed downstream of a location where exhaust pipes of the individual cylinders 3 merge.

Furthermore, the engine 1 includes a catalyst temperature sensor 21 for measuring the temperature of the catalyst unit 19; a charcoal canister 23; a purge control valve 24 for purging to the intake passage 4 fuel vapor flowing from a fuel tank and collected by means of the charcoal canister 23; an upstream air-fuel ratio sensor 25 attached on the upstream side of the catalyst unit 19; and a downstream air-fuel ratio sensor 26 attached on the downstream side of the catalyst unit 19.

Each of the air-fuel ratio sensors 25 and 26 detects the air-fuel ratio of exhaust gas (exhaust air-fuel ratio of exhaust gas, exhaust air-fuel ratio) from the oxygen concentration of the exhaust gas at the corresponding attachment position. The air-fuel ratio sensor 25 is a linear air-fuel ratio sensor which detects the air-fuel ratio linearly, whereas the air-fuel ratio sensor 26 is a concentration-cell-type sensor which determines whether the air-fuel ratio is on the rich side or the lean side.

The above-described spark plug 2, injector 5, throttle position sensor 10, throttle motor 11, accelerator position sensor 12, air flow meter 13, crank position sensor 14, knock sensor 16, water temperature sensor 17, catalyst temperature sensor 21, purge control valve 24, upstream air-fuel ratio sensor 25, and downstream air-fuel ratio sensor 26 are connected to an electronic control unit (ECU) 18, which controls the engine 1. These components are controlled on the basis of signals from the ECU 18, or transmit detection results to the ECU 18.

The ECU 18 includes a CPU for performing computation, RAM for storing various data such as computation results, backup RAM whose storage data are maintained by means of a battery, and ROM for storing a control program and other data. The ECU 18 performs various kinds of computation and calculation so as to carry out control of the quantity of fuel injected from the injector 5, control of ignition timing, calculation of oxygen storage amount, model correction, which will be described later, and diagnosis of the above-mentioned sensors.

(Oxygen Storing Function (Action) of Catalyst)

Next, the configuration and oxygen storing function of the catalyst unit 19 will be described.

Figure 2:
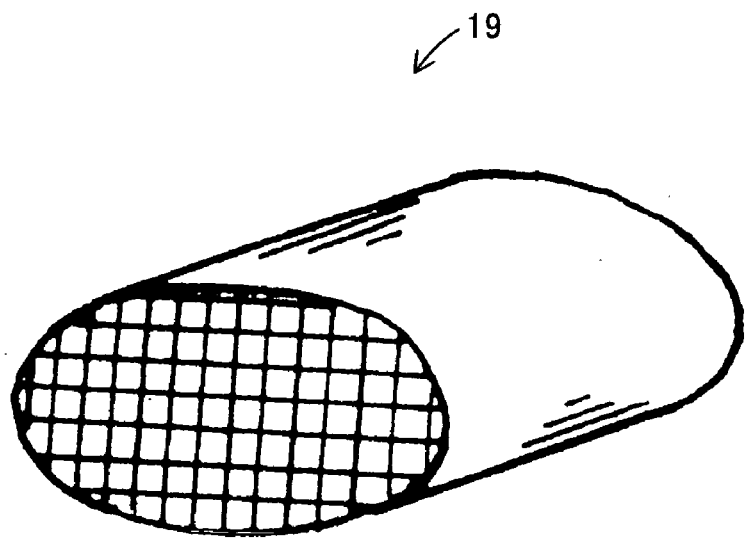
FIG. 2 is an external view of the emission purifying catalyst unit shown in FIG. 1.
Figure 3:
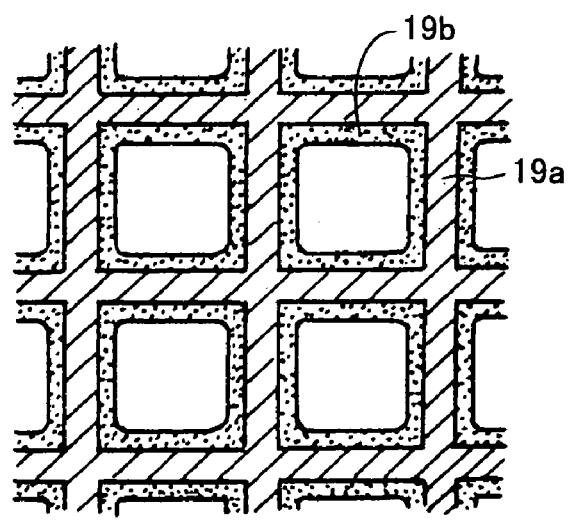
FIG. 3 is a partial cross-sectional view of the emission purifying catalyst unit shown in FIG. 2.

As shown in FIG. 2, which shows the external view of the catalyst unit 19, the catalyst unit 19 a columnar three-way catalyst (called a monolith catalyst converter) which has an elliptical cross section (cross-sectional area dA: constant). As shown in FIG. 3, which is an enlarged cross-sectional view of the catalyst unit 19 taken along a plane perpendicular to the axis, the interior of the catalyst unit 19 is divided into axial spaces extending along the axial direction by means of a carrier 19a made of cordierite, which is a type of ceramic. Each axial space has a generally square shape when cut along a plane perpendicular to the axis, and is also called a cell. The carrier 19a is coated with a coating layer 19b, which is made of alumina and carries an active component (catalyst component) formed of noble metal such as platinum (Pt), and ceria ($CeO_2$) or the like.

When the air-fuel ratio of gas flowing into the catalyst unit 19 is the stoichiometric air-fuel ratio, the catalyst unit 19 exhibits a function of oxidizing unburned components (HC, CO) and simultaneously reducing nitride oxides ($NO_x$) (hereinafter this will be referred to as a "catalytic function" or an "oxidation and reduction function"). Since the catalyst unit 19 carries the above-described ceria or the like, the catalyst unit 19 has characteristics for storing (adsorbing) and releasing (detaching) oxygen molecules contained in exhaust gas flowing into the catalyst unit 19 (hereinafter this will be referred to as an "oxygen storing function"). By virtue of this oxygen storing function, the catalyst unit 19 can remove HC, CO, and $NO_x$ even when the gas air-fuel ratio deviates from the stoichiometric air-fuel ratio to some degree.

Specifically, when the air-fuel ratio of an air-fuel mixture taken into the engine (hereinafter, the air-fuel ratio may be simply referred to as an "air-fuel ratio of the engine"; this air-fuel ratio of the engine is equal to the "exhaust air-fuel ratio," which is the air-fuel ratio of gas flowing into the catalyst unit 19) has shifted to the lean side with the result that the gas flowing into the catalyst unit 19 contains an excess quantity of oxygen and a large quantity of nitride oxides $NO_x$, the catalyst unit 19 stores the excess portion of oxygen, and removes oxygen from nitride oxides $NO_x$ (reducing $NO_x$) and stores the removed oxygen, to thereby remove $NO_x$. When the air-fuel ratio of the engine has shifted to the rich side with the result that the gas flowing into the catalyst unit 19 contains a large quantity of unburned components such as hydrocarbons HC and carbon monoxide CO, the catalyst unit 19 imparts the stored oxygen molecules to these unburned components in order to oxidize them, to thereby remove HC and CO.

Accordingly, if the catalyst unit 19 has already stored oxygen to an oxygen storage limit (i.e., when the oxygen storage amount OSA has reached the maximum oxygen storage amount OSAmax (=Cmax)), the catalyst unit 19 cannot store oxygen when the exhaust air-fuel ratio of the gas flowing into the catalyst unit 19 shifts to the lean side, and thus the catalyst unit 19 fails to sufficiently remove $NO_x$. In contrast, if the catalyst unit 19 has completely released oxygen and stores no oxygen (i.e., when the oxygen storage amount OSA has become zero), the catalyst unit 19 cannot release oxygen when the exhaust air-fuel ratio of the gas flowing into the catalyst unit 19 shifts to the rich side, and thus the catalyst unit 19 fails to sufficiently remove HC or CO. Therefore, it is desirable to accurately estimate the oxygen storage amount OSA of the catalyst unit 19 and control the air-fuel ratio of the gas flowing into the catalyst unit 19 so as to maintain the oxygen storage amount OSA at a predetermined level, to thereby enable the catalyst unit 19 to sufficiently remove harmful components of the gas flowing into the catalyst unit 19 even when the air-fuel ratio of the gas transitionally shifts to the lean side or the rich side to a considerably degree.

When the gas flowing into the catalyst unit 19 has a lean-side air-fuel ratio, a larger amount of oxygen is stored in an upstream portion of the catalyst unit 19. When the gas flowing into the catalyst unit 19 has a rich-side air-fuel ratio, consumption of stored oxygen starts from the upstream portion of the catalyst unit 19. Therefore, if the total of oxygen storage amounts OSA at respective positions, located from the furthest upstream position to an arbitrary position of the catalyst unit 19, is estimated, and air-fuel ratio control is performed on the basis of the estimation value, it becomes easier to prevent the overall oxygen storage amount of the catalyst unit 19 from becoming zero or reaching the maximum oxygen storage amount Cmax. Thus, emission can be effectively reduced, irrespective of control delay which unavoidably occurs in control of the air-fuel ratio. In addition, if the concentration of a specific gas component of the gas flowing out of the catalyst unit 19 (or of the gas purified by a portion or the entirety of the catalyst unit 19) can be estimated, emission of the specific gas component can be suppressed accurately through performance of air-fuel ratio control on the basis of the specific gas component.

In view of the above-described requirements, the present air-fuel ratio control apparatus estimates the concentration (emission) of a specific gas component and the oxygen storage amount by use of an estimation model (catalyst model). These estimation values correspond to the emission of at least one specific component contained in the exhaust gas flowing from the entirety of the emission purifying catalyst or a predetermined region (portion) of the interior of the emission purifying catalyst, or at least one representative value which represents the state of the flowing-out exhaust gas.

(Catalyst Model)

Figure 4:
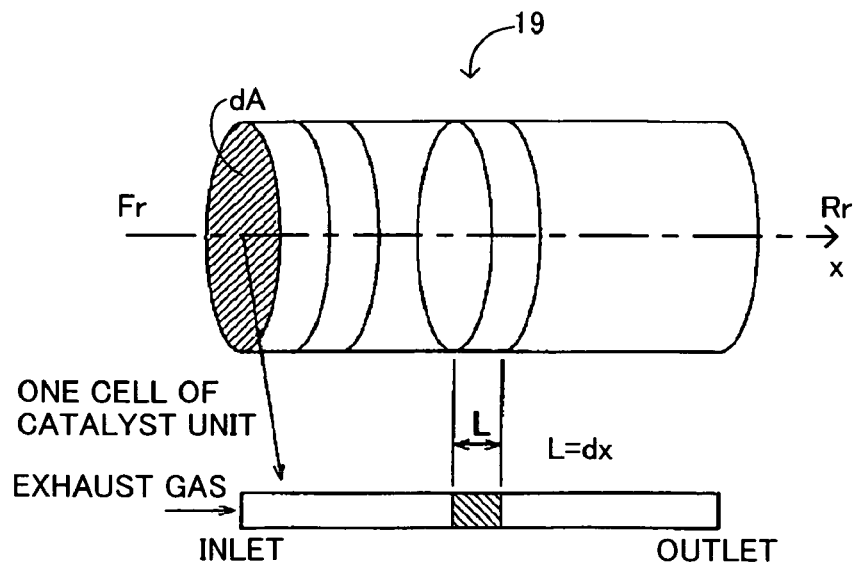
FIG. 4 is a schematic diagram for explaining an estimation model (catalyst model) used in the present invention.

Next, the catalyst model will be described. As schematically shown in FIG. 4, the catalyst unit 19 is first divided into a plurality of regions (also called "blocks") by means of planes perpendicular to an axis extending from a gas inlet (inflow side) Fr to a gas outlet (outflow side) Rr. In other words, the catalyst unit 19 is divided into a plurality of regions along the flow direction of exhaust gas. The length of each region as measured along the axial direction is represented by L (since the length is very small, it is also represented by dx). As described above, the cross sectional area dA of the catalyst unit 19 is constant.

Although this catalyst model is constituted through division of the catalyst unit into a plurality of regions, a similar catalyst model can be constituted while the entire catalyst unit is considered as a single region to be described below; i.e., without division of the catalyst unit into a plurality of regions.

Next, an arbitrary specific region is selected from the plurality of regions, and the mass balance of a specific chemical species (specific component) passing through the specific region is considered. The term "chemical species" refers to a component of the exhaust gas, such as oxygen $O_2$, carbon monoxide CO, hydrocarbons HC, and nitrogen oxides $NO_x$. Notably, the term "chemical species" also refers to a group of components (rich components) which are contained in the exhaust gas flowing into the catalyst unit when the air-fuel ratio of the exhaust gas is on the rich side, or a group of components (lean components) which are contained in the exhaust gas flowing into the catalyst unit when the air-fuel ratio of the exhaust gas is on the lean side.

Here, various values used in the present catalyst model are defined as follows.

| Value | Unit | Definition/Description |
|---|---|---|
| Cg | mol/m$^3$ | Concentration of chemical species of an exhaust gas phase in the specific region. |
| Cgin | mol/m$^3$ | Concentration of chemical species flowing into the specific region. |
| Cgout | mol/m$^3$ | Concentration of chemical species flowing out of the specific region. |
| Cw | mol/m$^3$ | Concentration of chemical species at a coating layer in the specific region. |
| Sgeo | m$^2$/m$^3$ | Geometrical surface area. Surface area per unit volume of the catalyst unit in the specific region. |

-continued

| Value | Unit | Definition/Description |
|---|---|---|
| $\sigma$ | no dimension | Opening ratio. Ratio of the area of a cross section of a gas passage space taken perpendicular to the axis to the area of a corresponding cross section of the specific region. |
| $h_D$ | m/s | Coefficient of mass transfer, which changes depending on chemical species and its temperature and is determined experimentally. |
| vg | m/s | Flow rate of gas flowing into the specific region. |
| R | mol/($m^3 \cdot S$) | Consumption rate of chemical species under consideration at the coating layer, which is determined such that the rate assumes a positive value when the chemical species is consumed and assumes a negative value when the chemical species is produced. |
| Rstore, i | mol/($m^3 \cdot S$) | Rate at which oxygen is stored in the coating layer due to of chemical species i (oxygen storage rate); i.e., consumption rate of the chemical species (storage agent) that provides the coating layer with oxygen. |
| Rredcu, i | mol/($m^3 \cdot S$) | Consumption rate of chemical species i (reduction agent) that consumes oxygen upon contact with the coating layer. |
| Rrel, i | mol/($m^3 \cdot S$) | Rate at which oxygen stored in the coating layer is released due to the presence of chemical species i (oxygen release rate). |
| Ost | mol/$m^3$ | Oxygen storage density of the coating layer. |
| Ostmax | mol/$m^3$ | Capability for storing oxygen at the coating layer (Oxygen Storage Capacity), i.e., maximum oxygen storage density determined on the basis of the composition, degree of degradation, temperature, etc., of the catalyst. |

Figure 5:
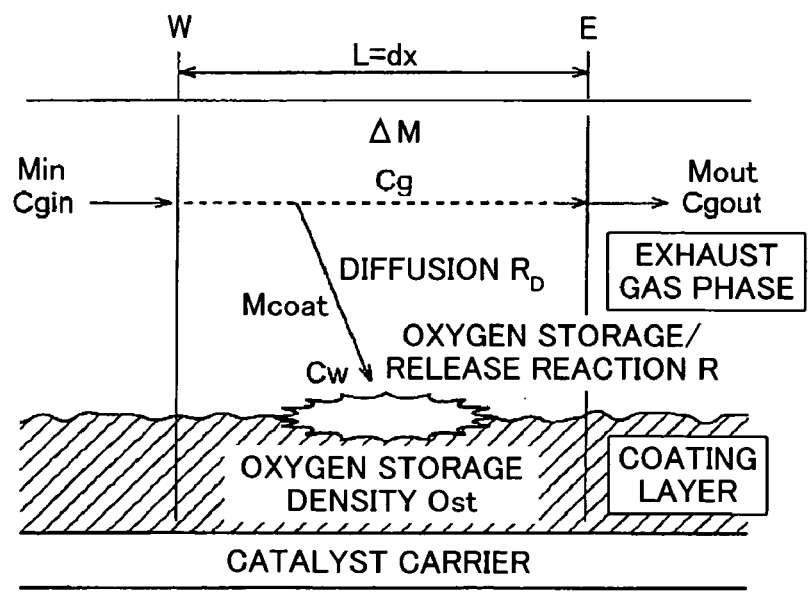
FIG. 5 is a schematic diagram for explaining the estimation model used in the present invention.

Now, the balance of a chemical species in the specific region during a given period of t to t+Δt is considered. As shown in FIG. 5, a change ΔM of the chemical species in the exhaust gas phase (also simply called "gas phase") of the specific region is equal to the result of subtraction of the total of an amount Mout of the chemical species flowing out of the specific region and an amount Mcoat of the chemical species taken by the coating layer from an amount Min of the chemical species flowing into of the specific region, as shown in the following Expression (1). As described in this way, the catalyst model is constructed on the basis of the mass balance of a specific component in the specific region.

$$\Delta M = Min - Mout - Mcoat \quad (1)$$

Hereinbelow, the respective terms of Expression (1) will be discussed individually. First, the change ΔM of the chemical species on the left side of Expression (1) can be obtained by the following Expression (2). In Expression (2), the product of a concentration change of the chemical species in the above-mentioned given period (a value obtained through integration of time-course changes in the concentration Cg of the chemical species over the given period) and an infinitesimal volume σ·dA·dx is integrated throughout the specific region (along the axial direction).

$$\Delta M = \int_W^E \sigma \cdot dA \cdot \left[ \int_t^{t+\Delta t} \frac{\partial Cg}{\partial t} \partial t \right] dx \quad (2)$$

Min, which is the first term of the right side of Expression (1), is a value obtained through integration of Cgin·Vgin·dA over the given period, where Cgin·Vgin·dA is the product of the concentration Cgin of the chemical species contained in the gas flowing into the specific region and the "product (vgin·dA) of the flow velocity vgin of the gas flowing into the specific region and the cross-sectional area dA of the specific region (in actuality, the product of the actual flow velocity Vgin/σ and the effective cross-sectional area σ·dA, because the gas of the flow velocity Vgin flows into a catalyst unit whose cross-sectional is dA and whose opening ratio is σ)," which product is a value corresponding to the volume of a gas flowing into the specific region during a unit time. Further, Mout, which is the second term of the right side of Expression (1), is a value obtained through integration, of Cgout·Vgout·dA over the given period, where Cgout·Vgout·dA is the product of the concentration Cgout of the chemical species contained in the gas flowing out of the specific region and the product (vgout·dA) of the flow velocity vgout of the gas flowing out of the specific region and the cross-sectional area dA of the specific region (in actuality, the product of the actual flow velocity Vgout/σ and the effective cross-sectional area σ·dA). That is, the first and second terms of the right side of Expression (1) can be expressed by the following Expression (3).

$$Min - Mout = \int_t^{t+\Delta t} \left\{ \frac{Vgin}{\sigma} \cdot (\sigma \cdot dA) \cdot Cgin - \frac{Vgout}{\sigma} \cdot (\sigma \cdot dA) \cdot Cgout \right\} dt \quad (3)$$

$$= \int_t^{t+\Delta t} (vgin \cdot dA \cdot Cgin - vgout \cdot dA \cdot Cgout) dt$$

Incidentally, since no large difference exists between the flow velocity vgin of the gas flowing into the specific region and the flow velocity vgout of the gas flowing out of the specific region, the relation vg=vgin=vgout is assumed. Thus, Expression (3) can be modified to the following Expression (4).

$$Min - Mout = \int_t^{t+\Delta t} (-dA \cdot vg) \cdot (Cgout - Cgin) dt \quad (4)$$

$$= \int_t^{t+\Delta t} (-dA \cdot vg) \cdot [Cg(x)]_W^E dt$$

$$= \int_{t}^{t+\Delta t} (-dA \cdot vg) \int_{W}^{E} \frac{\partial Cg}{\partial x} dx dt$$

Next, Mcoat, which is the third term of the right side of Expression (1) and represents the amount of the chemical species which is transmitted (moves) to the coating layer, will be discussed. Since the geometrical surface area Sgeo is a surface area per unit volume of the catalyst unit, which surface area contributes to reaction of the chemical species, the surface area which contributes to reaction of the chemical species in the specific area is represented by Sgeo·dA·dx, and the surface area per unit length of the specific area which contributes to the reaction is represented by Sgeo·dA. From Fick's law, the amount of the chemical species transmitted to the coating layer can be considered to be proportional to the difference between the concentration Cg of the chemical species in the gas phase and the concentration Cw of the chemical species in the coating layer. From these, the following Expression (5) is obtained. Although $h_D$ is a proportional constant, it is a value called "coefficient of mass transfer" as indicated in the above-mentioned table.

$$Mcoat = \int_{W}^{E} \int_{t}^{t+\Delta t} Sgeo \cdot h_D \cdot (Cg - Cw) \cdot dAdtdx \qquad (5)$$

Accordingly, the following Expression (6) is obtained from the above-described Expressions (1), (2), (4), and (5).

$$\sigma \frac{\partial Cg}{\partial t} = -vg \cdot \frac{\partial Cg}{\partial x} - Sgeo \cdot h_D \cdot (Cg - Cw) \qquad (6)$$

When a quasi-steady state approximation is applied to Expression (6), the left side of Expression (6) can be considered to be "zero" ($\partial Cg/\partial t=0$) (i.e., the concentration Cg can be considered to instantaneously reach a steady state value), whereby the following Expression (7) is obtained.

$$-vg \cdot \frac{\partial Cg}{\partial x} = Sgeo \cdot h_D \cdot (Cg - Cw) \qquad (7)$$

Here, when the apparent diffusion rate (effective diffusion rate) $R_D$ is defined as shown in Expression (8), Expression (7) can be written as Expression (9).

$$R_D = Sgeo \cdot h_D \qquad (8)$$

$$-vg \cdot \frac{\partial Cg}{\partial x} = R_D \cdot (Cg - Cw) \qquad (9)$$

Next, the balance of a chemical species (the mass balance of a specific component) at the coating layer in the specific region will be considered in the same manner as described above. As shown in the following Expression (10), the time-course change (change per unit time) ΔMc of the chemical species within the coating layer is a value obtained by subtracting an amount Mr of the chemical species which is consumed through a reaction by the coating layer during the unit time from an amount Md of the chemical species which is transmitted from the exhaust gas phase to the coating layer during the unit time.

$$\Delta Mc = Md - Mr \qquad (10)$$

As shown in the following Expression (11), the left side of Expression (10) (the time-course change of the chemical species within the coating layer) ΔMc can be obtained by multiplying a change in the concentration of the chemical species ($\partial Cw/\partial t$) by the volume ((1-σ)·dA·dx); and the first term on the right side (the amount Md of the chemical species transmitted from the exhaust gas phase to the coating layer during the unit time) can be described as shown in the following Expression (12), for the same reason as described in relation to Expression (5); i.e., in consideration of Fick's law.

$$\Delta Mc = (1 - \sigma) \cdot dA \cdot dx \cdot \frac{\partial Cw}{\partial t} \qquad (11)$$

$$Md = Sgeo \cdot h_D \cdot (Cg - Cw) \cdot dA \cdot dx \qquad (12)$$

Moreover, the second term on the right side of Expression (10) (the amount Mr of the chemical species consumed through a reaction by the coating layer during the unit time) can be obtained by the following Expression (13), which uses the consumption rate R of the chemical species at the coating layer.

$$Mr = R \cdot dA \cdot dx \qquad (13)$$

Accordingly, the following Expression (14) is obtained from Expressions (10) to (13).

$$(1 - \sigma) \cdot \frac{\partial Cw}{\partial t} = Sgeo \cdot h_D \cdot (Cg - Cw) - R \qquad (14)$$

When a quasi-steady state approximation is applied to Expression (14) (($\partial Cw/\partial t=0$), the following Expression (15) is obtained.

$$R = Sgeo \cdot h_D \cdot (Cg - Cw) \qquad (15)$$

Through application of Expression (8) to Expression (15), the following Expression (16) is obtained.

$$R = R_D \cdot (cg - Cw) \qquad (16)$$

In short, Expressions (9) and (16) are basic expressions of the catalyst model. Expression (9) shows that a balance is established between (the amount of a certain chemical species flowing into the specific region) and (the amount of the chemical species diffusing from the exhaust gas phase into the coating layer+the amount of the certain chemical species flowing out of the specific region), whereas Expression (16) shows that a balance is established between (the amount of the chemical species diffusing from the exhaust gas phase to the coating layer) and (the amount of the chemical species consumed at the coating layer).

Next, there will be described a method for actually calculating the concentration Cgout of a specific chemical species i flowing from the specific region by use of the above-described catalyst model. First, when Expression (9) is discretized, the following Expression (17) is obtained. Notably, in the following expression, the above-mentioned dx is represented by L.

$$vg \cdot \frac{Cgout - Cgin}{L} = R_D \cdot (Cg - Cw) \quad (17)$$

Figure 6:
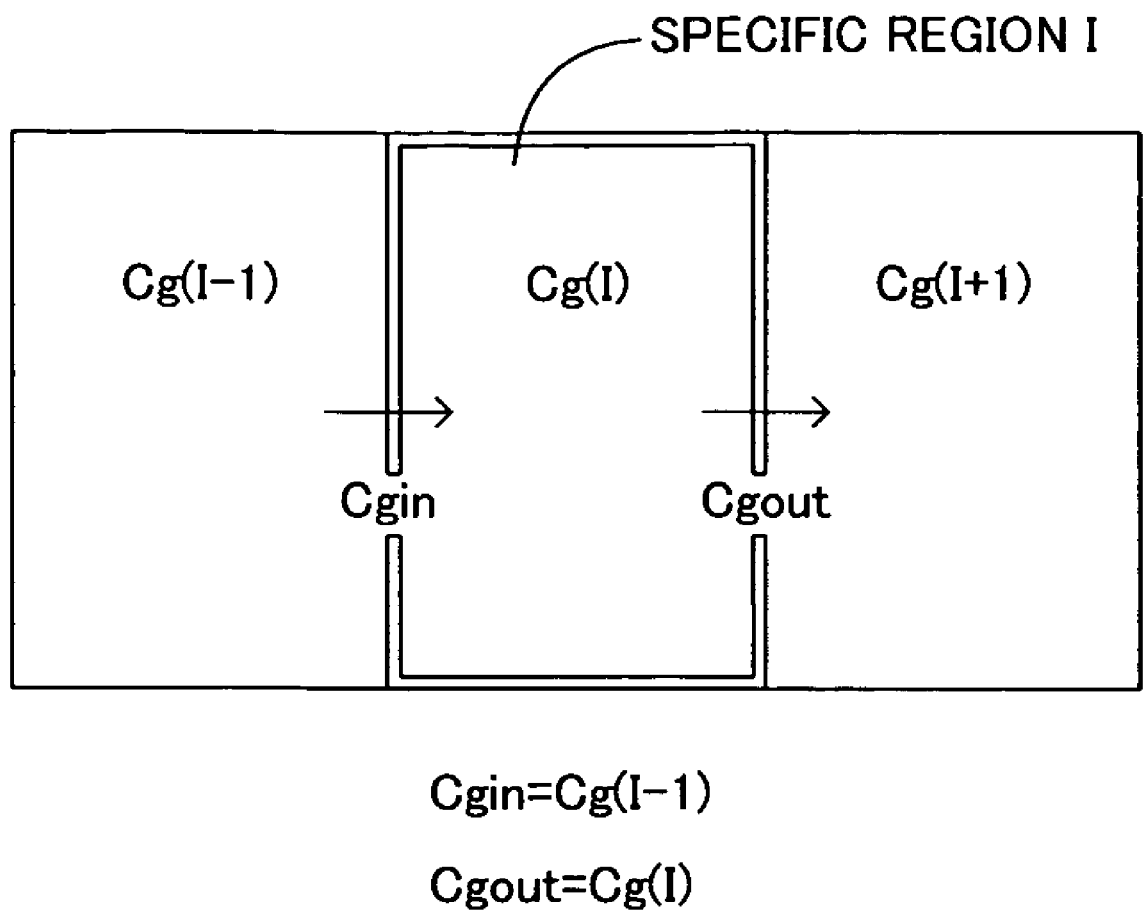
FIG. 6 is a schematic diagram for explaining an upwind scheme used in the estimation model of the present invention.

As conceptually shown in FIG. 6, the concentration Cgout of a chemical species flowing out of a specific region I is considered to be strongly influenced by the concentration Cg(l) of the chemical species in the specific region I. Therefore, the concentration Cgout can be set as shown in the following Expression (18). This approach is called the "upwind scheme." In other words, the upwind scheme is based on the concept that "a chemical species which is present in an upstream region (l−1) adjacent to the specific region I and has a concentration Cg(l−1) flows into the specific region I," and thus can be described as shown in the following Expression (19).

$$Cgout = Cg(l) \quad (18)$$

$$Cgin = Cg(l-1) \quad (19)$$

Incidentally, under the reaction rate theory, the consumption rate R of a certain chemical species is a function fcw of the average concentration Cw of the chemical species in the coating layer (e.g., equal to Cw to the n-th power). Therefore, when this function fcw is defined as fcw(x)=x, which is the simplest form, the consumption rate R can be expressed by the following Expression (20). Notably, for the sake of convenience, in the following description R* in Expression (20) will be called "consumption rate constant."

$$R = R^* \cdot Cw \quad (20)$$

When Expression (20) is applied to the above-described Expression (16) (R=$R_D$ (Cg−CW) (16)), the following Expression (21) is obtained. When Expression (21) is modified, the following Expression (22) is obtained.

$$R^* \cdot Cw = R_D(cg - Cw) \quad (21)$$

$$Cw = \frac{R_D}{R^* + R_D} \cdot Cg \quad (22)$$

Moreover, since Cg=Cgout in the above-mentioned upwind scheme, Expression (22) can be rewritten as the following Expression (23).

$$Cw = \frac{R_D}{R^* + R_D} \cdot Cgout \quad (23)$$

When the relation Cg=Cgout is applied to the above-described Expression (17) to thereby eliminate Cg, and Cw is eliminated from Expression (17) and the above-described Expression (23), the following Expression (24) is obtained.

$$Cgout = \frac{vg}{vg + \frac{R^* \cdot R_D}{R^* + R_D} \cdot L} \cdot Cgin \quad (24)$$

When a value SP is defined as shown in the following Expression (25), Expression (24) can be rewritten as shown by Expression (26). Since the value SP is strongly influenced by the apparent diffusion rate $R_D$ or the consumption rate constant R*, whichever is smaller, the value SP represents whether mass transmission ($R_D$) or chemical reaction (R*) determines the speed of a change in Cgout. Therefore, the value SP can also be called "reaction rate determining factor."

$$SP = \frac{R^* \cdot R_D}{R^* + R_D} \quad (25)$$

$$Cgout = \frac{vg}{vg + SP \cdot L} \cdot Cgin \quad (26)$$

As is apparent from the above, once the consumption rate constant R* and the apparent diffusion rate $R_D$ are determined, the concentration Cgout of the chemical species flowing out of a specific region can be obtained on the basis of Expressions (25) and (26) if the concentration Cgin of the chemical species flowing into the specific region is given. The above description illustrates the basic concept of the method of calculating the concentration Cgout of the chemical species.

Next, there will be described one specific example of a method of determining the above-mentioned consumption rate constant R* and apparent diffusion rate $R_D$ and obtaining the concentration Cgout of the chemical species flowing out of the specific region. In this example (catalyst model), a three-way reaction, which is a redox reaction at the catalyst unit, is assumed to end instantaneously and completely; and attention is paid to an oxygen storing or releasing reaction which occurs depending on the resultant excess or deficiency of oxygen. Notably, this assumption (catalyst model) is realistic, and yields excellent accuracy.

In this case, the chemical species i to which attention is paid is a chemical species selected from chemical species (storage agents) which generate (bring) oxygen, such as oxygen $O_2$ and nitrogen monoxide NO, which is one type of nitrogen oxide, and chemical species (reduction agents) which consume oxygen, such as carbon monoxide CO and hydrocarbons HC.

Moreover, in the following description, Cgout of a chemical species i serving as a storage agent is represented by Cgout,stor,i; Cw of the chemical species i is represented by Cw,stor,i; Cgin of the chemical species i is represented by Cgin,stor,i; the apparent diffusion rate $R_D$ of the chemical species i is represented by $R_D$,i; the consumption rate of the chemical species i is represented by Rstor,i; the consumption rate constant of the chemical species i is represented by R*stor,i; and the reaction rate determining factor of the chemical species i is represented by SPstor,i (in this case, the chemical species i is $O_2$ or NO).

Similarly, Cgout of a chemical species i serving as a reduction agent is represented by Cgout,reduc,i; Cw of the chemical species i is represented by Cw,reduc,i; Cgin of the chemical species i is represented by Cgin,reduc,i; the apparent diffusion rate $R_D$ of the chemical species i is represented by $R_D$,i; the consumption rate of the chemical species i is represented by Rreduc,i; the consumption rate constant of the chemical species i is represented by R*reduc,i; and the reaction rate determining factor of the chemical species i is represented by SPreduc,i (in this case, the chemical species i is CO, HC, or the like). When the respective values are represented in the above-described manners, the following Expressions (27) to (34) are obtained from the above-described Expressions (20), (23), (25), and (26).

$$Rstor,i = R^*stor,i \cdot Cw,stor,i \quad (27)$$

$$Cw, stor, i = \frac{R_D, i}{R^*stor, i + R_D, i} \cdot Cgout, stor, i \qquad (28)$$

$$SPstor, i = \frac{R^*stor, i \cdot R_D, i}{R^*stor, i + R_D, i} \qquad (29)$$

$$Cgout, stor, i = \frac{vg}{vg + SPstor, i \cdot L} \cdot Cgin, stor, i \qquad (30)$$

$$Rreduc, i = R^*reduc, i \cdot Cw, reduc, i \qquad (31)$$

$$Cw, reduc, i = \frac{R_D, i}{R^*reduc, i + R_D, i} \cdot Cgout, reduc, i \qquad (32)$$

$$SPreduc, i = \frac{R^*reduc, i \cdot R_D, i}{R^*reduc, i + R_D, i} \qquad (33)$$

$$Cgout, reduc, i = \frac{vg}{vg + SPreduc, i \cdot L} \cdot Cgin, reduc, i \qquad (34)$$

In order to obtain Cgout,sotr,i (specifically, Cgout,O2, the concentration of oxygen flowing out of the specific region and Cgout,NO, the concentration of nitrogen monoxide flowing out of the specific region) and Cgout,reduc,i (specifically, Cgout,CO, the concentration of carbon monoxide flowing out of the specific region and Cgout,HC, the concentration of hydrocarbons flowing out of the specific region) on the basis of Expressions (27) to (34), the consumption rate constants R*stor,i and R*reduc,i are first obtained.

Incidentally, according to the reaction rate theory, the rate (oxygen storage rate) Rstor,i at which oxygen is stored by the coating layer in the specific region is considered to be proportional to the value of a function f1 (Cw,stor,i) of the concentration Cw,stor,i of a storage agent ($O_2$, $NO_x$, etc.) in the coating layer (e.g., Cw,O2 or Cw,NO) and also proportional to the value of a function f2 (Ostmax−Ost) of the difference (Ostmax−Ost) between the maximum oxygen storage density of the coating layer in the specific region and an actual oxygen storage density (at that point in time). The difference (Ostmax−Ost) between the maximum oxygen storage density and the actual oxygen storage density represents the oxygen storage margin in the specific region under consideration.

When the relation f1(x)=f2(x)=x is assumed for simplification, the following Expression (35) is obtained kstor,i in Expression (35) is an oxygen storage rate coefficient (storage-side reaction rate coefficient, consumption rate coefficient of a storage agent), which is a coefficient represented by the well-known Arrhenius' equation and varying depending on temperature and which can be obtained on the basis of a catalyst temperature Temp separately detected or estimated and a predetermined function (or a map which defines the relation between the oxygen storage rate coefficient kstor,i and the catalyst temperature Temp). Notably, since the oxygen storage rate coefficient kstor,i changes depending on the degree of degradation of the catalyst, the oxygen storage rate coefficient kstor,i may be determined on the basis of the degree of degradation of the catalyst.

$$Rstor,i = kstor,i \cdot Cw,stor,i \cdot (Ostmax-Ost) \qquad (35)$$

Accordingly, the following Expression (36) is obtained from Expressions (27) and (35), and the consumption rate constant R*stor,i can be obtained by use of Expression (36).

$$R^*stor,i = kstor,i \cdot (Ostmax-Ost) \qquad (36)$$

In this model, in which attention is paid only to storage (adsorption) and release of oxygen, since the reduction agent is used only for release of oxygen stored in the coating layer, the consumption rate Rredcu,i of the reduction agent is equal to the rate (oxygen release rate) Rrel,i at which oxygen stored in the coating layer is released.

Therefore, the oxygen release rate Rrel,i will be discussed. As in the case of the oxygen storage rate Rstor,i, under the reaction rate theory, the oxygen release rate Rrel,i is considered to be proportional to the value of a function g1 (Cw,reduc,i) of a concentration Cw,reduc,i (e.g., Cw,CO or Cw,HC) of a chemical species (e.g., CO or HC) which consumes oxygen at the coating layer and also to be proportional to the value of a function g2(Ost) of the oxygen storage density Ost.

When the relation g1 (x)=g2(x)=x is assumed for the sake of simplicity, the following Expression (37) is obtained krel,i in Expression (37) is an oxygen release rate coefficient (release-side reaction rate coefficient). As in the case of the oxygen storage rate coefficient kstor,i, krel,i is a coefficient which is represented by the Arrhenius' equation and varies depending on temperature, and can be obtained on the basis of the catalyst temperature Temp separately detected or estimated and a predetermined function (or a map which defines the relation between the oxygen release rate coefficient krel,i and the catalyst temperature Temp). Notably, since the oxygen release rate coefficient krel,i changes depending on the degree of degradation of the catalyst, the oxygen release rate coefficient krel,i may be determined on the basis of the degree of degradation of the catalyst.

$$Rrel,i = krel,i \cdot Cw,reduc,i \cdot Ost \qquad (37)$$

Since the consumption rate Rredcu,i of the reduction agent is equal to the oxygen release rate Rrel,i of the coating layer as described above, the consumption rate constant R*reduc,i can be obtained on the basis of the following Expression (38), which is obtained through comparison between Expressions (31) and (37).

$$R^*reduc,i = krel,i \cdot Ost \qquad (38)$$

As is apparent from the above, once the oxygen storage density Ost is obtained (the method for obtaining the oxygen storage density Ost will be described later), the consumption rate constant R*stor,i (e.g., R*O2) can be obtained from Expression (36). Meanwhile, the apparent diffusion rate $R_D$,i (e.g., $R_D$,O2) can be experimentally obtained as a function of temperature and flow rate (a function of the temperature of the catalyst unit and the flow rate of the gas passing through the catalyst unit), because the apparent diffusion rate $R_D$,i is equal to Sgeo·$h_D$,i as shown in Expression (8). Since SPstor,i (e.g., SPstor,O2) is determined from Expression (29), when Cgin,stor,i (e.g., Cgin,O2) is given as a boundary condition, Cgout,stor,i (e.g., Cout,O2) is obtained from Expression (30). Further, a new Cw,stor,i (e.g., Cw,O2) is obtained from Expression (28).

Similarly, once the oxygen storage density Ost is obtained, the consumption rate constant R*reduc,i (e.g., R*reduc,CO) can be obtained from Expression (38). Meanwhile, the apparent diffusion rate $R_D$,i (e.g., $R_D$,CO) can be experimentally obtained as a function of temperature and flow rate (a function of the temperature of the catalyst unit and the flow rate of the gas passing through the catalyst unit), because the apparent diffusion rate $R_D$,i is equal to Sgeo·$h_D$,i as shown in Expression (8). Since SPreduc,i (e.g., SPreduc,CO) is determined from Expression (33), when Cgin,reduc,i (e.g., Cgin,CO) is given as a boundary condition, Cgout,reduc,i (e.g., Cgout,CO) is obtained from Expression (34). Further, a new Cw,reudc,i (e.g., Cw,CO) is obtained from Expression (32).

Next, the method for obtaining the oxygen storage density Ost required for obtaining Cgout,stor,i and Cgout,reduc,i will be described.

First, the balance of oxygen (chemical species) at the coating layer is considered. Since the balance is the difference between an amount of oxygen stored in the coating layer and an amount of oxygen released from the coating layer, the balance is expressed by the following Expression (39) dA·L in Expression (39) represents the volume dV of the specific region.

$$(1-\sigma) \cdot dA \cdot L \cdot \frac{dOst}{dt} = (1-\sigma) \cdot dA \cdot L \cdot \sum_i Rstor, i - \quad (39)$$
$$(1-\sigma) \cdot dA \cdot L \cdot \sum_i Rrel, i$$

When Expression (39) is modified, the following Expression (40) is obtained.

$$\frac{dOst}{dt} = \sum_i Rstor, i - \sum_i Rrel, i \quad (40)$$

When Expression (40) is discretized by use of Expressions (35) and (37), the following Expression (41) is obtained.

$$\frac{Ost(t+\Delta t) - Ost(t)}{\Delta t} = \sum_i (kstor, i \cdot Cw, stor, i) \cdot \quad (41)$$
$$\{(Ostmax - Ost(t+\Delta t))\} -$$
$$\sum_i (krel, i \cdot Cw, reduc, i) \cdot Ost(t+\Delta t)$$

When Expression (41) is modified, the following Expressions (42) to (44) are obtained, and the oxygen storage density Ost can be obtained (can be updated) by use of these expressions.

$$Ost(t+\Delta t) = \frac{Ost(t) + \Delta t \cdot P \cdot Ostmax}{1 + \Delta t \cdot Q} \quad (42)$$

$$P = \sum_i kstor, i \cdot Cw, stor, i \quad (43)$$

$$Q = \sum_i kstor, i \cdot Cw, stor, i + \sum_i krel, i \cdot Cw, reduc, i \quad (44)$$

As described above, since the oxygen storage density Ost is obtained from Expressions (42) to (44), Cgout,stor,i and Cgout,reduc,i can be obtained in the manner as described above. Further, since the oxygen storage density Ost is obtained, the oxygen storage amount OSA in the specific region can be obtained on the basis of the following Expression (45).

$$OSA = Ost \cdot dA \cdot L \quad (45)$$

Accordingly, when the concentration Cgin,i of a chemical species flowing into the catalyst unit is given as a boundary condition, the oxygen storage amount OSA of each block (specific region) can be sequentially obtained by use of Expression (45), from a block (specific region) at the upstream end of the catalyst unit, whereby the distribution of oxygen storage amount within the catalyst unit can be accurately estimated. Further, when the oxygen storage amounts OSA of the respective blocks are totaled through the entire catalyst unit, the oxygen storage amount of the entire catalyst unit can be accurately estimated as well.

Next, a specific example of a method for obtaining concentrations Cgout,O2, Cgout,CO, Cgout,HC, and Cgout, NO of oxygen $O_2$, carbon monoxide CO, hydrocarbons HC, and nitrogen oxides (here, nitrogen monoxide) NO in an actual catalyst unit will be described by use of flowcharts. In this example as well, a three-way reaction, which is a redox reaction at the catalyst unit, is assumed to end instantaneously and completely; and attention is paid to an oxygen storing or releasing reaction which occurs, depending on the resultant excess or deficiency of oxygen.

Figure 7:
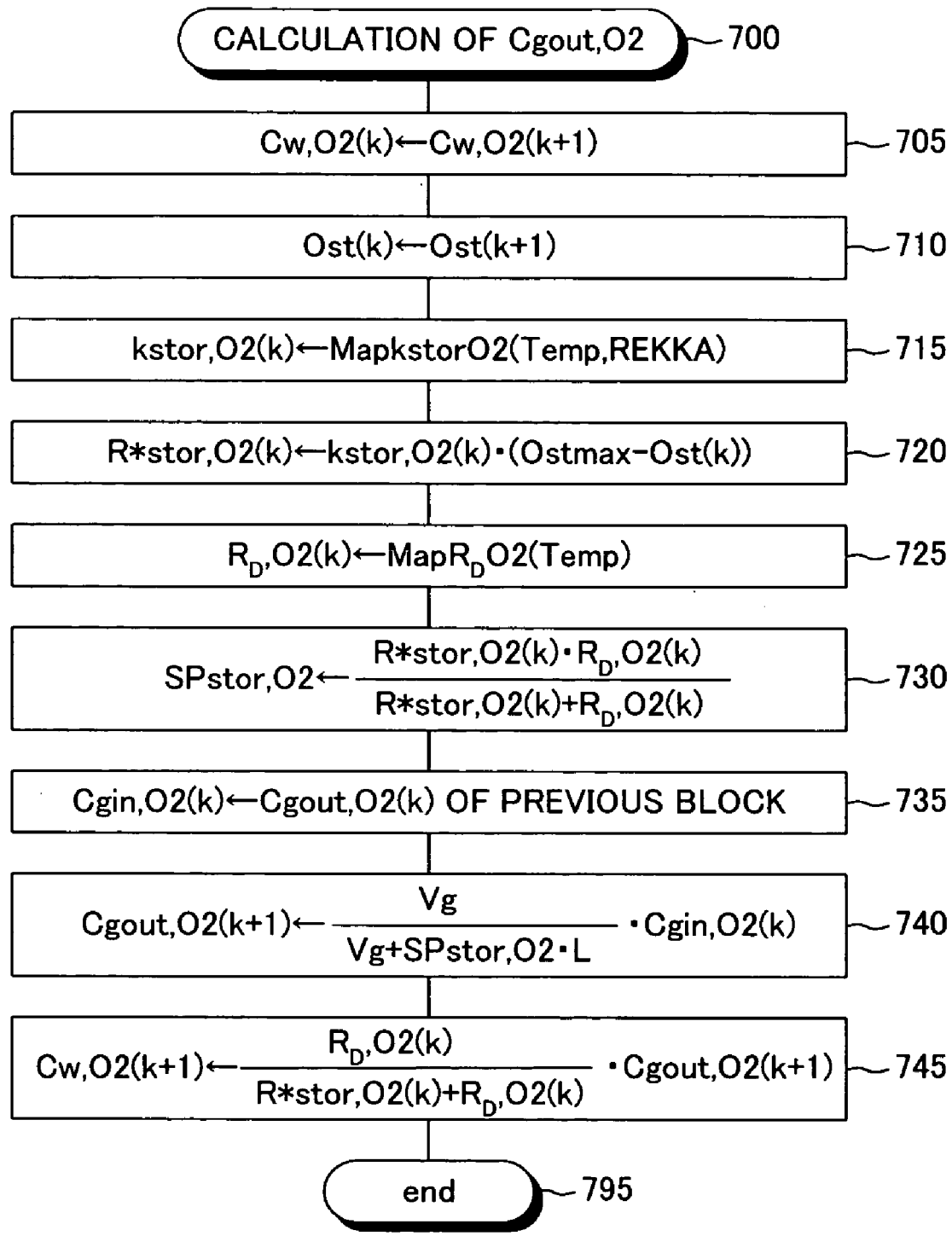
FIG. 7 is a flowchart showing a program for obtaining the concentration of oxygen in exhaust gas in accordance with the estimation model of the present invention.

Every time a predetermined period time elapses, the CPU of the ECU 18 executes programs depicted by a series of flowcharts of FIGS. 7 to 11, from the program shown in FIG. 7. These programs are dedicated for one block I among a number of blocks (specific regions) of the catalyst unit 19; and the CPU concurrently executes completely identical programs for other blocks in parallel.

When a predetermined timing is reached, the CPU starts processing from step 700 of FIG. 7, and proceeds to step 705 in order to store an oxygen concentration Cw,O2(k+1) of the coating layer calculated in step 745 (to be described later) during the previous execution of the present program, as Cw,O2(k), which is a present value (value for this time) of the oxygen concentration Cw,O2 of the coating layer. In subsequent step 710, the CPU stores an oxygen storage density Ost(k+1) calculated in step 1125 of FIG. 11 (to be described later) during the previous execution of the present program, as Ost(k), which is a present value (value for this time) of the oxygen storage density Ost.

Subsequently, in step 715, the CPU determines an oxygen storage rate coefficient kstor,O2(k) on the basis of the temperature Temp of the catalyst unit 19 and a degradation index value REKKA indicating the degree of degradation of the catalyst unit 19, with reference to a map (lookup table) MapkstorO2 shown in FIG. 12.

The catalyst temperature Temp may be detected by use of the temperature sensor 21, or may be estimated on the basis of operating conditions of the engine 1 (e.g., intake air amount Ga and engine rotation speed NE).

The degradation index value REKKA is a value obtained from the maximum oxygen storage amount Cmax of the catalyst unit 19 (e.g., a monotonously increasing function of the maximum oxygen storage amount Cmax). The maximum oxygen storage amount Cmax is obtained as follows. That is, in the case where the engine 1 is operated in a predetermined steady state, when the downstream sensor 26 detects a lean-side air-fuel ratio with respect to the stoichiometric air-fuel ratio, the CPU maintains the air-fuel ratio of gas flowing into the catalyst unit 19 at a predetermined rich-side air-fuel ratio so as to completely consume oxygen stored in the catalyst unit 19.

As a result, the downstream sensor 26 outputs a value corresponding to a rich-side air-fuel ratio with respect to the stoichiometric air-fuel ratio, instead of a value corresponding to a lean-side air-fuel ratio with respect to the stoichiometric air-fuel ratio. At that time, t1, the CPU sets the air-fuel ratio of the gas flowing into the catalyst unit 19 to a predetermined lean-side air-fuel ratio, and obtains the amount of oxygen contains in the gas flowing into the catalyst unit 19 on the basis of the following Expressions (46) and (47) by time t2 at which the downstream sensor 26 outputs a value corresponding to a lean-side air-fuel ratio with respect to the stoichiometric air-fuel ratio, instead of a value corresponding to a rich-side air-fuel ratio with respect to the stoichiometric air-fuel ratio. The cumulated value O2storage (=Cmax1) obtained from Expression (47) is employed as the maximum oxygen storage amount Cmax.

$$\Delta O_2 = 0.23\ Gf \cdot (AF - AFstoich) \tag{46}$$

0.23: the weight ratio of oxygen in the air
AF: the air-fuel ratio of exhaust gas flowing into the catalyst unit 19 (air-fuel ratio detected by the air-fuel ratio sensor 25)
AFstoich: the theoretical air-fuel ratio (ideal air-fuel ratio, stoichiometric air-fuel ratio)
Gf: the mass of fuel supplied per unit time $$O2storage = \Sigma \Delta O_2 \text{(cumulative period: } t1-t2) \tag{47}$$

Notably, the CPU may obtain the maximum oxygen storage amount Cmax in the following manner. After time t2, the CPU maintains the air-fuel ratio of gas flowing into the catalyst unit 19 at a predetermined rich-side air-fuel ratio. Subsequently, by time t3 at which the downstream sensor 26 outputs a value corresponding to a rich-side air-fuel ratio with respect to the stoichiometric air-fuel ratio in place of a value corresponding to a lean-side air-fuel ratio with respect to the stoichiometric air-fuel ratio, the CPU obtains a deficient amount per unit time of oxygen contained in the gas flowing into the catalyst unit 19 by use of an expression similar to the above-mentioned Expression (46), cumulates the oxygen deficient amount per unit time over the period from t2 to t3 by use of an expression similar to the above-mentioned Expression (47), and employs the thus-obtained cumulative value Cmax2 as the maximum oxygen storage amount Cmax. Alternatively, the CPU employs the average of the maximum oxygen storage amount Cmax1 and the maximum oxygen storage amount Cmax2 as the maximum oxygen storage amount Cmax.

Subsequently, in step 720, the CPU obtains a consumption rate constant R*stor,O2(k) for oxygen in accordance with the expression described in the block of step 720 (see the above-described Expression (36)). Notably, although the maximum oxygen storage density Ostmax used in step 720 may be a constant value, it is desirably determined in accordance with the above-described catalyst degradation index value REKKA (or the maximum oxygen storage amount Cmax) (this applies to the following description). Subsequently, in step 725, the CPU determines an apparent diffusion rate $R_D$,O2(k) from the catalyst temperature Temp and the map $MapR_D$O2.

In subsequent step 730, the CPU obtains a reaction rate determining factor SPstor,O2 for oxygen in accordance with the expression described in the block of step 730 (see the above-described Expression (29)). In step 735, the CPU fetches a concentration Cgout,O2(k) of oxygen flowing out of a block I-1, which precedes (is located upstream of) the block I which the present program handles, as a concentration Cgin,O2(k) of oxygen flowing into the block I.

When the currently handled block I is the furthest upstream block of the catalyst unit 19, no previous block I-1 is present. Therefore, Cgout,O2(k) of the previous block in step 735 is an oxygen concentration Cgin,O2 of the gas flowing into the catalyst unit 19. This oxygen concentration Cgin,O2 of the gas flowing into the catalyst unit 19 can be obtained by use of a function fO2 based on the air-fuel ratio A/F of the gas flowing into the catalyst unit 19 and the flow rate of the gas. The right side of the following Expression (48) is a specific example of the function fO2.

$$Cgin,O2 = kgmol \cdot 0.23\ (Ga+Gf) \cdot (AF - AFstoich)/(1+AF) \tag{48}$$

where the symbols and constant in Expression (48) are as follows.
kgmol: a coefficient for converting mass to number of mols
0.23: the weight ratio of oxygen in the air
AF: the air-fuel ratio of exhaust gas flowing into the catalyst unit 19 (air-fuel ratio detected by the air-fuel ratio sensor 25)
AFstoich: the theoretical air-fuel ratio (ideal air-fuel ratio, stoichiometric air-fuel ratio)
Ga: the mass of air taken in per unit time
(the flow rate of intake air measured by the air flow meter 13)
Gf: the mass of fuel supplied per unit time The process of deriving the above-described Expression (48) will be described briefly. The air-fuel ratio AF of the exhaust gas flowing into the catalyst unit 19 is represented by Ga/Gf. When the mass of air required to attain the stoichiometric air-fuel ratio for Gf is represented by Gastoich, the stoichiometric air-fuel ratio AFstoich is represented by Gastoich/Gf. Meanwhile, in the case where the air-fuel ratio becomes AF when the supplied fuel mass is Ga, the mass of excess air with respect to the mass of air required to attain the stoichiometric air-fuel ratio AFstoich is represented by Ga-Gastoich. Therefore, when the mass of oxygen is represented by MassO2, the following Expression (49) is obtained, and the above-described Expression (48) is obtained from Expression (49).

$$\begin{aligned} MassO2 &= 0.23 \cdot (Ga - Gastoich) \\ &= 0.23 \cdot (Gf \cdot AF - Gf \cdot AFstoich) \\ &= 0.23 \cdot (Ga+Gf) \cdot \frac{Gf \cdot AF - Gf \cdot AFstoich}{Ga+Gf} \\ &= 0.23 \cdot (Ga+Gf) \cdot \frac{AF - AFstoich}{(Ga+Gf)/Gf} \end{aligned} \tag{49}$$

Subsequently, the CPU proceeds to step 740 so as to obtain Cgout,O2(k+1) in accordance with the expression described in the block of step 740 (see the above-described Expression (30)). The value Vg is a flow rate of intake air detected by the air flow meter 13. As described above, in step 740, the CPU newly calculates the concentration Cgout, O2 of oxygen flowing out of the block I currently being handled. Subsequently, the CPU proceeds to step 745 so as to obtain Cw,O2(k+1) in accordance with the expression described in the block of step 745 (see the above-described Expression (28)). That is, in step 745, the CPU newly calculates the oxygen concentration Cw,O2 in the coating layer of the block I presently being handled, and then proceeds to step 800 shown in FIG. 8 via step 795. In this manner, the program shown by FIG. 7 constitutes means for estimating the oxygen concentration of the exhaust gas phase in the specific region I and means for estimating the oxygen concentration in the coating layer.

Subsequently, the CPU proceeds from step 800 to step 805 in order to store a carbon monoxide concentration Cw,CO(k+1) of the coating layer calculated in step 840 (to be described later) during the previous execution of the present program, as Cw,CO(k), which is a present value (value for this time) of the carbon monoxide concentration Cw,CO of the coating layer.

Figure 12:
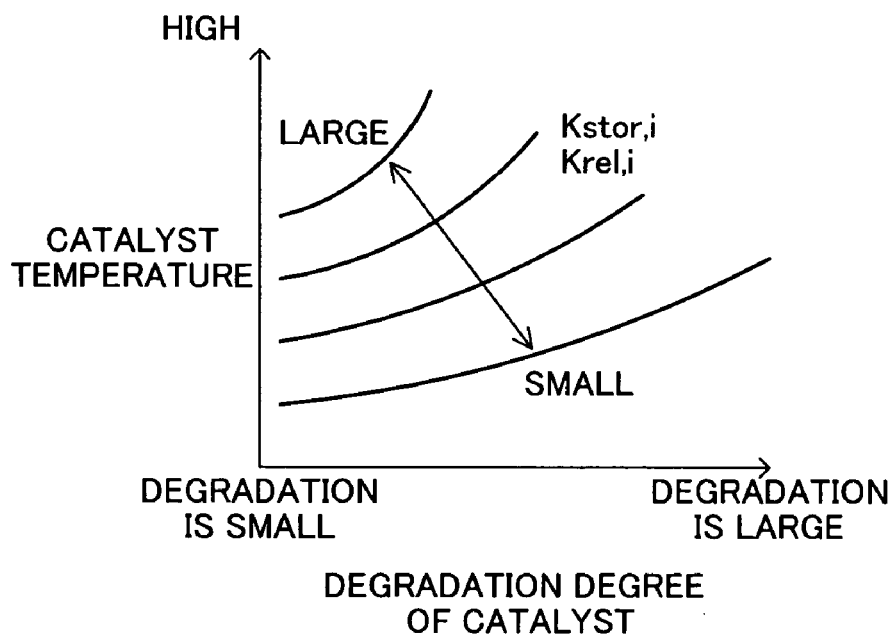
FIG. 12 is a map for obtaining coefficients Kstor,i and Krel,i from catalyst degradation (deterioration) level and catalyst temperature.

Subsequently, in step 810, the CPU determines a coefficient krel,CO(k) from the temperature Temp of the catalyst unit 19 and the degradation index value REKKA of the catalyst unit 19, with reference to a map MapkrelCO as shown in FIG. 12. Subsequently, in step 815, the CPU obtains a consumption rate constant R*reduc,CO(k) in accordance with the expression described in the block of step 815 (see the above-described Expression (38)). Subsequently, in step 820, the CPU determines an apparent diffusion rate $R_D$,CO(k) from the catalyst temperature Temp and the map MapR$_D$CO.

In subsequent step 825, the CPU obtains a reaction rate determining factor SPreduc,CO for carbon monoxide in accordance with the expression described in the block of step 825 (see the above-described Expression (33)). In step 830, the CPU fetches a concentration Cgout,CO(k) of carbon monoxide flowing out of the block I-1, which precedes (is located upstream of) the block I which the present program handles, as a concentration Cgin,CO(k) of carbon monoxide flowing into the block I.

Figure 13:
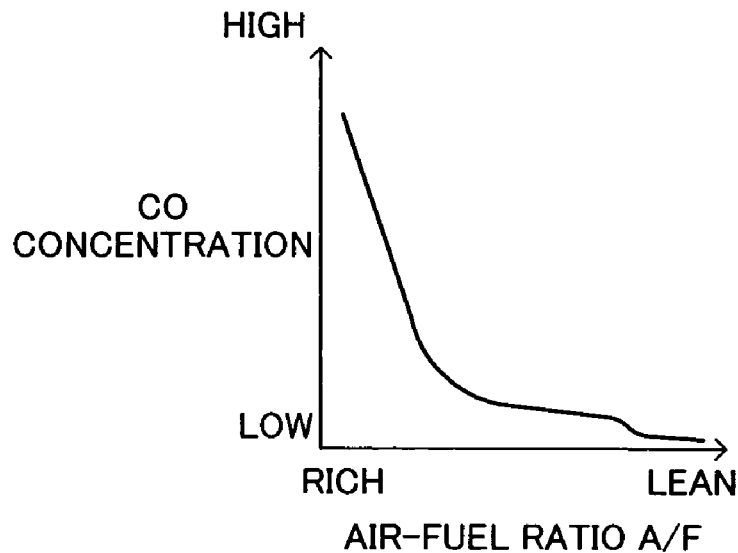
FIG. 13 is a map (table) which defines the relation between exhaust air-fuel ratio and carbon monoxide concentration and which is used to determine the concentration of carbon monoxide flowing into the emission purifying catalyst unit.

When the currently handled block I is the furthest upstream block of the catalyst unit 19, no previous block I-1 is present. Therefore, Cgout,CO(k) of the previous block in step 830 is a carbon monoxide concentration Cgin,CO of the gas flowing into the catalyst unit 19, which can be obtained on the basis of a map shown in FIG. 13 defining the relation between air-fuel ratio A/F of the gas flowing into the catalyst unit 19 and carbon monoxide concentration Cgin,CO.

Here, the relation between air-fuel ratio A/F of the gas flowing into the catalyst unit and carbon monoxide concentration Cgin,CO is previously obtained through an experiment, and the above-described carbon monoxide concentration Cgin,CO is obtained on the basis of this relation and an actual air-fuel ratio A/F of the gas flowing into the catalyst unit. However, the carbon monoxide concentration Cgin,CO can be obtained more accurately by an alternative method in which in addition to the relation between carbon monoxide concentration Cgin,CO and air-fuel ratio A/F, the relation between carbon monoxide concentration Cgin,CO and at least one relevant parameter, such as ignition timing, cooling water temperature of the engine 1, and flow rate of gas flowing into the catalyst unit (rate equal to the flow rate of intake air detected by the air flow meter 13), is previously obtained through an experiment, and the above-described carbon monoxide concentration Cgin,CO is obtained on the basis of this relation and an actual value of the parameter.

Subsequently, the CPU proceeds to step 835 so as to obtain Cgout,CO(k+1) in accordance with the expression described in the block of step 835 (see the above-described Expression (34)). That is, the CPU newly calculates the concentration Cgout,CO of carbon monoxide flowing out of the block I currently being handled. Subsequently, the CPU proceeds to step 840 so as to obtain Cw,CO(k+1) in accordance with the expression described in the block of step 840 (see the above-described Expression (32)). That is, in step 840, the CPU newly calculates the carbon monoxide concentration Cw,CO in the coating layer of the block I presently being handled, and then proceeds to step 900 shown in FIG. 9 via step 895. In this manner, the program shown by FIG. 8 constitutes means for estimating the carbon monoxide concentration of the exhaust gas phase in the specific region I and means for estimating the carbon monoxide concentration in the coating layer.

Figure 8:
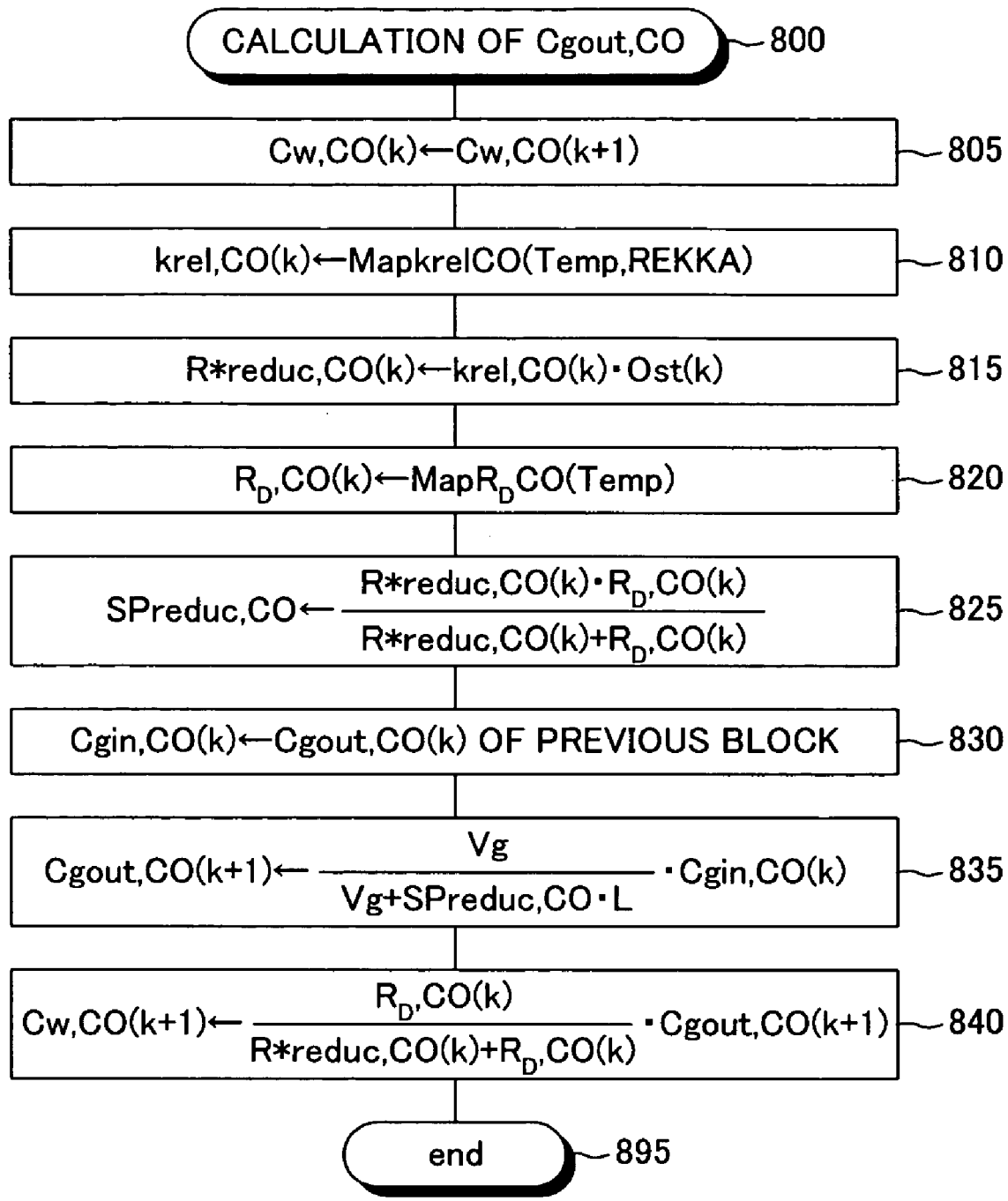
FIG. 8 is a flowchart showing a program for obtaining the concentration of carbon monoxide in exhaust gas in accordance with the estimation model of the present invention.
Figure 9:
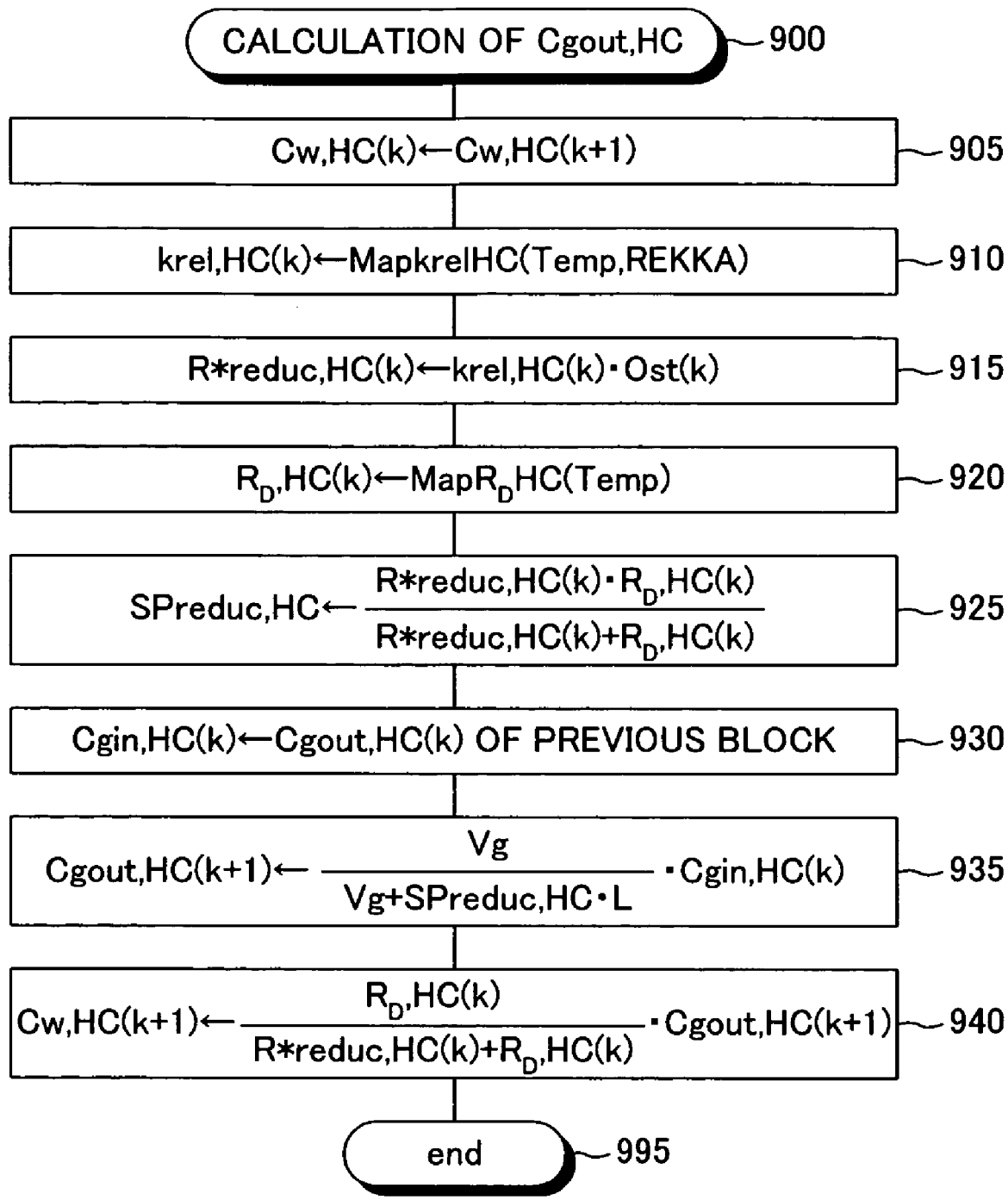
FIG. 9 is a flowchart showing a program for obtaining the concentration of hydrocarbon in exhaust gas in accordance with the estimation model of the present invention.

The program shown in FIG. 9 is a program for performing calculations in relation to hydrocarbons HC, and is similar to the previously described program of FIG. 8 for performing calculations in relation to carbon monoxide CO.

Briefly, the CPU proceeds from step 900 to step 905 in order to store a carbon monoxide concentration Cw,HC(k+1) of the coating layer calculated in step 940 (to be described later) during the previous execution of the present program, as Cw,HC(k), which is a present value (value for this time) of the carbon monoxide concentration Cw,HC of the coating layer.

Subsequently, in step 910, the CPU determines a coefficient krel,HC(k) from the temperature Temp of the catalyst unit 19 and the degradation index value REKKA of the catalyst unit 19, with reference to a map MapkrelHC as shown in FIG. 12. Subsequently, in step 915, the CPU obtains a consumption rate constant R*reduc,HC(k) in accordance with the expression described in the block of step 915 (see the above-described Expression (38)). Subsequently, in step 920, the CPU determines an apparent diffusion rate $R_D$,HC(k) from the catalyst temperature Temp and the map MapR$_D$HC.

Figure 14:
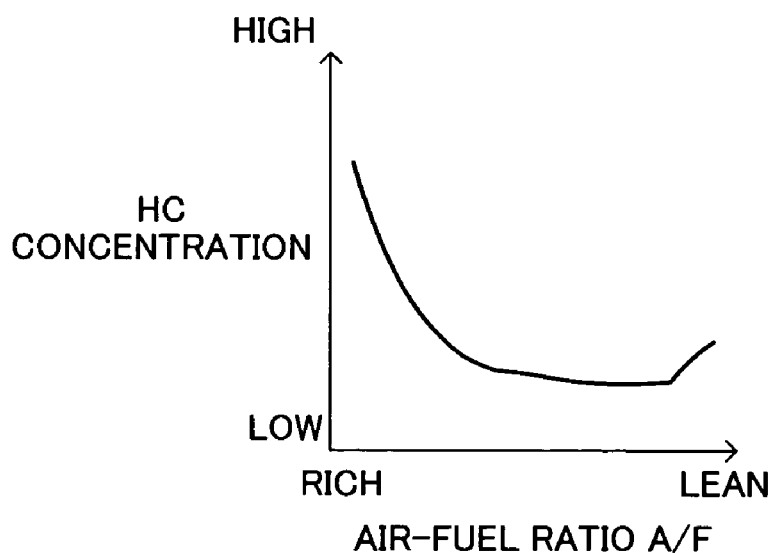
FIG. 14 is a graph showing the relation between exhaust air-fuel ratio and concentration of hydrocarbon flowing into the emission purifying catalyst unit.
Figure 15:
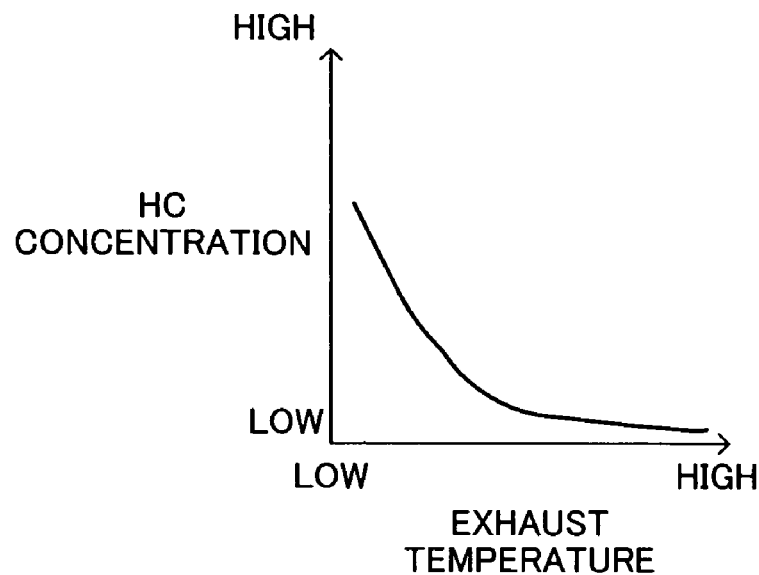
FIG. 15 is a graph showing the relation between exhaust temperature and concentration of hydrocarbon flowing into the emission purifying catalyst unit.

In subsequent step 925, the CPU obtains a reaction rate determining factor SPreduc,HC for hydrocarbon in accordance with the expression described in the block of step 925 (see the above-described Expression (33)). In step 930, the CPU fetches a concentration Cgout,HC(k) of hydrocarbon flowing out of the block I-1, which precedes (is located upstream of) the block I which the present program handles, as a concentration Cgin,HC(k) of hydrocarbon flowing into the block I, When the currently handled block I is the furthest upstream block of the catalyst unit 19, no previous block I-1 is present. Therefore, Cgout,HC(k) in step 930 is a hydrocarbon concentration Cgin,HC of the gas flowing into the catalyst unit 19. The air-fuel ratio A/F of the gas flowing into the catalyst unit 19 and the hydrocarbon concentration Cgin,HC have a relation as shown by the graph of FIG. 14; and the exhaust temperature of the engine 1 and the hydrocarbon concentration Cgin,HC have a relation as shown by the graph of FIG. 15. Therefore, the relation among air-fuel ratio A/F of the gas flowing into the catalyst unit 19, exhaust temperature of the engine 1, and hydrocarbon concentration Cgin,HC is previously obtained through experiments, and is stored in the form of a map. The CPU obtains the above-mentioned hydrocarbon concentration Cgin,HC from an actual air-fuel ratio A/F of the gas, an actual exhaust temperature of the engine 1, and the map.

Notably, the above-mentioned hydrocarbon concentration Cgin,HC can be obtained more accurately by an alternative method in which in addition to the relation between hydrocarbon concentration Cgin,HC and air-fuel ratio A/F and exhaust temperature of the engine 1, the relation between hydrocarbon concentration Cgin,HC and at least one relevant parameter, such as ignition timing, cooling water temperature of the engine 1, and flow rate of gas flowing into the catalyst unit (rate equal to the flow rate of intake air detected by the air flow meter 13), is previously obtained through an experiment, and the above-described hydrocarbon concentration Cgin,HC is obtained on the basis of this relation and an actual value of the parameter.

Subsequently, the CPU proceeds to step 935 so as to obtain Cgout,HC(k+1) in accordance with the expression described in the block of step 935 (see the above-described Expression (34)). That is, the CPU newly calculates the concentration Cgout,HC of carbon monoxide flowing out of the block I currently being handled. Subsequently, the CPU proceeds to step 940 so as to obtain Cw,HC(k+1) in accordance with the expression described in the block of step 940 (see the above-described Expression (32)). That is, in step 940, the CPU newly calculates the carbon monoxide concentration Cw,HC in the coating layer of the block I presently being handled, and then proceeds to step 1000 shown in FIG. 10 via step 995. In this manner, the program shown by FIG. 9 constitutes means for estimating the hydrocarbon concentration of the exhaust gas phase in the specific region I and means for estimating the hydrocarbon concentration in the coating layer.

Figure 10:
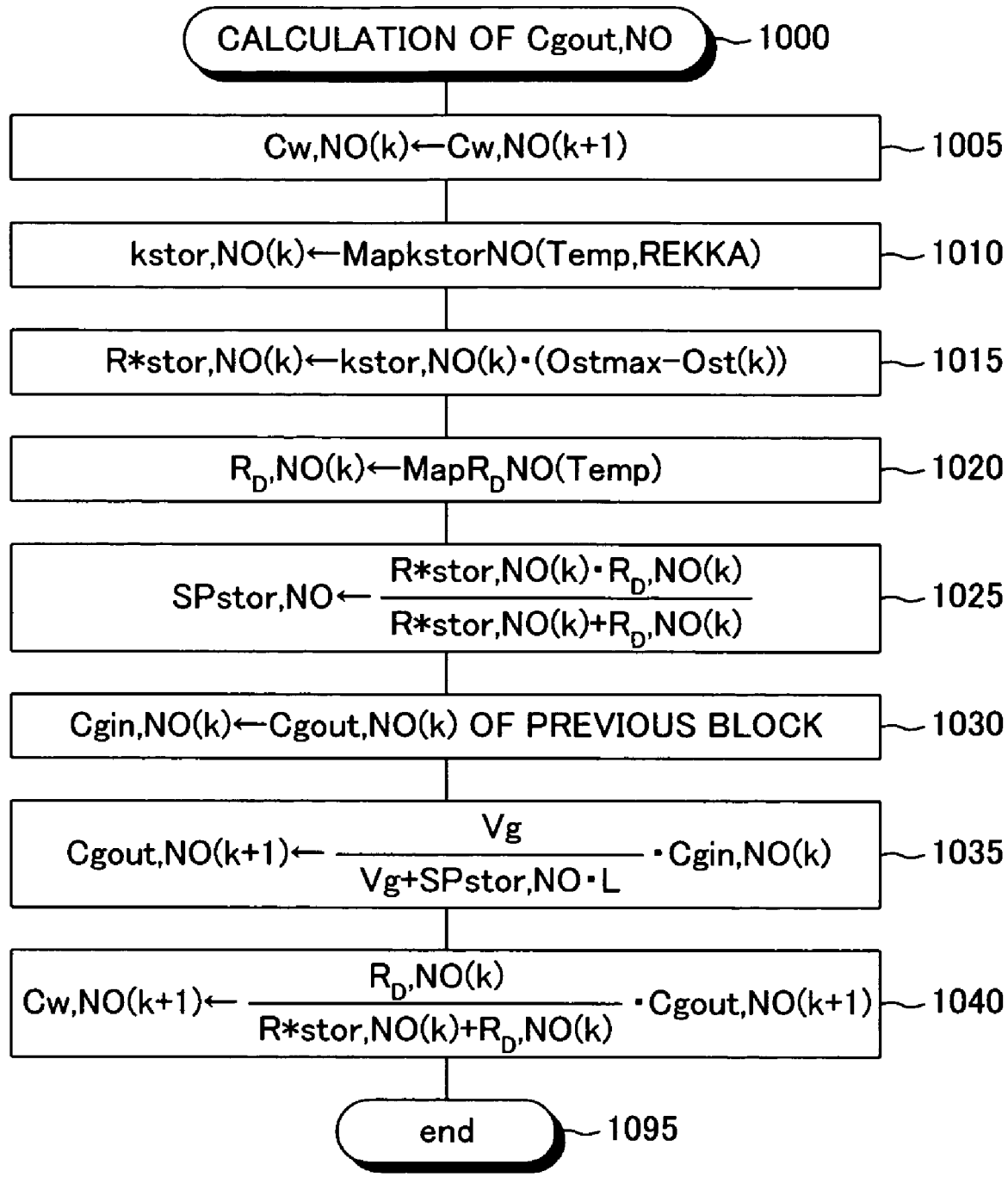
FIG. 10 is a flowchart showing a program for obtaining the concentration of nitrogen oxide (nitrogen monoxide) in exhaust gas in accordance with the estimation model of the present invention.

The program shown in FIG. 10 is a program for performing calculations in relation to nitrogen oxides (here, nitrogen monoxide NO is selected as a representative nitrogen oxide), the calculations being similar to those performed by the programs shown in FIGS. 7 to 9.

Briefly, the CPU proceeds from step 1000 to step 1005 in order to store a nitrogen monoxide concentration Cw,NO(k+1) of the coating layer calculated in step 1040 (to be described later) during the previous execution of the present program, as Cw,NO(k+1), which is a present value (value for this time) of the nitrogen monoxide concentration Cw,NO of the coating layer.

Subsequently, in step 1010, the CPU determines an oxygen storage rate coefficient kstor,NO(k) from the temperature Temp of the catalyst unit 19 and the degradation index value REKKA of the catalyst unit 19, with reference to a map Mapkstor NO as shown in FIG. 12. Subsequently, in step 1015, the CPU obtains a consumption rate constant R*stor,NO(k) in accordance with the expression described in the block of step 1015 (see the above-described Expression (36)). Subsequently, in step 1020, the CPU determines an apparent diffusion rate $R_D$,NO(k) from the catalyst temperature Temp and the map Map$R_D$NO.

In subsequent step 1025, the CPU obtains a reaction rate determining factor SPstor,NO for nitrogen monoxide in accordance with the expression described in the block of step 1025 (see the above-described Expression (29)). In step 1030, the CPU fetches a concentration Cgout,NO(k) of nitrogen monoxide flowing out of the block I-1, which precedes (is located upstream of) the block I which the present program handles, as a concentration Cgin,NO(k) of nitrogen monoxide flowing into the block I.

Figure 16:
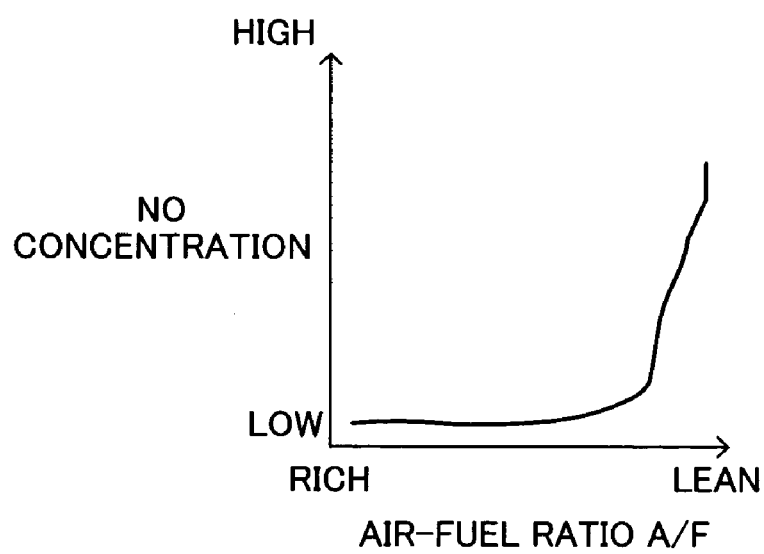
FIG. 16 is a graph showing the relation between exhaust air-fuel ratio and concentration of nitrogen monoxide flowing into the emission purifying catalyst unit.
Figure 17:
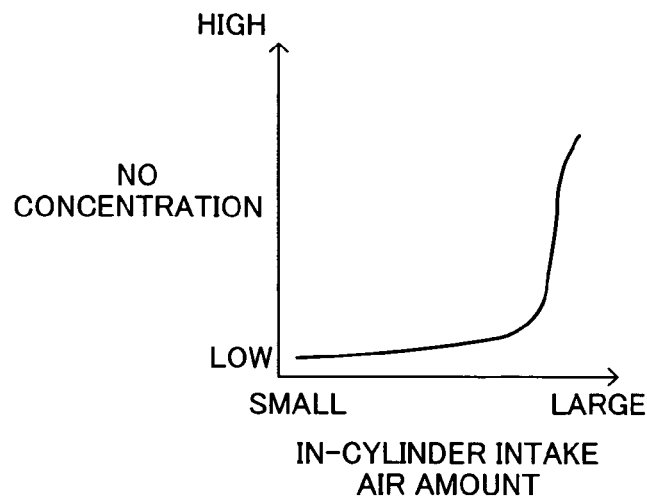
FIG. 17 is a graph defining the relation between in-cylinder intake air amount and concentration of nitrogen monoxide flowing into the emission purifying catalyst unit.

When the currently handled block I is the furthest upstream block of the catalyst unit 19, no previous block is present. Therefore, Cgout,NO(k) of the previous block in step 1030 is a hydrocarbon concentration Cgin,NO of the gas flowing into the catalyst unit 19. The air-fuel ratio A/F of the gas flowing into the catalyst unit 19 and the nitrogen monoxide concentration Cgin,NO have a relation as shown by the graph of FIG. 16; and the intake air flow rate Mc per intake stroke (in-cylinder intake air amount) of a single cylinder of the engine 1 and the nitrogen monoxide concentration Cgin,NO have a relation as shown by the graph of FIG. 17. Therefore, the relation among air-fuel ratio A/F of the gas flowing into the catalyst unit 19, in-cylinder intake air amount, and nitrogen monoxide concentration Cgin,NO is previously obtained through experiments, and is stored in the form of a map. The CPU obtains the above-mentioned nitrogen monoxide concentration Cgin,NO from an actual air-fuel ratio A/F of the gas, an actual in-cylinder intake air amount, and the map.

Notably, the above-mentioned nitrogen monoxide concentration Cgin,NO can be obtained more accurately by an alternative method in which in addition to the relation between nitrogen monoxide concentration Cgin,NO and air-fuel ratio A/F and in-cylinder intake air amount, the relation between nitrogen monoxide concentration Cgin,NO and at least one relevant parameter, such as ignition timing, cooling water temperature of the engine 1, and flow rate of gas flowing into the catalyst unit (rate equal to the flow rate of intake air detected by the air flow meter 13), is previously obtained through an experiment, and the above-described nitrogen monoxide concentration Cgin,NO is obtained on the basis of this relation and an actual value of the parameter.

Subsequently, the CPU proceeds to step 1035 so as to obtain Cgout,NO(k+1) in accordance with the expression described in the block of step 1035 (see the above-described Expression (30)). That is, the CPU newly calculates the concentration Cgout,NO of nitrogen monoxide flowing out of the block I currently being handled. Subsequently, the CPU proceeds to step 1040 so as to obtain Cw,NO(k+1) in accordance with the expression described in the block of step 1040 (see the above-described Expression (28)). That is, in step 1040, the CPU newly calculates the nitrogen monoxide concentration Cw,NO in the coating layer of the block I presently being handled, and then proceeds to step 1100 shown in FIG. 11 via step 1095. In this manner, the program shown by FIG. 10 constitutes means for estimating the nitrogen monoxide concentration of the exhaust gas phase in the specific region I and means for estimating the nitrogen monoxide concentration in the coating layer.

Figure 11:
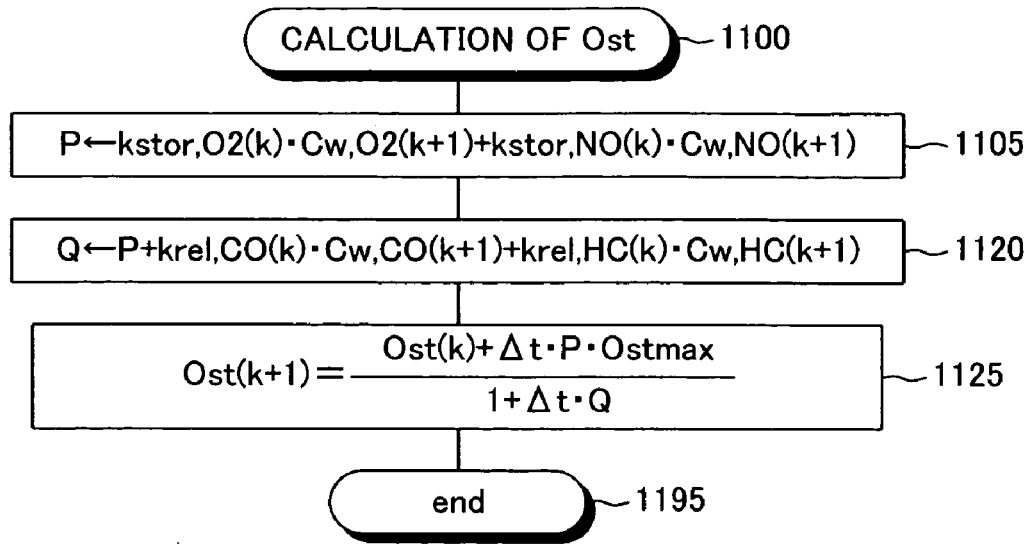
FIG. 11 is a flowchart showing a program for obtaining oxygen storage density in accordance with the estimation model of the present invention.

The program shown in FIG. 11 is used for calculating oxygen storage density (oxygen storage concentration) Ost. Specifically, in step 1105, the CPU obtains a coefficient P in accordance with the expression described in the block of step 1105, which is based on the above-described Expression (43). In subsequent step 1120, the CPU obtains a coefficient Q in accordance with the expression described in the block of step 1120, which is based on the above-described Expression (44). Subsequently, in step 1125, the CPU obtains an oxygen storage density Ost(k+1) in accordance with the expression described in the block of step 1125, which is based on the above-described Expression (42). In subsequent step 1195, the CPU ends the programs shown in FIGS. 7 to 11. Notably, the program of FIG. 11 may be configured in such a manner that the CPU proceeds from step 1125 to step 1195 after obtaining the oxygen storage amount OSA,I of the present block I on the basis of the above-described Expression (45). In this manner, the program of FIG. 11 constitutes oxygen storage density calculation means and oxygen storage amount calculation means.

As described above, the concentration Cgout,i of a chemical species i in the block I presently being handled is obtained, and the above-mentioned upwind scheme is used in order to successively obtain the concentration Cgout,i of the chemical species i in an adjacent block I. Similarly, the oxygen storage density Ost of each block I is obtained, and the oxygen storage amount OSA of each block I is obtained by use of the above-described Expression (45). Further, through cumulation of the oxygen storage amount OSA of each block I from the inlet of the catalyst unit to an arbitrary block K, the cumulated oxygen storage amount OSA,K of the catalyst unit up to the block K is obtained. When the block K is the block at the exit of the catalyst unit, the oxygen storage amount OSAall of the catalyst unit is obtained.

Next, embodiments of control utilizing the above-described air-fuel ratio control apparatus will be described successively.

Figure 18:
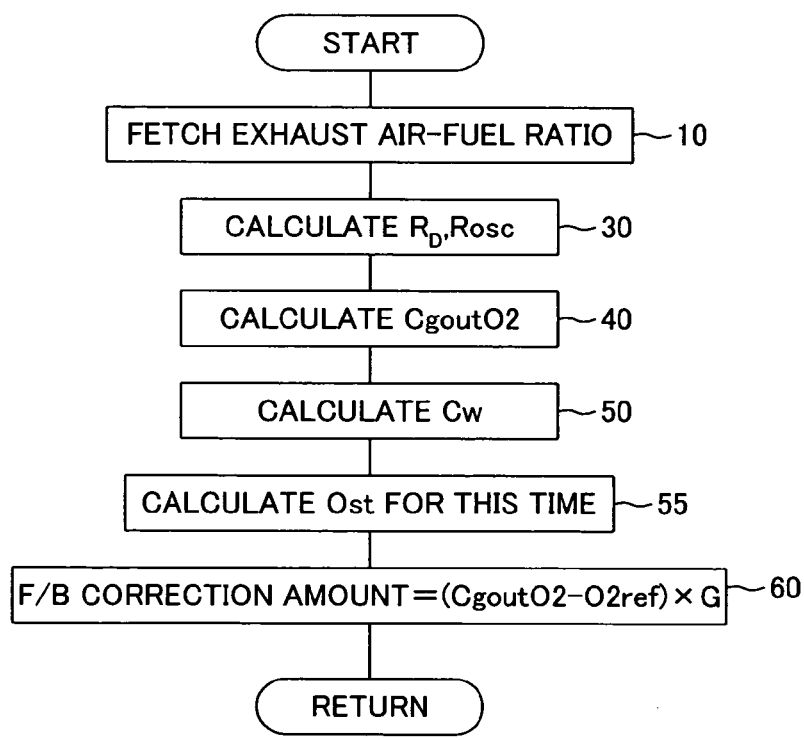
FIG. 18 is a flowchart showing air-fuel ratio control in a first embodiment of the control apparatus of the present invention.

First, a first embodiment will be described with reference to FIG. 18, which shows a control flowchart thereof. In the present embodiment, the amount of oxygen in exhaust gas (in actuality, the concentration of oxygen discharged from the catalyst unit 19) and the amount of carbon monoxide in the exhaust gas (in actuality, the concentration of carbon monoxide discharged from the catalyst unit 19) are obtained as the above-described estimation values. Further, in air-fuel ratio control, oxygen amount is handled as an excess or deficient amount of oxygen. That is, when oxygen is present in an excessive amount, the oxygen amount assumes a positive value, and when oxygen is deficient, the oxygen amount assumes a negative value. Moreover, in the present embodiment, the entirety of the catalyst unit 19 is considered to be a single region (specific region).

In the exhaust gas purification reaction at the catalyst unit 19, oxygen is consumed in order to oxidize a to-be-removed component of the exhaust gas (i.e., to oxidize hydrocarbons HC and carbon monoxide CO, which are unburned fuel). Therefore, when the exhaust gas flowing out of the catalyst unit 19 contains these components to be oxidized, the oxygen amount is regarded to be deficient. That is, the estimation value assumes a negative value. Notably, here, carbon monoxide CO represents unburned components.

In contrast, when oxygen produced as a result of reduction of a to-be-removed component (nitrogen oxide $NO_x$) of the exhaust gas and oxygen contained in the exhaust gas flowing into the catalyst unit 19 cannot be completely stored in the catalyst unit 19 by means of the oxygen storage function (action) of the catalyst unit 19, the oxygen component flows out of the catalyst unit 19. In such a case, the oxygen amount is regarded to be excessive. That is, the estimation value assumes a positive value. Notably, here, oxygen $O_2$ represents components that relate to the oxygen storage function.

The present air-fuel ratio control apparatus performs air-fuel ratio control while using an estimation value regarding oxygen. Specifically, as shown in the flowchart of FIG. 18, in step 10, the CPU of the air-fuel ratio control apparatus obtains the air-fuel ratio of exhaust gas flowing into the catalyst unit 19 (exhaust air-fuel ratio) detected by means of the upstream air-fuel ratio sensor 25; and in the next step, step 30, the CPU calculates Rosc (i.e., R*stor,O2, R*reudc, CO) and $R_D$ ($R_D$,O2, $R_D$,CO)) by use of the previous oxygen storage density Ost (obtained in step 55, which will be described later, during the previous execution of the present program).

At this time, when the air-fuel ratio of the exhaust gas flowing into the catalyst unit 19 is on the lean side with respect to the stoichiometric air-fuel ratio, the following Expression (50) based on the already described Expression (8) is used for calculation of $R_D$, and the following Expression (51) based on the already described Expression (36) is used for calculation of Rosc.

$$R_D, O_2 = Sgeo \cdot h_D, O2 \quad (50)$$

$$Rosc = R^*stor, O2 = kstor, O2 \cdot (Ostmax - Ost) \quad (51)$$

When the air-fuel ratio of the exhaust gas flowing into the catalyst unit 19 is on the rich side with respect to the stoichiometric air-fuel ratio, the following Expression (52) based on the already described Expression (8) is used for calculation of $R_D$, and the following Expression (53) based on the already described Expression (38) is used for calculation of Rosc.

$$R_D, CO \cdot Sgeo \cdot h_D, CO \quad (52)$$

$$Rosc = R^*reduc, CO = krel, CO \cdot Ost \quad (53)$$

Rosc is a function of, for example, temperature. Here, for example, $h_D$ is a function of temperature, and, as shown in FIG. 12, each of ksotr,O2 and krel,CO is a function of temperature and degree of catalyst degradation. The temperature is detected by means of the temperature sensor 21, and Rosc is calculated on the basis of the detected temperature and by use of a map or function formula stored in the ROM of the ECU 18.

In subsequent step 40, the CPU calculates Cgout,O2 (=CgoutO2) by use of the above-described Expression (30) when the air-fuel ratio of the exhaust gas flowing into the catalyst unit 19 is on the lean side with respect to the stoichiometric air-fuel ratio, and Cgout,CO by use of the above-described Expression (34) when the air-fuel ratio of the exhaust gas flowing into the catalyst unit 19 is on the rich side with respect to the stoichiometric air-fuel ratio. When Cgout,CO is obtained, the relation Cgout,O2=−2 Cgout,CO is applied in order to obtain ultimate Cgout,O2.

Further, Cgin,O2 and Cgin,CO are necessary for calculation of Cgout,O2 (Cgout,O2 before replacement with Cgout,CO) and Cgout,CO in step 40. In step 40, Cgin,O2 is obtained from the above-described Expression (48). At this time, when the exhaust air-fuel ratio is on the rich side with respect to the stoichiometric air-fuel ratio, and the Cgin,O2 calculated in accordance with Expression (48) assumes a positive value, that value is employed as Cgin,O2 as it is; and when the Cgin,O2 calculated in accordance with Expression (48) assumes a negative value, ½ of the absolute value of that value is employed as Cgin,CO.

Figure 19:
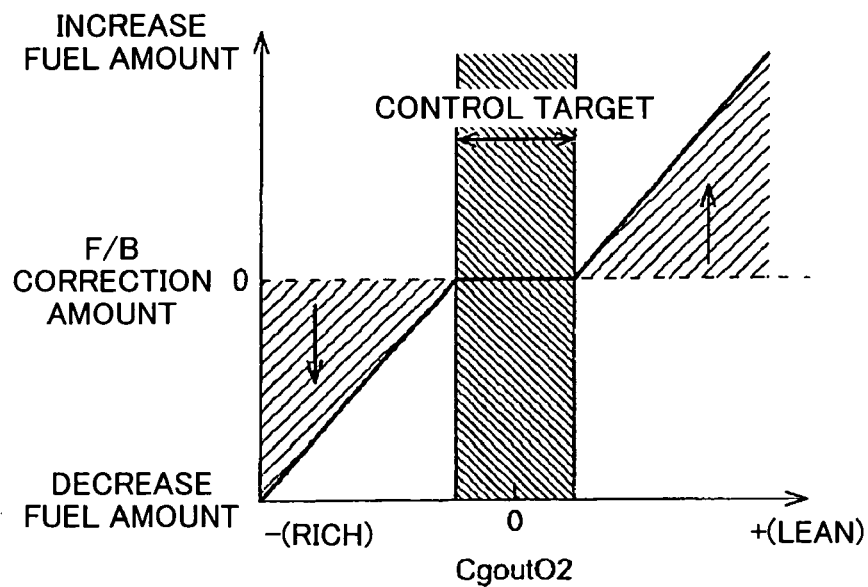
FIG. 19 is a map showing the relation between CgoutO2 and feedback correction amount.

Subsequently, in step 50, the CPU obtains respective chemical species concentrations Cw (Cw,O2, Cw,CO) of the coating layer on the basis of Expressions (28) and (32). In step 55, the CPU calculates Ost (present value (value for this time)) by use of Expressions (42) to (44). In step 60, the CPU calculates a feedback correction amount (F/B correction amount) for air-fuel ratio control from, for example, (Cgout,O2−O2ref·G. Here, O2ref represents a control target (target state), and G represents a control gain. FIG. 19 is a graph showing the relation between Cgout,O2 and F/B correction amount. In the present embodiment, the control target is determined in the form of a predetermined range. The determined F/B correction amount is reflected in the air-fuel ratio control as one of correction coefficients regarding fuel injection amount which determines the air-fuel ratio.

Next, a second embodiment will be described with reference to FIG. 20, which shows a control flowchart thereof. In the present embodiment, rich and lean components of the exhaust gas are used as the above-described estimation values. Further, in the present embodiment, the entirety of the catalyst unit 19 is considered to be a single region (specific region).

The rich component collectively refers to components whose contents in the exhaust gas increase when the exhaust air-fuel ratio is on the rich side, and is one representative value that shows the state of the exhaust gas flowing out of the catalyst unit 19. Specifically, it is a representative value that serves a collective index representing the amounts of CO and HC contained in the exhaust gas. Meanwhile, the lean component collectively refers to components whose contents in the exhaust gas increase when the exhaust air-fuel ratio is on the lean side, and is one representative value that shows the state of the exhaust gas flowing out of the catalyst unit 19. Specifically, it is a representative value that serves a collective index representing the amounts of $NO_x$ and $O_2$ contained in the exhaust gas.

In the present embodiment, air-fuel ratio control is performed by use of the above-described two estimation values, and therefore, Cgout of the rich component is represented by CgoutR as follows.

$$CgoutR = \sum_i Cgout, reduc, i$$

Specifically, CgoutR=Cgout,reduc,CO+Cgout,reduc,HC.

Further, Cgout of the lean component is represented by CgoutL as follows.

$$CgoutL = \sum_i Cgout, stor, i$$

Specifically, CgoutL=Cgout,stor,O$_2$+Cgout,stor,NO. In the present embodiment, the following calculations are performed by use of CgoutR and CgoutL determined in this manner.

Figure 20:
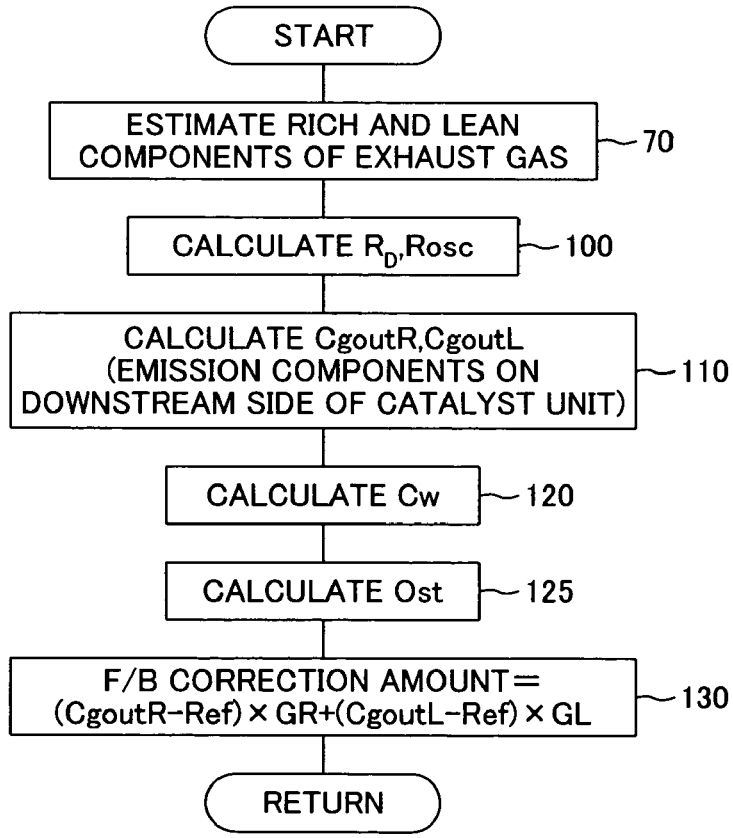
FIG. 20 is a flowchart showing air-fuel ratio control in a second embodiment of the control apparatus of the present invention.

As shown in the flowchart of FIG. 20, in the first step, step 70, the CPU estimates CginR and CginL of the rich and the lean components contained in exhaust gas produced as a result of combustion at the engine 1 (exhaust gas flowing into the catalyst unit 19). In the estimation of the rich component CginR and the lean component CginL, the redox reaction (three-way reaction) and the oxygen storage-release reaction at the catalyst unit 19 are taken into consideration. Chemical formulas relating to the three-way reaction are shown in Expression (54). Further, chemical formulas relating to the oxygen storage-release reaction are shown in Expression (55). Notably, reaction rate coefficients of the respective reactions in the oxygen storage-release reaction are represented by KO2 (=Kstor,O2), KNO (=Kstor,NO), KCO (=Krel,CO), and KHC (=Krel,HC), respectively. In Expression (55) for oxygen storage-release, cerium (Ce) is described as a carrier metal for providing the oxygen storage-release function.

(54)

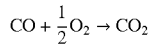

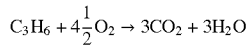

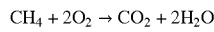

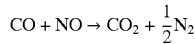

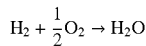

[Storage]  [Reaction rate coefficient] (55)

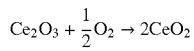  KO2

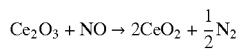  KNO

[Release]

$2CeO_2 + CO \rightarrow Ce_2O_3 + CO_3$  KCO

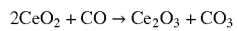  KHC

Subsequently, the CPU proceeds to step 100, and calculates Rosc (i.e., R*star,O2, R*stor,NO, R*reduc,CO, R*reudc,HC) and R$_D$ (i.e., R$_D$,O2, R$_D$,NO, R$_D$,CO, R$_D$,HC) in the same manner as in the first embodiment. In Subsequent step 110, the CPU calculates CgoutR (=Cgout,reduc,CO+Cgout,reduc,HC) by use of the above-described Expression (34), and CgoutL (=Cgout,stor,O2+Cgout,stor,NO) by use of the above-described Expression (30).

Moreover, in step 120, the CPU obtains respective chemical species concentrations Cw (Cw,O2, Cw,NO, Cw,CO, Cw,HC) of the coating layer by use of Expressions (28) and (32). In step 125, the CPU calculates Ost (present value (value for this time)) by use of Expressions (42) to (44). In step 130, the CPU calculates a feedback correction amount (F/B correction amount) for air-fuel ratio control from (CgoutR−Ref)×GR+(CgoutL−Ref)×GL. Here, (CgoutR−Ref)×GR is a portion corresponding to the rich component, and (CgoutL−Ref)×GL is a portion corresponding to the lean component. Ref represents a control target (target state), and GR and GL represent control gains set for the respective components.

The air-fuel ratio control is performed in such a manner that CgoutR and CgoutL become equal to each other. Specifically, FIB correction amounts (CgoutR−Ref)×GR and (CgoutL−Ref)×GL corresponding to the respective components are determined in such a manner that each of CgoutR and CgoutL becomes the target value Ref. Further, in the present embodiment, the control target is determined in the form of a predetermined range. The determined F/B correction amount is reflected in the air-fuel ratio control as one of correction coefficients regarding fuel injection amount, which determines the air-fuel ratio.

Notably, more specifically, the F/B correction amount is determined by the following Expression (56).

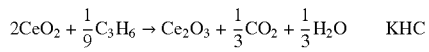 (56)

Next, a third embodiment will be described with reference to FIG. 21, which shows a control flowchart thereof. In the present embodiment, emissions (in actuality, concentrations) of oxygen, carbon monoxide, and nitrogen monoxide contained in exhaust gas are used as the above-described estimation values. Further, in the present embodiment, the entirety of the catalyst unit 19 is considered to be a single region (specific region). In the present embodiment, since air-fuel ratio control is performed by use of the above-mentioned three estimation values, in the following description, Cgout in relation to oxygen emission is represented by CgoutO2 (Cgout,O2), Cgout in relation to carbon monoxide emission is represented by CgoutCO (Cgout,CO), and Cgout in relation to nitrogen monoxide emission is represented by CgoutNO (Cgout,NO).

Figure 21:
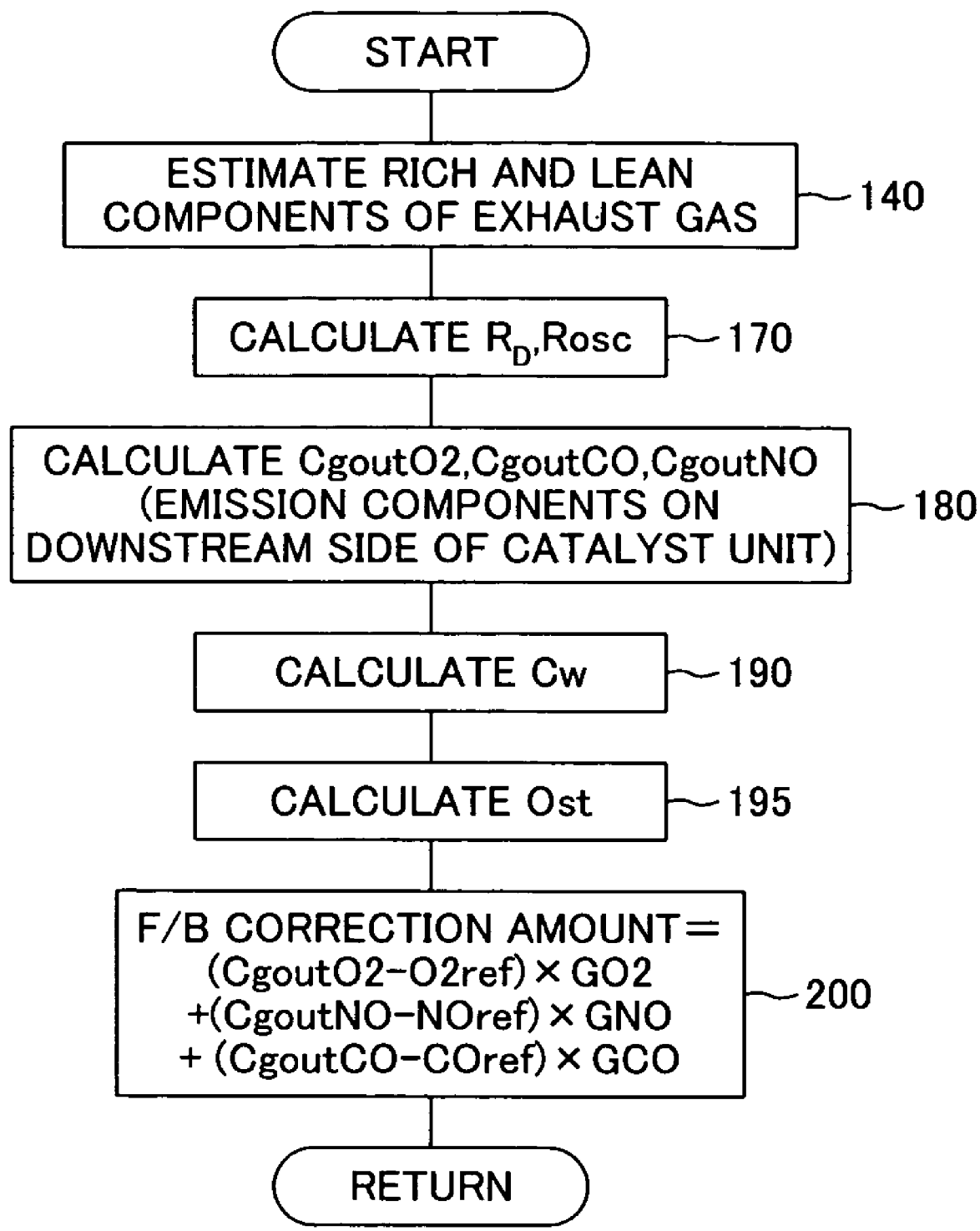
FIG. 21 is a flowchart showing air-fuel ratio control in a third embodiment of the control apparatus of the present invention.

As shown in the flowchart of FIG. 21, in the first step, step 140, the CPU estimates CginR (Cgin,CO) and CginL (Cgin, O2, Cgin,NO) of the rich and lean components contained in exhaust gas produced as a result of combustion at the engine 1 (exhaust gas flowing into the catalyst unit 19) in the above-described manner. In subsequent step 170, the CPU calculates Rosc (i.e., R*stor,O2, R*stor,NO, R*reduc,CO) and R$_D$ (i.e., R$_D$,O2, R$_D$,NO, R$_D$,CO). In subsequent step 180, the CPU calculates CgoutR (Cgout,reduc,CO) by use of the above-described Expression (34), and CgoutL (Cgout, stor,O2=CgoutO2 and Cgout,stor,NO=CgoutNO) by use of the above-described Expression (30).

Moreover, in step 190, the CPU obtains respective chemical species concentrations Cw (Cw,O2, Cw,NO, Cw,CO) of the coating layer by use of Expressions (28) and (32). In step 195, the CPU calculates Ost (present value (value for this time)) by use of Expressions (42) to (44). In step 200, the CPU calculates a feedback correction amount (F/B correction amount) to be fed back to the air-fuel ratio control, from the expression (CgoutO2−O2ref)×GO2+(CgoutNO−NOref)×GNO+(CgoutCO−COref)×GCO. Here, (CgoutO2−O2ref)×GO2 is a portion corresponding to the oxygen component, (CgoutNO−NOref)×GNO is a portion corresponding to the nitrogen monoxide component, and (CgoutCO−COref)×GCO is a portion corresponding to the carbon monoxide component. O2ref, NOref, and COref represent control targets of the respective components. GO2, GNO, and GCO represent control gains set for the respective components. The determined correction amount is reflected in the air-fuel ratio control as one of correction coefficients regarding fuel injection amount, which determines the air-fuel ratio. Notably, in the present embodiment, the control target may be determined in the form of a predetermined range.

Next, a fourth embodiment will be described. In the present embodiment, as in the first embodiment, the amount of oxygen contained in exhaust gas (concentration of oxygen discharged from the catalyst unit 19) is used as the above-described estimation value. However, the estimation value is an estimation value after a predetermined period of time (an estimation value at a point in time which is later than the present time by the predetermined period of time). In order words, in the present embodiment, "look ahead" control is performed. Therefore, the method of estimating the estimation value differs from that used in the first embodiment. The estimation value (oxygen amount) is grasped as an excess-deficient amount; and the entirety of the catalyst unit 19 is considered to be a single region (specific region).

An estimation model (estimation method) similar to that used in the first embodiment is used to estimate the estimation value (exhaust oxygen excess-deficient amount). In the present embodiment, an intake air amount, a fuel amount contributing to combustion, and the like are estimated by use of models. Here, a model regarding the intake air amount is called "air model," and a model regarding the fuel amount is called "fuel behavior model."

Figure 22:
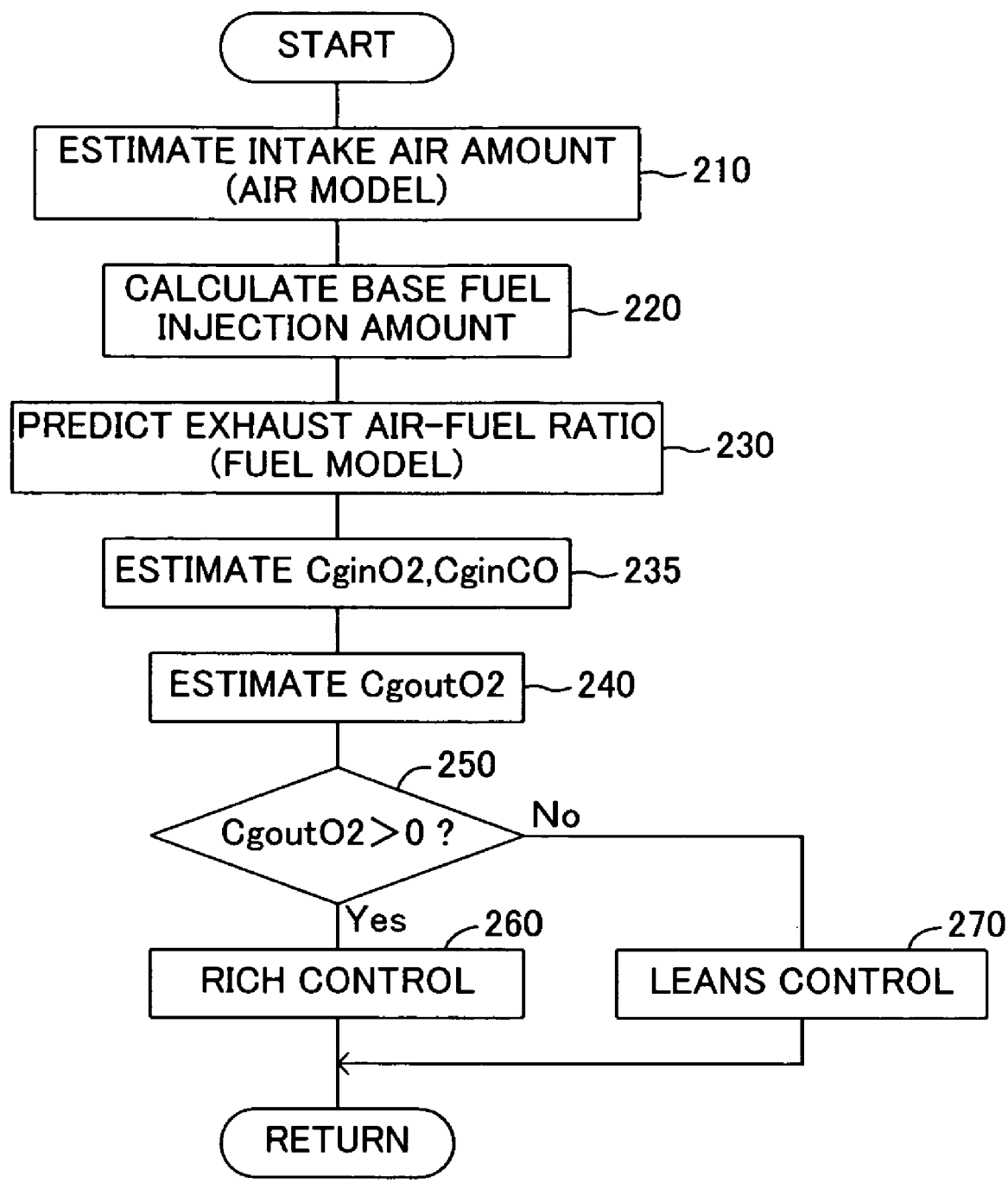
FIG. 22 is a flowchart showing air-fuel ratio control in a fourth embodiment of the control apparatus of the present invention.

FIG. 22 shows a flowchart of control in the fourth embodiment. As shown in the flowchart of FIG. 22, by use the above-described air model the CPU first estimates an intake air amount after a predetermined period of time (step 210). Although detailed description of the air model is omitted here, in one example method, an in-cylinder intake air amount after a predetermined period of time is estimated by use of an output of the air flow meter 13 or an intake pipe internal pressure sensor for detecting the intake air amount, as well as a time-course change in the opening of the throttle valve 9 or a differential or integral value thereof, a time-course change in the engine speed or a differential or integral value thereof, and the like.

Now, one example method for estimating the intake air amount by use of the opening of the throttle valve 9 will be briefly described.

(1) The CPU detects an accelerator opening at the present time by use of the accelerator position sensor 12.
(2) The CPU determines a tentative target throttle valve opening on the basis of the detected accelerator opening at the present time.
(3) The CPU delays the determined tentative target throttle valve opening by a predetermined period of time so as to use it as an actual target throttle valve opening. In other words, a tentative target throttle valve at a point in time which is earlier than the present time by a predetermined period of time is set as an actual target throttle valve opening. The tentative target throttle valve opening is stored in the RAM as time series data until it is used as an actual target throttle valve opening.
(4) The CPU controls the throttle motor 11 in such a manner that the set actual target throttle valve opening coincides with the opening of the throttle valve 9.
(5) The CPU estimates a time length between the present time and a time (intake valve closure time) at which the intake valve of a cylinder that next enters the intake stroke closes; calculates a target throttle valve opening at the intake valve closure time of the cylinder, on the basis of the estimated time length and the tentative target throttle valve opening stored in the RAM; and calculates an estimated throttle valve opening at the intake valve closure time from the target throttle valve opening.
(6) The CPU estimates an amount of intake air (in-cylinder intake air amount) Mc, at the intake valve closure time, of the cylinder that next enters the intake stroke, on the basis of the estimated throttle valve opening, the engine speed, and a map.

Subsequently, the CPU calculates a base fuel injection amount (e.g., an injection amount that is required to render the air-fuel ratio of an air-fuel mixture taken into the engine 1 the stoichiometric air-fuel ratio) in consideration of the results of the estimation in step 210 (step 220). This base fuel injection amount is corrected by use of various correction coefficients so as to determine an ultimate fuel injection amount.

Moreover, the CPU estimates the air-fuel ratio of exhaust gas on the basis of the base fuel injection amount (alternatively, a fuel injection amount determined by correcting the base fuel injection amount) and the fuel behavior model (step 230). Although detailed description of the fuel behavior model is omitted here, in one example method, an exhaust air-fuel ratio is estimated in consideration of not only the base fuel injection amount itself, but also an amount of fuel which adheres to members such as an intake port and a cylinder inner wall, and a amount of fuel that separates from the inner wall.

For example, in accordance with this fuel model, a fuel adhering amount fw(k+1) after fuel has been injected from the injector 5 in an amount fi(k) can be obtained by the following Expression (57).

$$fw(k+1)=R \cdot fi(k)+P \cdot fw(k) \tag{57}$$

In Expression (57), fw(k) represents the amount of fuel already adhering to the intake port, etc. before injection of fuel in an amount fi(k); P represents a remaining ratio; i.e., a ratio of the amount of fuel remaining on the intake port, etc. after a single intake stroke to the amount of fuel already adhering to the intake port, etc.; and R represents a adhering ratio; i.e., a ratio of the amount of fuel that adheres directly to the intake port, etc. to the amount of injected fuel.

Meanwhile, an amount of fuel taken into a combustion chamber (cylinder), of the fuel injection amount fi(k) at the present time, is represented by (1−R)·fi(k), whereas an amount of fuel taken into a combustion chamber (cylinder), of the amount of fuel already adhering (fuel adhering amount) fw(k), is represented by (1−P)·fw(k). That is, by virtue of the fuel injection at this time, fuel is taken in the cylinder in an amount fc(k) shown in the following Expression (58).

$$fc(k)=(1-R)\cdot fi(k)+(1-P)\cdot fw(k) \quad (58)$$

Accordingly, in actuality, fuel of the base injection amount is injected from the injector 5; the base injection amount is substituted for fi(k) of Expression (58) so as to obtain the amount fc(k) of fuel actually taken in the cylinder; and the exhaust air-fuel ratio is estimated by dividing the estimated in-cylinder intake air amount Mc by that fuel amount fc(k). Further, for calculation at the next time, a fuel adhering amount fw(k+1) is obtained by substituting the base injection amount for fi(k) of Expression (57).

Subsequently, the CPU proceeds to step 235, and substitutes the exhaust air-fuel ratio, estimated in the above-mentioned step 230, for AF in the above-described Expression (48) so as to estimate CginO2 (=Cgin,O2) from Expression (48). Further, the CPU estimates the carbon monoxide concentration CginCO on the basis of the exhaust air-fuel ratio estimated in the above-mentioned step 230 and the map shown in FIG. 13 and defining the relation between air-fuel ratio A/F and carbon monoxide concentration CginCO of gas flowing into the catalyst unit. In subsequent step 240, the CPU estimates CgoutO2 in the same manner as that described in the first embodiment. This estimated CgoutO2 is a prediction value that indicates a value of CgoutO2 at a point in time that is later than the present time by a predetermined period of time, because the above-described exhaust air-fuel ratio is a predicted (look-ahead) air-fuel ratio at a point in time that is later than the present time by the predetermined period of time, and therefore, both the values of CginO2 and CginCO are values of CginO2 and CginCO at a point in time that is later than the present time by a predetermined period of time.

In subsequent step 250, the CPU determines whether CgoutO2 is greater than zero. When the result of the determination in step 250 is "Yes," the CPU performs rich control (step 260). When the result of the determination in step 250 is "No," the CPU performs lean control (step 270). In other words, the target state (target value) of CgoutO2 in the present embodiment is 0 (zero), and air-fuel ratio control is performed in such a manner that CgoutO2 becomes zero.

The rich control refers to air-fuel ratio control for correcting the air-fuel ratio (air-fuel ratio of the engine) to the rich side (control for increasing the injection amount), whereas the lean control refers to air-fuel ratio control for correcting the air-fuel ratio to the lean side (control for decreasing the injection amount). In the present embodiment, the correction amount is constant for each control; i.e., each of the rich control and the lean control. Notably, the correction amount may be changed in accordance with the degree of separation between the estimated CgoutO2 and its target state. Moreover, the correction may be performed as follows. A correction coefficient for correcting the air-fuel ratio to the rich side is calculated in step 260; a correction coefficient for correcting the air-fuel ratio to the lean side is calculated in step 270; and processing such as multiplying the base injection amount by these correction coefficients is performed in order to reflect the correction in the fuel injection control.

Next, a fifth embodiment will be described. In the present embodiment as well, so-called "look ahead" control is performed as in the case of the fourth embodiment. Further, in the present embodiment, estimation values are calculated for a plurality of emission components in exhaust gas. Here, these estimation values (specifically, Cgout,O2, Cgout,CO, etc.) are denoted by as Cgout. Similarly, estimation values regarding Cgin are denoted by as Cgin. In the present embodiment as well, the entirety of the catalyst unit 19 is considered to be a single region (specific region).

Figure 23:
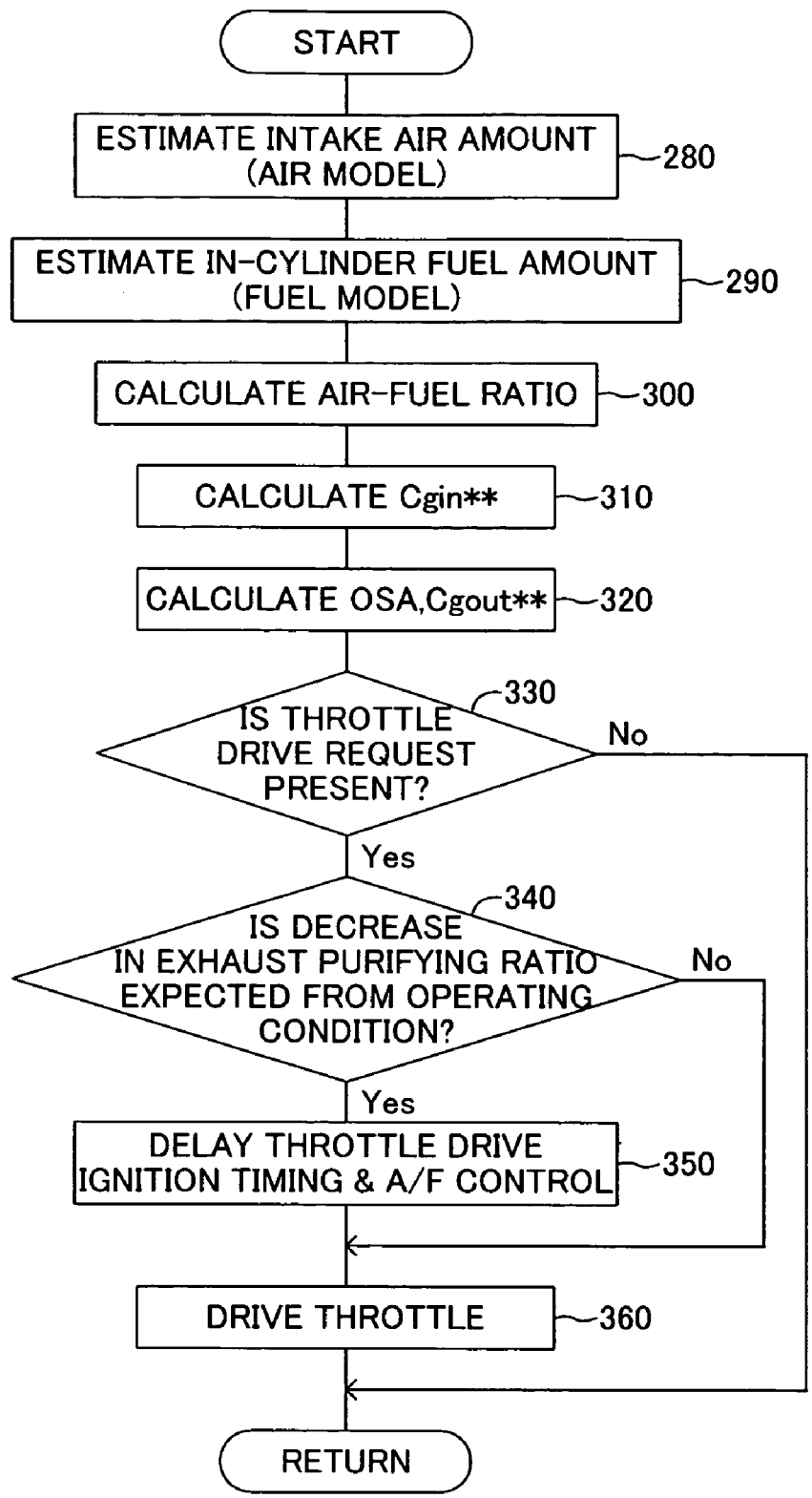
FIG. 23 is a flowchart showing air-fuel ratio control in a fifth embodiment of the control apparatus of the present invention.

FIG. 23 shows a flowchart of control in the fifth embodiment. As shown in the flowchart of FIG. 23, by use the above-described air model the CPU first estimates an intake air amount after a predetermined period of time (step 280). Subsequently, the CPU estimates an amount of fuel which will actually be supplied into the cylinder 3, by use of the above-described fuel behavior model (step 290), and calculates an air-fuel ratio on the basis of the results of steps 280 and 290 (step 300).

Subsequently, the CPU calculates Cgin of each component flowing into the catalyst unit 19 on the basis of the calculated air-fuel ratio (step 310). Further, the CPU estimates Cgout of each component and the oxygen storage amount OSA of the catalyst unit 19 in consideration of reactions occurring in the catalyst unit 19 (step 320). Estimation of Cgin and Cgout is performed by the same method as used in the above-described embodiment. Further, OSA is estimated on the basis of the above-described Expressions (42) to (45).

Subsequently, the CPU predicts whether a condition that is disadvantageous to exhaust purification occurs, on the basis of operating conditions such as a throttle drive request and OSA at that time. The presence/absence of the throttle drive request is determined on the basis of a time-course change in the amount of operation of the accelerator pedal by a driver (accelerator opening) (differential value of the accelerator opening with respect to time). Further, a determination as to whether or not the condition is disadvantageous to exhaust purification is made on the basis of, for example, whether the present time falls within a transition period in which the throttle opening changes sharply. During such a transition period, the oxygen storage state of the catalyst unit 19 tends to become unstable, and the air-fuel ratio control fails to provide correction timely, whereby the exhaust purification ratio is quite likely to decrease. In such a case, through electronic control, the CPU delays the open/close operation of the throttle valve 9 (decreases the speed of the open/close operation) to thereby prevent the to-be-removed component from flowing out to the downstream side of the catalyst unit 19, while a torque insufficiency with respect to a required torque caused by the delay in throttle operation is compensated by means of ignition timing control.

Specifically, the CPU determines whether or not a throttle drive request is present (step 330). When such a throttle drive request is absent, the CPU determines that a condition disadvantageous to exhaust purification hardly occurs, and ends the control shown in the flowchart of FIG. 23. In contrast, when such a throttle drive request is present, the CPU determines whether the exhaust purification ratio is predicted to decrease, on the basis of operating conditions such as OSA at that time, calculated Cgout**, throttle opening prediction value, and time-course change in accelerator opening (step 340). When the CPU determines that in the exhaust purification ratio is predicted not to decrease, the CPU drives the throttle valve 9 in accordance with the drive request (step 360).

In contrast, when the exhaust purification ratio is predicted to decrease, the CPU determines an amount of delay in the throttle drive operation and an amount of torque compensation by means of ignition timing; performs air-fuel ratio control in such a manner that the above-mentioned estimation value Cgout reaches the target state (step 350); and performs throttle drive (step 360). The delay amount of the throttle drive operation is an amount that is required for suppressing sharp changes in throttle valve opening. Specifically, the delay amount is used to obtain an opening with a first-order lag with respect to the above-described actual target throttle valve opening and to use it as an actual throttle valve opening (resetting of the actual throttle valve opening). The correction amount of ignition timing is a correction amount (advancing angle) for compensating a drop in engine torque stemming from the resetting of the actual throttle valve opening. The air-fuel ratio control for bringing the estimation value Cgout into the target state is the same as those in the other embodiments described above.

In each of the above-described embodiments, respective estimation values are calculated, while the entirety of the catalyst unit 19 is considered to be a single region. In contrast, in the following embodiments, the catalyst unit 19 is divided into a plurality of regions (blocks) along the flow direction of exhaust gas; a target state of each estimation value is set for one region (specific region J) among the plurality of regions; and air-fuel ratio control is performed in such a manner that each estimation value reaches the target state.

Figure 24:
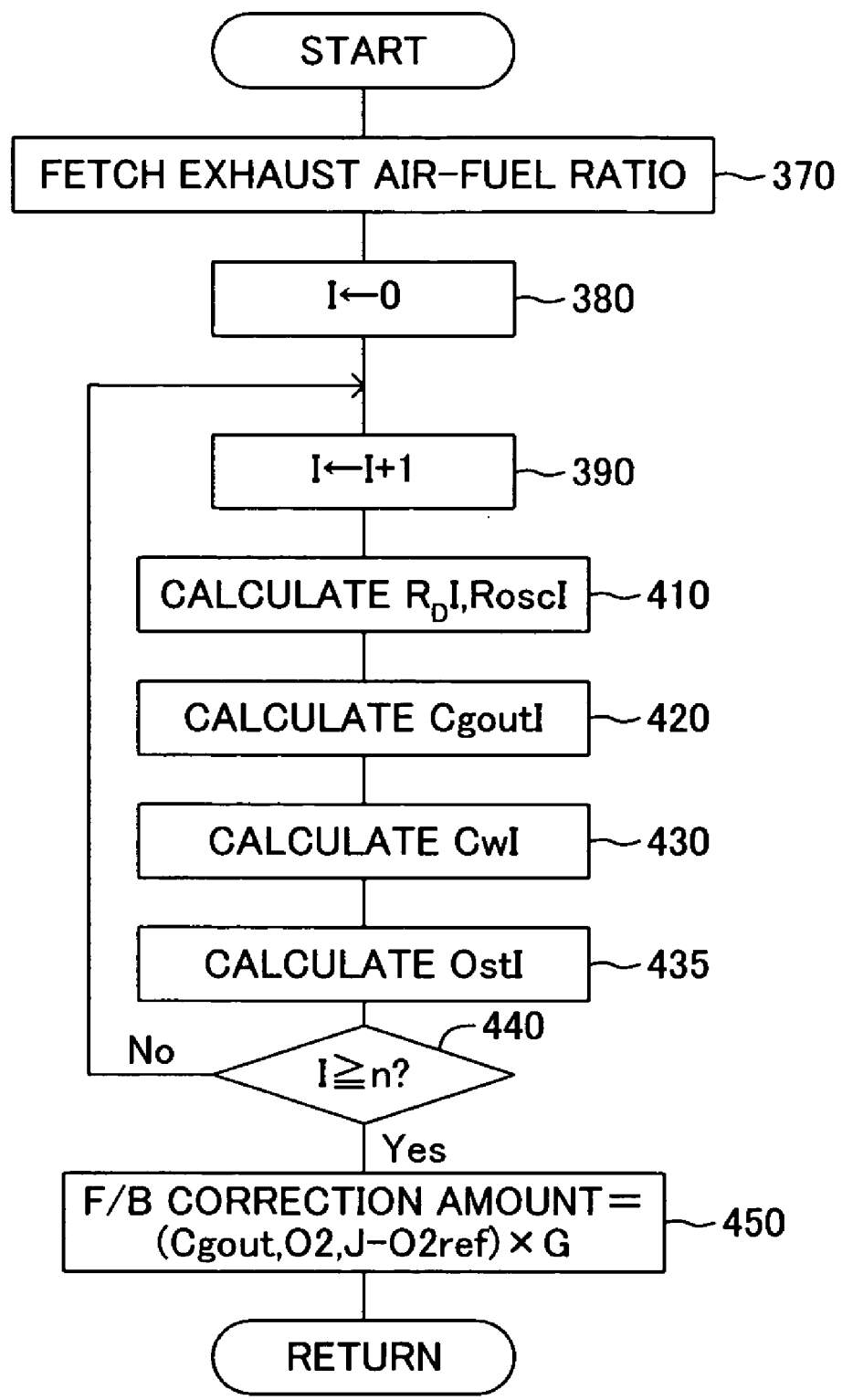
FIG. 24 is a flowchart showing air-fuel ratio control in a sixth embodiment of the control apparatus of the present invention.

First, among the embodiments in which the catalyst unit 19 is divided into a plurality of regions, a sixth embodiment will be described with reference to FIG. 24, which shows a flowchart of control performed in the sixth embodiment. In the present embodiment, the catalyst unit 19 is divided into n regions. Here, a number I=1 to n is sequentially applied to the regions of the catalyst unit 19, starting from the upstream side thereof; and a subscript I=1 to n is added to estimation values, etc. in relation to each region I.

Further, in the present embodiment, an amount of oxygen in exhaust gas (concentration of oxygen discharged from each region of the catalyst unit 19) and an amount of carbon monoxide in the exhaust gas (concentration of carbon monoxide discharged from each region of the catalyst unit 19) are obtained as the above-described estimation values. Moreover, as in the case of the first embodiment, in air-fuel ratio control, oxygen amount is handled as an excess or deficient amount of oxygen. Notably, as having already been described, the respective numerical values represented by the above-described Expressions (27) to (34), (36), (38), etc. can be calculated for all regions through an operation of sequentially calculating the values on the basis of these expressions from the upstream side of the catalyst unit 19.

Now, the control method of the present embodiment will be described specifically with reference to the flowchart shown in FIG. 24. First, the CPU fetches the air-fuel ratio of exhaust gas flowing into the catalyst unit 19, which air-fuel ratio is detected by the upstream air-fuel ratio sensor 25 (step 370), and resets the value I representing the above-described specific region to "0" (step 380). Subsequently, the CPU replaces I with I+1 in order to increment the value of I by "1" (step 390). At this step, the value of I becomes 1.

Next, the CPU calculates RoscI (i.e., R*stor,O2,I, R*reudc,CO,I) and $R_D I$ ($R_D,O2,I$, $R_D,CO,I$)) for the region I (step 410).

At this time, when the air-fuel ratio of the exhaust gas flowing into the catalyst unit 19 is on the lean side with respect to the stoichiometric air-fuel ratio, the already-described Expression (50) is used for calculation of $R_D,I$, and the already-described Expression (51) is used for calculation of Rosc,I. When the air-fuel ratio of the exhaust gas flowing into the catalyst unit 19 is on the rich side with respect to the stoichiometric air-fuel ratio, the already-described Expression (52) is used for calculation of $R_D,I$, and the already-described Expression (53) is used for calculation of Rosc,I.

Subsequently, in the same manner as in step 40 of FIG. 18 of the first embodiment, the CPU calculates CgoutI (Cgout, O2,I and Cgout,CO,I) by use of Expressions (30) and (34) (step 420). At this time, the CPU calculates Cgin,O2,I, etc., which are necessary for the processing in step 420, on the basis of the above-described Expression (48) in the same manner as in step 40. Notably, when Cgout,CO,I is obtained, −2·Cgout,CO,I is set to Cgout,O2,I.

Subsequently, the CPU obtains respective chemical species concentrations CwI (Cw,O2,I, Cw,CO,I) of the coating layer on the basis of Expressions (28) and (32) (step 430); calculates OstI (present value (value for this time)) by use of Expressions (42) to (44) (step 435); and determines whether the present value of I is equal to or greater than n (step 440). When the value of I is less than n, the CPU returns back to step 390, and increments the value of I by "1." Subsequently, the CPU performs the same calculations for the next downstream-side region (steps 410 to 430, step 435). In contrast, when the value of I becomes equal to or greater than n, this means that calculation of the various values are completed for all the regions. In this case, the CPU proceeds from step 440 to step 450.

In step 450, the CPU calculates an air-fuel ratio feedback correction amount (F/B correction amount) from the expression (CgoutO2,J−O2ref)×G, on the basis of the estimation value CgoutO2,J for the specific region J (J is equal to or less than n). Here, $O_2$ref represents a control target (target state), and G represents a control gain. The determined feedback correction amount is reflected in the air-fuel ratio control as one of correction coefficients regarding fuel injection amount which determines the air-fuel ratio.

As described above, in the present embodiment, the catalyst unit 19 is divided into a plurality of regions, and the above-described estimation values for the specific region J is obtained. Therefore, the state of the catalyst unit 19 can be grasped more accurately on the basis of the estimation values of the specific region J. Further, the specific region J can be a region on the upstream-side of (in the side located upstream of) the furthest downstream region, and as a result, the performance of purifying exhaust gas can be further improved. In other words, when the state of the specific region J (J<n) are controlled to approach the ideal state, there can be increased the possibility that even if an unexpected large amount of unburned components or nitrogen oxides flow into the catalyst unit 19, these components are removed in regions J+1 to n subsequent to the specific region J. That is, an adversely effect (increase of emission) caused by a delay in air-fuel ratio control can be minimized.

Next, a seventh embodiment will be described with reference to FIG. 25, which shows a flowchart of control performed in the seventh embodiment. As concerns the calculation of various numerical values for each region, the present embodiment is identical with the sixth embodiment. Therefore, the same reference numerals are imparted to the same control steps, and their descriptions will be omitted.

In the present embodiment, when the result of the determination by the CPU in step 440 is "Yes" (i.e., when the calculation of various numerical values has been completed for all the regions), the CPU obtains an operating condition to be used for determining a specific region (a region to be controlled; hereinafter, may be called "specific control region J") (step 460), and determines the specific control region J on the basis of the obtained operating condition (step 470). Any of various conditions may be used as the above-described operating condition. Further, the specific control region J may be determined on the basis of a plurality of conditions rather than a single condition. Here, there will be described four specific examples in which the specific control region J is determined on the basis of a single condition. FIGS. 26 to 29 show maps which are used in the respective examples.

Figure 26:
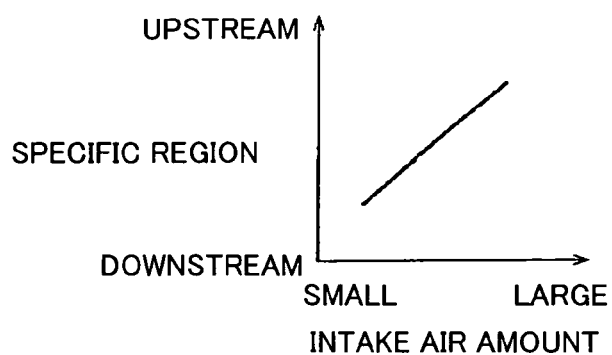
FIG. 26 is a map showing the relation between operating condition and position of a specific region for the case where the operating condition is intake air amount.

FIG. 26 shows a map which shows the "relation between intake air amount and specific region (specific control region) J" and which is used in the case where an intake air amount is used as the above-mentioned operating condition. The intake air amount is detected by means of the air flow meter 13. When this map is used, the position of the specific region (specific control region) J shifts toward the upstream side (upstream stage) as the intake air amount increases.

Figure 27:
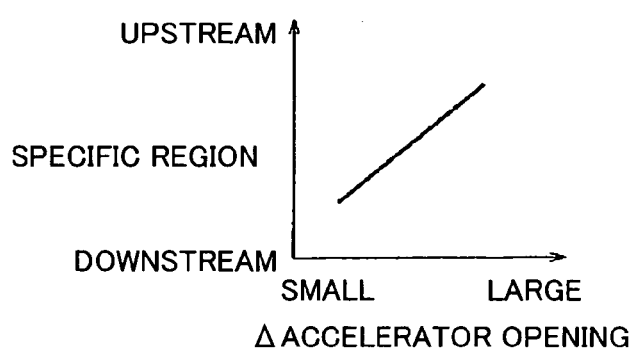
FIG. 27 is a map showing the relation between operating condition and position of a specific region for the case where the operating condition is changes in accelerator opening ($\Delta$ accelerator opening).

FIG. 27 shows a map which shows the "relation between Δ accelerator opening and specific region (specific control region)" and which is used in the case where a time-course change in accelerator opening (Δ accelerator opening) is used as the above-mentioned operating condition. The Δ accelerator opening can be obtained through processing of the result of detection by the accelerator position sensor 12. When this map is used, the position of the specific region (specific control region) J shifts toward the upstream side as the Δ accelerator opening increases.

As to the intake air amount and the Δ accelerator opening, the position of the specific region (specific control region) J is shifted toward the upstream side as their values increase, and the position of the specific region (specific control region) J is shifted toward the downstream side as their values decrease. This operation is performed in order to shift the specific region (specific control region) J toward the upstream side when a so-called "blow through phenomenon" is likely to occur, and shift the specific region (specific control region) J used for air-fuel ratio control toward the downstream side when the "blow through phenomenon" is not likely to occur. The "blow through phenomenon" refers to a phenomenon in which although the catalyst unit 19 itself has purification capability, to-be-removed components of exhaust gas flows out to the downstream side without being removed sufficiently, because of excessively high flow velocity and/or excessively high flow rate.

Figure 28:
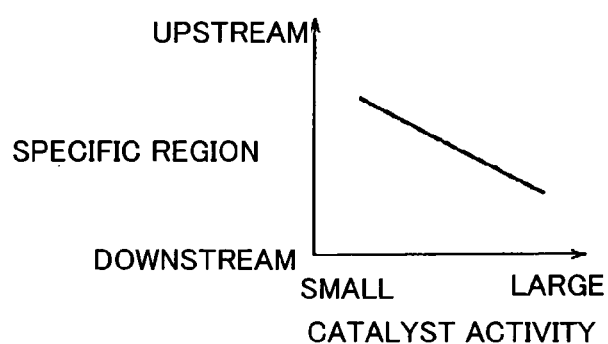
FIG. 28 is a map showing the relation between operating condition and position of a specific region for the case where the operating condition is activity of the catalyst.

FIG. 28 shows a map which shows the "relation between catalyst activity and specific region (specific control region) J" and which is used in the case where the activity of the catalyst unit 19 is used as the above-mentioned operating condition. The activity of the catalyst unit 19 can be determined from the temperature of the catalyst unit 19 detected by means of the catalyst temperature sensor 21. When this map is used, the position of the specific region (specific control region) J shifts toward the upstream side as the activity of the catalyst unit 19 decreases (the catalyst unit has not yet been activated sufficiently). This enables regions on the downstream side of the specific region (specific control region) J to be used a buffer (spare regions for exhaust purification), whereby the to-be-removed components of exhaust gas can be removed sufficiently.

Figure 29:
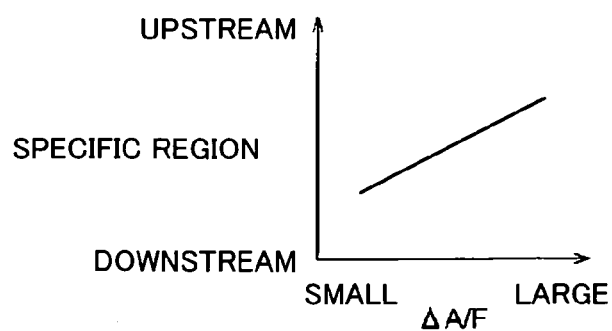
FIG. 29 is a map showing the relation between operating condition and position of a specific region for the case where the operating condition is changes in air-fuel ratio ($\Delta A/F$).

FIG. 29 shows a map which shows the "relation between Δ air-fuel ratio and specific region (specific control region) J" and which is used in the case where a time-course change in the air-fuel ratio (the air-fuel ratio of the gas flowing into the catalyst unit 19; i.e., the air-fuel ratio of an air-fuel mixture supplied to the engine 1) (Δ air-fuel ratio) is used as the above-mentioned operating condition. The Δ air-fuel ratio can be calculated by means of the ECU 18, which performs air-fuel ratio control. When this map is used, the position of the specific region (specific control region) J shifts toward the downstream side as the Δ air-fuel ratio decreases (when the air-fuel ratio does not change greatly).

Figure 25:
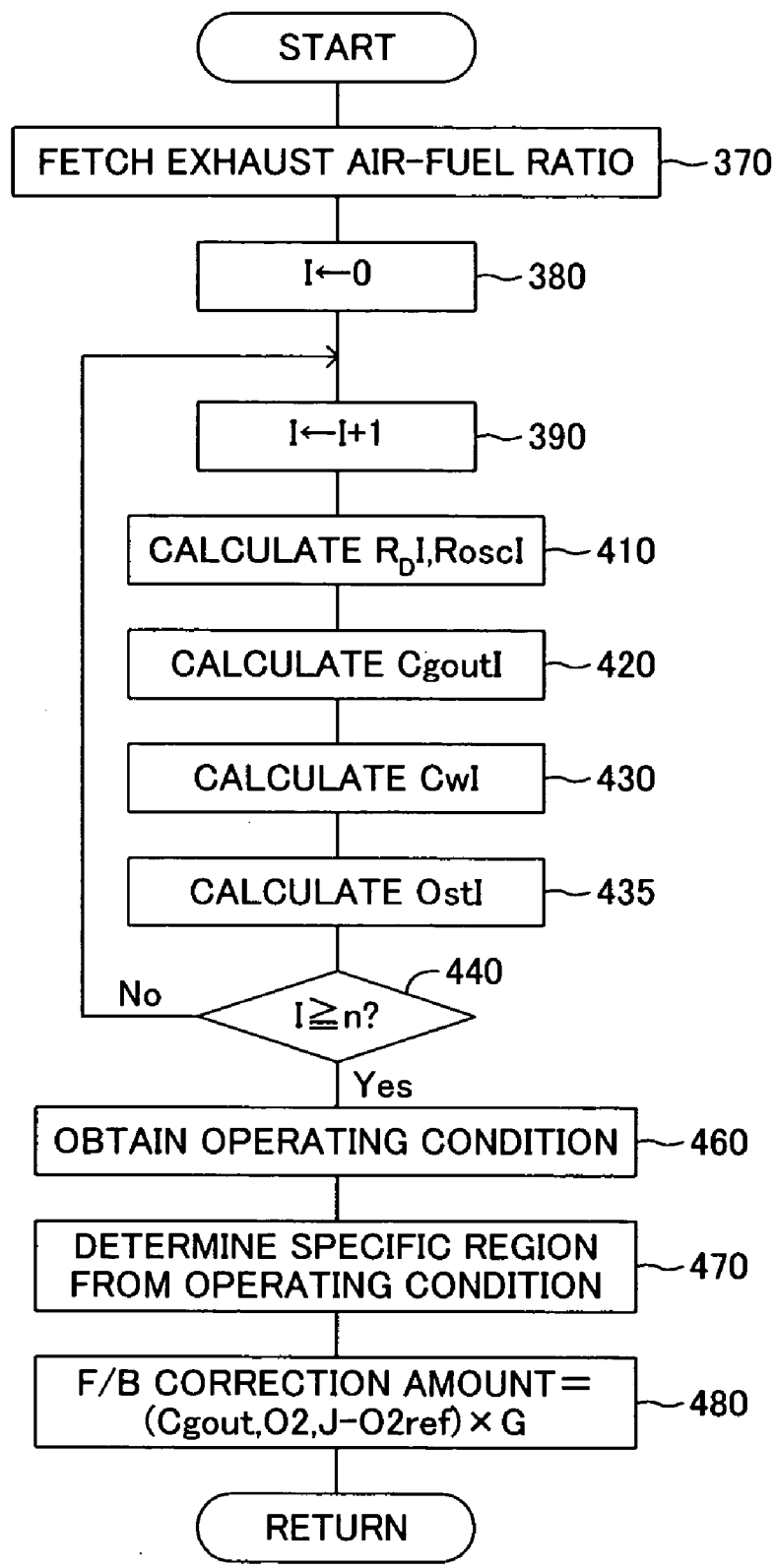
FIG. 25 is a flowchart showing air-fuel ratio control in a seventh embodiment of the control apparatus of the present invention.

After having determined the specific region (specific control region) J in step 470 shown in FIG. 25, the CPU proceeds to step 480, and calculates an air-fuel-ratio feedback correction amount (F/B correction amount) by the expression (Cgout,O2,J−O2ref)×G, on the basis of the estimation value Cgout,O2, J for the determined specific region J. Here, $O_2$ref represents a control target, and G represents a control gain. The determined feedback correction amount is reflected in the air-fuel ratio control as one of correction coefficients regarding fuel injection amount which determines the air-fuel ratio. As described above, the exhaust gas purification performance can be further improved by dividing the catalyst unit 19 into a plurality of regions and changing the specific region (specific control region) J in accordance with operating conditions.

In the above-described sixth and seventh embodiments, a single specific region (specific control region) is set. However, a plurality of specific regions (specific control regions) may be set. This enables more effective purification of exhaust gas in some cases. In an eighth embodiment to be described below, a plurality of specific regions (specific control regions) are set.

Figure 30:
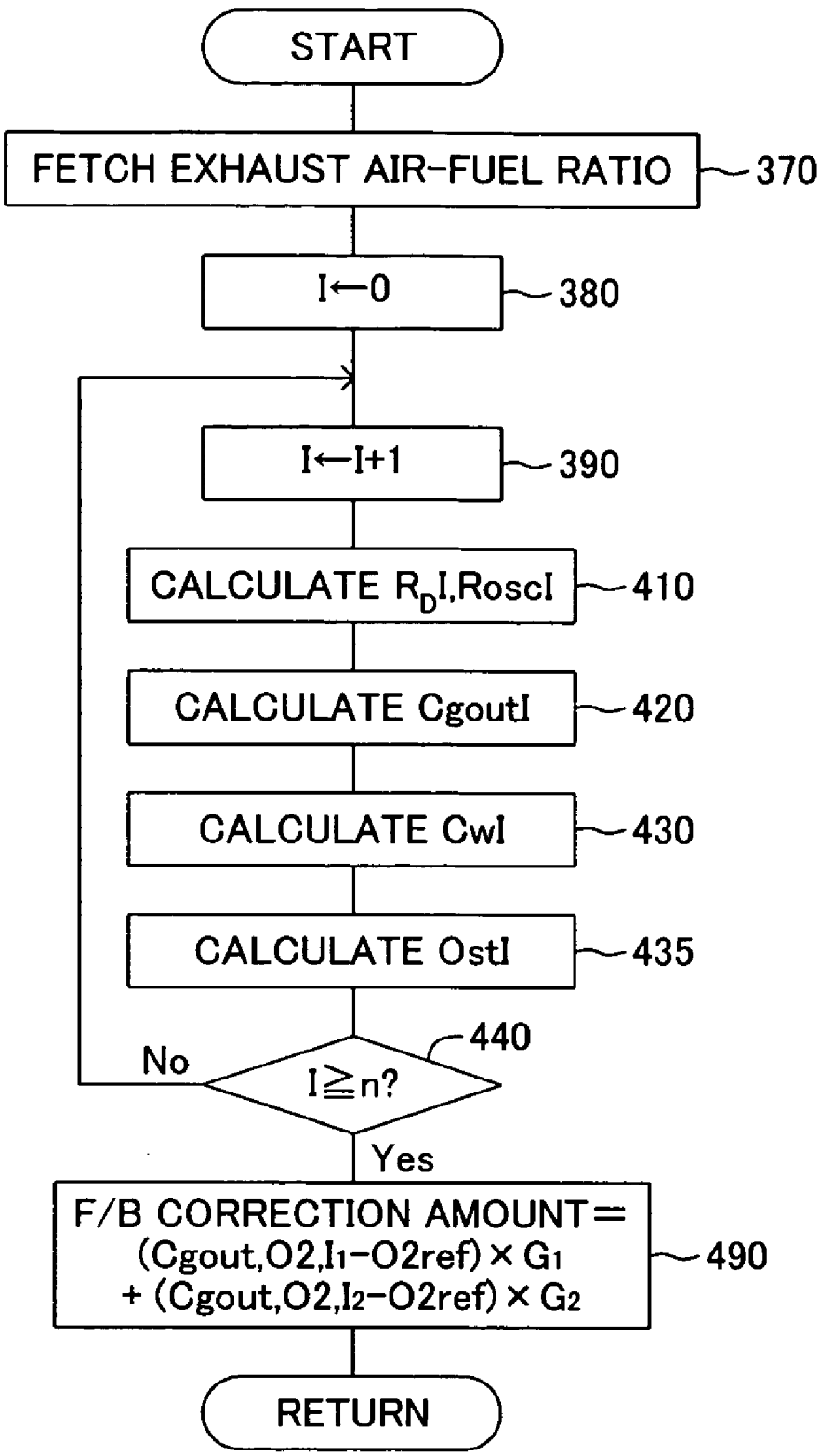
FIG. 30 is a flowchart showing air-fuel ratio control in an eighth embodiment of the control apparatus of the present invention.

FIG. 30 shows a flowchart of control performed in the eighth embodiment. As concerns the calculation of various numerical values for each region, the present embodiment is identical with the sixth and seventh embodiments. Therefore, the same reference numerals are imparted to the same control steps, and their descriptions will be omitted.

In the present embodiment, when the result of the determination by the CPU in step 440 is "Yes" (i.e., when the calculation of various numerical values has been completed for all the regions), the CPU proceeds to step 490 so as to obtain an air-fuel-ratio feedback correction amount (F/B correction amount) from the expression [(Cgout,O2, $I_1$−O2ref)×$G_1$+(Cgout,O2, $I_2$−O2ref)×$G_2$], on the basis of the estimation values Cgout,O2, $I_1$ and Cgout,O2, $I_2$ for predetermined two specific regions (specific control regions) (region $I_1$ and region $I_2$). Here, $O_2$ref represents a control target, and in the present embodiment, the same control target is used for both the specific region (specific control region) $I_1$ and the specific region (specific control region) $I_2$. The feedback correction amount determined in step 490 is reflected in the air-fuel ratio control as one of correction coefficients regarding fuel injection amount which determines the air-fuel ratio. Notably, different control targets may be set for the specific region (specific control region) $I_1$ and the specific region (specific control region) $I_2$.

$G_1$ and $G_2$ are control gains for the specific region (specific control region) $I_1$ and the specific region (specific control region) $I_2$. In the present embodiment, through employment of the different gains $G_1$ and $G_2$, the degree of influence on the air-fuel ratio control is changed between the estimation values of the respective specific regions (specific control regions). By virtue of such setting, when a plurality of specific regions (specific control regions) are set, the degrees of influence of the conditions of these specific regions (specific control regions) on the air-fuel ratio control can be set individually, whereby the exhaust gas purification performance can be further improved in some cases. As described above, the exhaust gas purification performance can be further improved by dividing the catalyst unit 19 into a plurality of regions and setting a plurality of specific regions (specific control regions).

In the above-described eighth embodiment, the control gains $G_1$ and $G_2$ are predetermined fixed values. However, the control gains for the plurality of specific regions (specific control regions) are not necessarily required to be set to fixed values, and may be variables which change in accordance with operating conditions or other factors.

In a ninth embodiment to be described below, the control gains corresponding to the respective specific regions (specific control regions) are variable.

Figure 31:
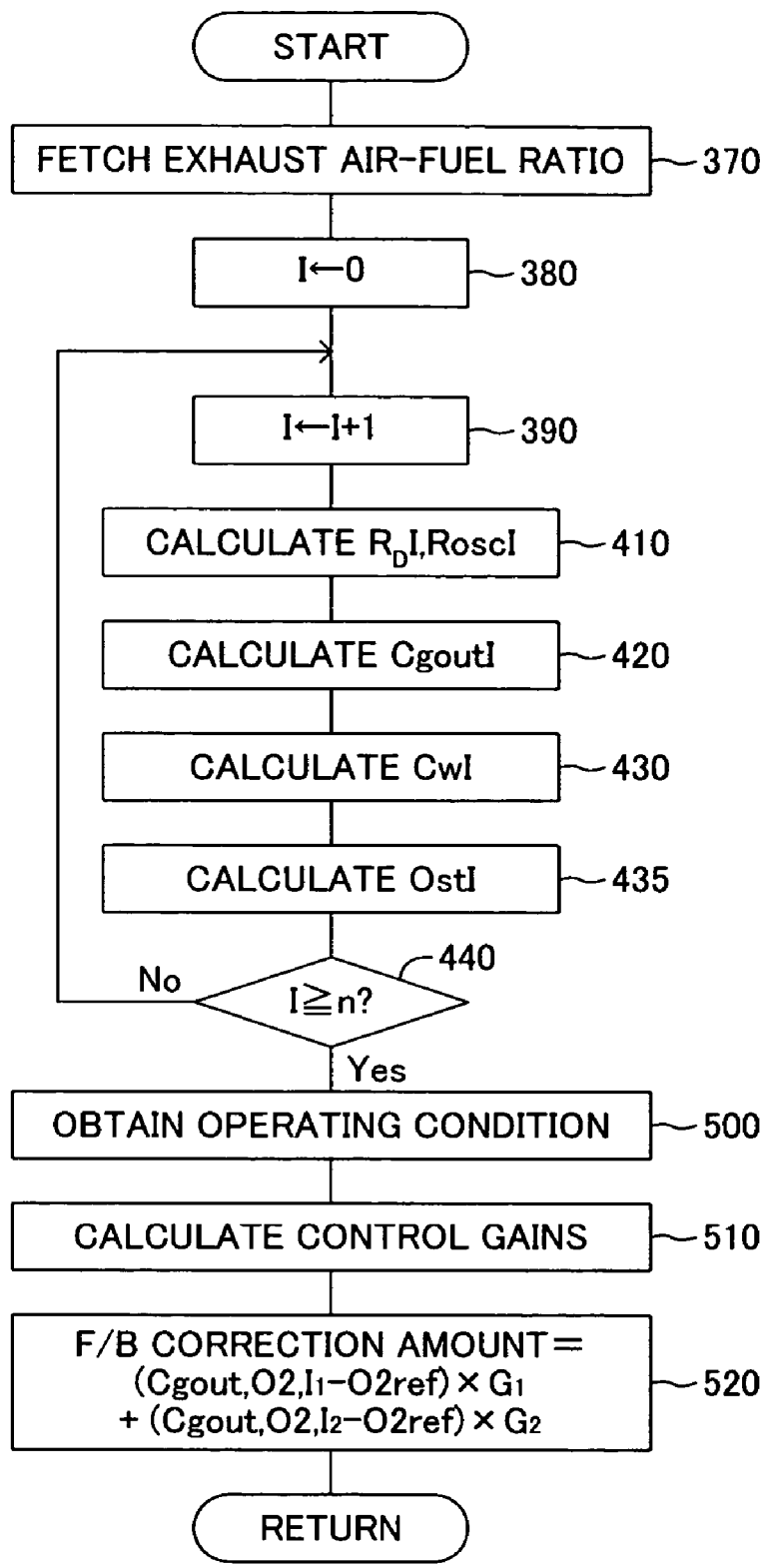
FIG. 31 is a flowchart showing air-fuel ratio control in a ninth embodiment of the control apparatus of the present invention.

FIG. 31 shows a flowchart of control performed in the ninth embodiment. As concerns the calculation of various numerical values for each region, the present embodiment is identical with the sixth through eighth embodiments. Therefore, the same reference numerals are imparted to the same control steps, and their descriptions will be omitted.

In the present embodiment, when the result of the determination by the CPU in step 440 is "Yes" (i.e., when the calculation of various numerical values has been completed for all the regions), the CPU proceeds to step 500 so as to obtain, form the air flow meter 13, an intake air flow rate Ga, which is an operating condition to be used for determining the control gains corresponding to the respective specific regions. In step 510, the CPU determines the control gains ($G_1$, $G_2$) for the respective specific regions (specific regions $I_1$ and $I_2$) on the basis of the obtained intake air flow rate Ga and a map shown in FIG. 32.

Figure 32:
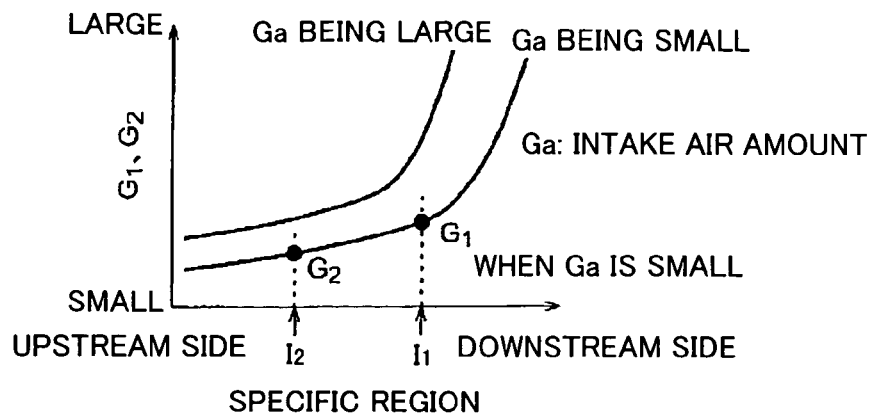
FIG. 32 is a map showing the relation between position of a specific region and control gains $G_1$ and $G_2$.

In the map shown in FIG. 32, the horizontal axis represents the position of a specific region, and the vertical axis represent control gain to be set as $G_1$ and $G_2$. In this map, the specific region $I_1$ is located on the downstream side of the specific region $I_2$, and two curves are set for the case where the intake air amount Ga is large and for the case where the intake air amount Ga is small. Each curve is set in such a manner that the control gain $G_1$ at the downstream-side specific region $I_1$ becomes greater than the control gain $G_2$ at the upstream-side specific region $I_2$. That is, when the control gain is determined by use of this map, the degree of influence, on the air-fuel ratio control, of the estimation value for the downstream-side specific region becomes larger. Notably, these curves may be determined freely. For example, when these curves are set to increase the control gain toward the upstream side, the estimation value of the upstream-side specific region provides a greater influence.

Moreover, in the map shown in FIG. 32, the curve applied to the case where the intake air amount Ga is large is located above the curve applied to the case where the intake air amount Ga is small. Therefore, the control gains $G_1$ and $G_2$ are set to increase as the intake air amount Ga increases.

After having determined the control gains in the above-described manner, the CPU obtains an air-fuel-ratio feedback correction amount (F/B correction amount) on the basis of the expression [(Cgout,O2, $I_1$-O2ref)×$G_1$+(Cgout,O2, $I_2$-O2ref)×$G_2$] (step 520). O$_2$ref represents a control target.

As described above, the exhaust gas purification performance can be further improved by dividing the catalyst unit into a plurality of regions to thereby set a plurality of specific regions, and changing the degree of influence on the air-fuel ratio control of each specific region in accordance with the operating condition of the engine 1.

Notably, any of various operating conditions may be employed as the above-described operating condition for determining the control gains. Further, the control gains for the respective specific regions may be determined on the basis of a plurality of operating conditions rather than a single condition. Further, although the same control target is used for both the specific region $I_1$ and the specific region $I_2$ in the present embodiment, different control targets may be set for the specific region $I_1$ and the specific region $I_2$.

Figure 33:
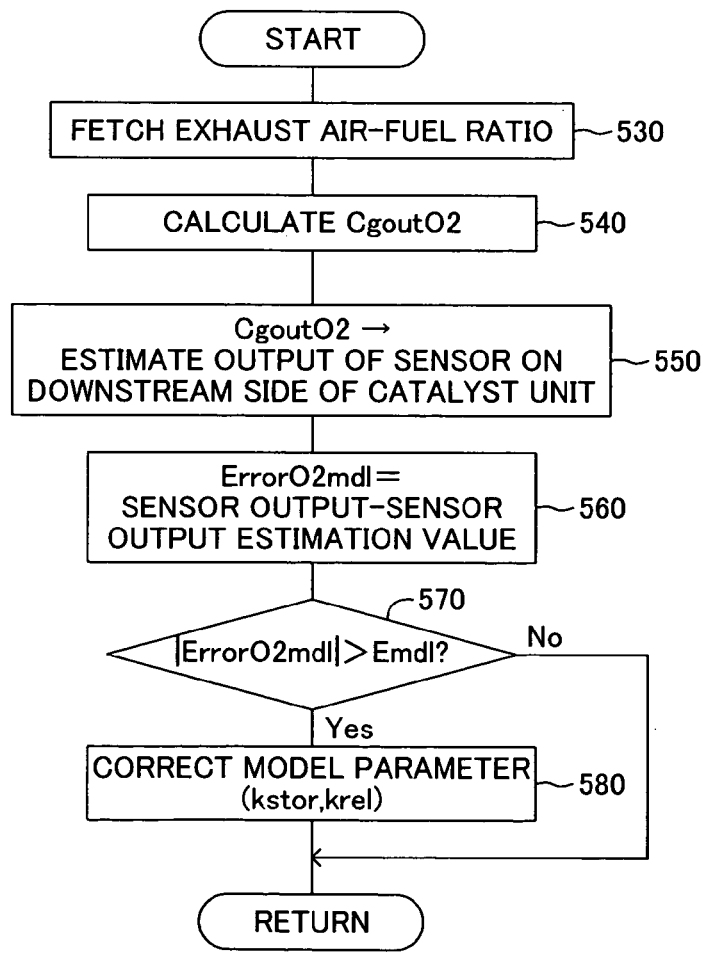
FIG. 33 is a flowchart showing air-fuel ratio control in a tenth embodiment of the control apparatus of the present invention.

Next, there will be described a tenth embodiment in which the above-described air-fuel ratio control based on estimation values is performed, and in which the above-described estimation models are corrected by use of the output of the downstream air-fuel ratio sensor 26. FIG. 33 shows a flowchart of the control performed in the present embodiment. The flowchart of FIG. 33 does not show a program for controlling the air-fuel ratio, but shows a program for correcting estimation models. Notably, in the present embodiment, as in the first embodiment, estimation values are calculated, while the entirely of the catalyst unit 19 is considered as a single region, and the amount of oxygen in exhaust gas (the concentration of oxygen flowing out of the catalyst unit 19) is calculated as one of the estimation values.

Specifically, in step 530, the CPU obtains the air-fuel ratio of exhaust gas flowing into the catalyst unit 19 (exhaust air-fuel ratio) detected by means of the upstream air-fuel ratio sensor 25, and proceeds to step 540 in order to calculate Cgout,O2 (=CgoutO2) on the basis of the obtained exhaust air-fuel ratio. In actuality, the processing on the basis of these steps 530 and 540 is achieved by executing processing similar to the processing on the basis of steps 10 to 50 and step 55 shown in FIG. 18.

Subsequently, the CPU proceeds to step 550 so as to estimate (predict) an output which the downstream air-fuel ratio sensor 26 will output, on the basis of CgoutO2 calculated in step 540. In step 560, the CPU subtracts the sensor output estimation value estimated in step 550 from the actual output of the downstream air-fuel ratio sensor 26 so as to obtain Error O2mdl.

In subsequent step 570, the CPU determines whether the absolute value of Error O2mdl is greater than a predetermined model allowable error Emdl. When the difference between the actual output of the downstream air-fuel ratio sensor 26 and the output estimation value estimated in step 550 falls within the allowable range, the result of the determination in step 570 becomes "No." In this case, the CPU ends the control shown by the flowchart of FIG. 33, because the above-described estimation models are not required to be corrected.

In contrast, when the difference Error O2mdl between the actual output of the downstream air-fuel ratio sensor 26 and the output estimation value estimated in step 550 exceeds the allowable range (model allowable error Emdl), the result of the determination in step 570 becomes "Yes." In this case, the CPU proceeds to step 580 in order to correct kstor (kstor,i) and krel (krel,i) used in the estimation models (used in the above-described Expressions (36), (38), etc).

As described above, the estimation accuracy of the estimation models can be further improved by performing the above-described air-fuel ratio using estimation values, and correcting the estimation models by use of the estimation values and the output of the downstream air-fuel ratio sensor 26.

Figure 34:
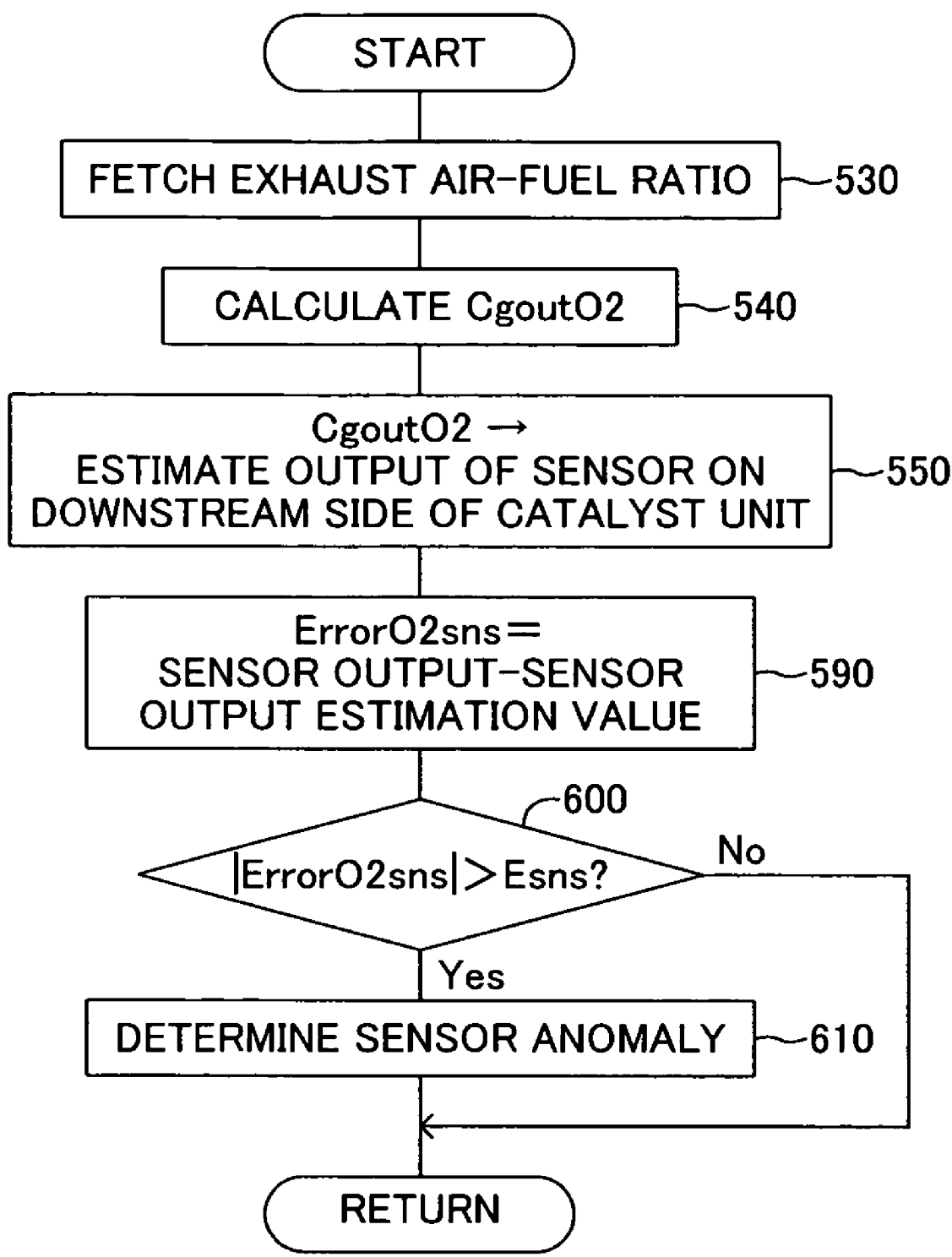
FIG. 34 is a flowchart showing air-fuel ratio control in an eleventh embodiment of the control apparatus of the present invention.

Although in the above-describe tenth embodiment the estimation models are corrected on the basis of the output of the downstream air-fuel ratio sensor 26, in an eleventh embodiment to be described below, anomaly of the downstream air-fuel ratio sensor 26 is determined (diagnosed) on the basis of the results of estimation by the estimation models. FIG. 34 shows a flowchart of the control performed in the present embodiment. The flowchart of FIG. 34 does not show a program for controlling the air-fuel ratio, but shows a program for performing diagnosis (anomaly determination) for the sensor. Notably, in the present embodiment, as in the first embodiment, estimation values are calculated, while the entirely of the catalyst unit 19 is considered as a single region, and the amount of oxygen in exhaust gas (the concentration of oxygen flowing out of the catalyst unit 19) is calculated as one of the estimation values.

Specifically, in step 530, the CPU obtains the air-fuel ratio of exhaust gas flowing into the catalyst unit 19 (exhaust air-fuel ratio) detected by means of the air-fuel ratio sensor 25, and proceeds to step 540 in order to calculate CgoutO2 on the basis of the obtained exhaust air-fuel ratio. Further, in step 550, the CPU estimates (predicts) an output which the downstream air-fuel ratio sensor 26 will output, on the basis of the calculated CgoutO2. These steps 530 to 550 are identical with steps 530 to 550 in the above-described tenth embodiment.

Subsequently, the CPU proceeds to step 590 so as to subtract the sensor output estimation value estimated in step 550 from the actual output of the downstream air-fuel ratio sensor 26, to thereby obtain Error O2sns.

In subsequent step 600, the CPU determines whether the absolute value of Error O2sns is greater than a predetermined sensor allowable error Esns. When the difference Error O2sns between the actual output of the downstream air-fuel ratio sensor 26 and the output estimation value estimated in step 550 falls within the allowable range (sensor allowable error Esns), the result of the determination in step 600 becomes "No." In this case, the CPU ends the control shown by the flowchart of FIG. 34, because the downstream air-fuel ratio sensor 26 is normal.

In contrast, when the difference Error O2sns between the actual output of the downstream air-fuel ratio sensor 26 and the sensor output estimation value estimated in step 550 exceeds the allowable range (sensor allowable error Esns), the result of the determination in step 600 becomes "Yes." In this case, the CPU proceeds to step 610, and determines that the downstream air-fuel ratio sensor 26 is in an anomalous state.

In the present embodiment, the air-fuel ratio control is performed by use of the above-described estimation values, and diagnosis of the downstream air-fuel ratio sensor 26 is performed on the basis of the estimation values and the output of the air-fuel ratio sensor 26.

In the tenth embodiment, the estimation models for obtaining estimation values are corrected on the basis of the output of the air-fuel ratio sensor 26. In contrast, in the eleventh embodiment, diagnosis of the downstream air-fuel ratio sensor 26 is performed on the basis of the estimation values calculated by use of the estimation models. Although these embodiments are based on concepts that contradict each other, these embodiments may be selectively used depending on which of the estimation values and the output of the air-fuel ratio sensor 26 has a higher reliability. Further, in the case where a different one of the estimation values and the output has a higher reliability depending on the operating condition of the engine 1, the control for correcting the estimation models and the control for diagnosing the downstream air-fuel ratio sensor 26 may be performed selectively on the basis of the operating condition of the engine 1. Further, there may be employed a configuration which determines whether the downstream air-fuel ratio sensor 26 is in a normal state or anomalous state as in the eleventh embodiment, and corrects the output of the downstream air-fuel ratio sensor 26 in accordance with Error O2sns.

Figure 35:
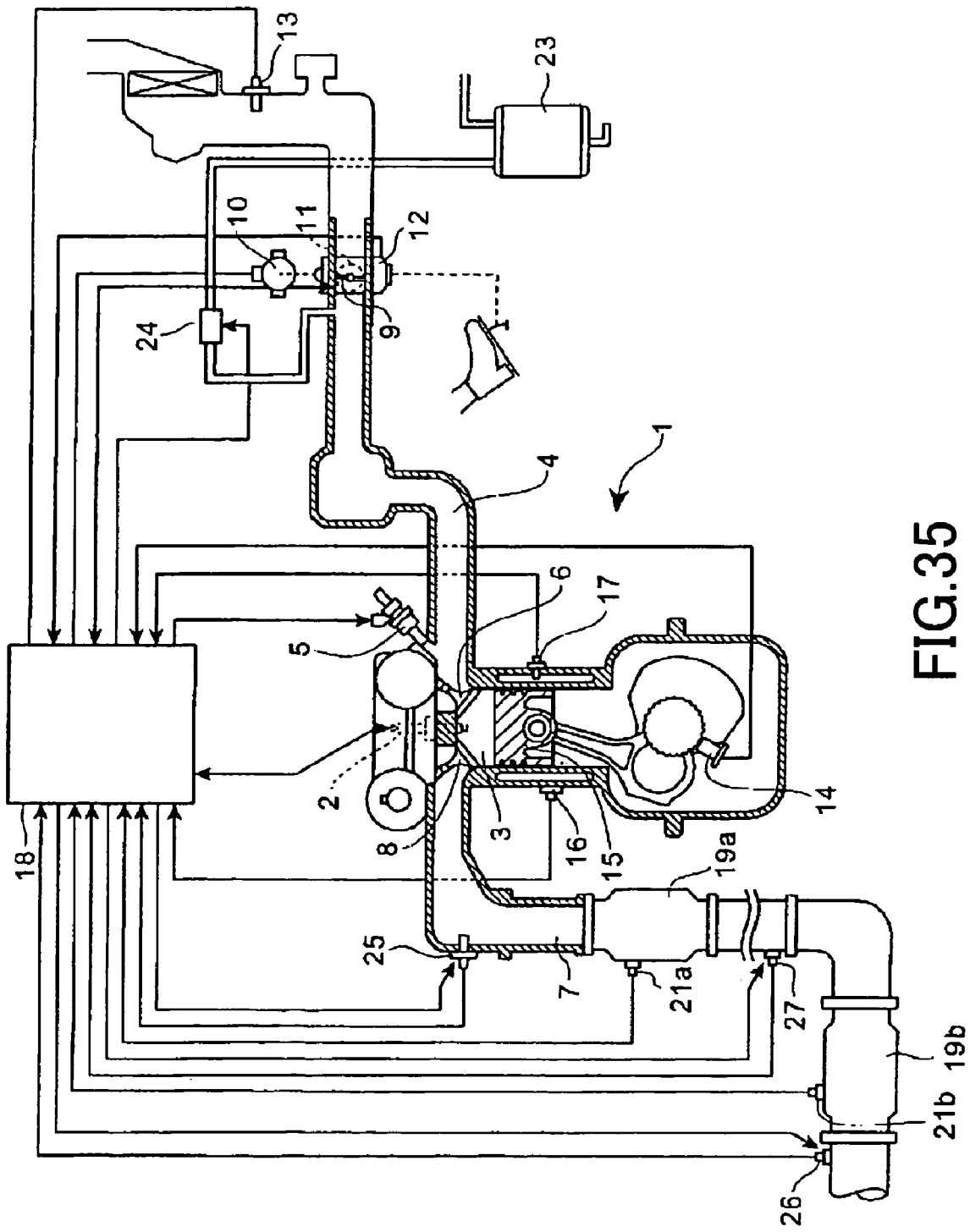
FIG. 35 is an internal combustion engine for twelfth and thirteenth embodiments of the present invention.

The embodiments described above are applied to the engine 1 which has a single catalyst unit 19 in the exhaust passage 7 as shown in FIG. 1. In contrast, in a twelfth embodiment to be described below, as shown in FIG. 35, which shows the entire configuration thereof, the engine 1 has a plurality of (two in the following embodiment) exhaust purifying catalyst units 19a and 19b in the exhaust passage 7. In FIG. 35, the same structural elements as those shown in FIG. 1 are denoted by the same reference numerals, and their descriptions will be omitted. In the following description, only portions that differ from those of the engine shown in FIG. 1 will be explained.

In the engine according to the present embodiment shown in FIG. 35, the exhaust purifying catalyst units 19a and 19b are disposed at two locations in the exhaust passage 7. The upstream-side catalyst unit will be called the upstream exhaust purifying catalyst unit 19a (hereinafter, also called the upstream catalyst unit 19a), and the downstream-side catalyst unit will be called the downstream exhaust purifying catalyst unit 19b (hereinafter, also called the downstream catalyst unit 19b).

In some cases, for example, in a four-cylinder engine, two upstream catalyst units 19a may be disposed in parallel in such a manner that one unit is disposed at a location where exhaust pipes of two cylinders merge together, and the other unit is disposed at a location where exhaust pipes of the remaining two cylinders merge together. Notably, in such a case, the downstream catalyst unit 19b is often provided an exhaust pipe portion on the downstream of a location where all the exhaust pipes merge together.

The upstream catalyst unit 19a is also called "startup catalyst," and is often disposed in order to provide exhaust purifying performance quickly. The upstream catalyst unit 19a has a small capacity, and is disposed at a position closest to the cylinder 3, so that the catalyst unit 19a is quickly heated to an activation temperature after cold start by means of heat of exhaust gas, and exhibits exhaust purifying performance quickly.

In contrast, the downstream catalyst unit 19b is also called "under-floor catalyst," and is often disposed in order to reliably remove the to-be-removed components of the exhaust gas. The downstream catalyst unit 19b has a sufficiently large capacity, and is disposed under the floor of the vehicle. An upstream air-fuel ratio sensor 25 for detecting the air-fuel ratio of the exhaust gas flowing into the upstream catalyst unit 19a is disposed on the upstream side of the upstream catalyst unit 19a. Further, a downstream air-fuel ratio sensor 26 for detecting the air-fuel ratio of the exhaust gas flowing out of the downstream catalyst unit 19b is disposed on the downstream side of the downstream catalyst unit 19b. Moreover, an intermediate air-fuel ratio sensor 27 is disposed between the upstream catalyst unit 19a and the downstream catalyst unit 19b in order to detect the air-fuel ratio of the exhaust gas flowing out of the upstream catalyst unit 19a and flowing into the downstream catalyst unit 19b.

These air-fuel ratio sensors 25, 26, and 27 are connected to the ECU 18 so as to send their detection results to the ECU 18. Each of the air-fuel ratio sensors 25, 26, and 27 includes a heater, and is quickly heated by means of electricity supplied from the ECU 18 to the heater. Moreover, temperature sensors 21a and 21b are attached to the upstream catalyst unit 19a and the downstream catalyst unit 19b, respectively, in order to detect the temperatures of these units.

Next, operation of the present embodiment will be described. In the present embodiment, the above-described calculation of estimation values by use of estimation models is performed for each of the upstream catalyst unit 19a and the downstream catalyst unit 19b, and air-fuel ratio control is performed on the basis of the thus-calculated estimation values. Further, the air-fuel ratio of the exhaust gas flowing out of the upstream catalyst unit 19a and flowing into the downstream catalyst unit 19b is also controlled on the basis of these estimation values and the detection result of the intermediate air-fuel ratio sensor 27. Notably, the basic configuration of estimation models applied to the upstream catalyst unit 19a and the basic configuration of estimation models applied to the downstream catalyst unit 19b are the same, except that they differ in numerical values of parameters used in the respective models.

Figure 36:
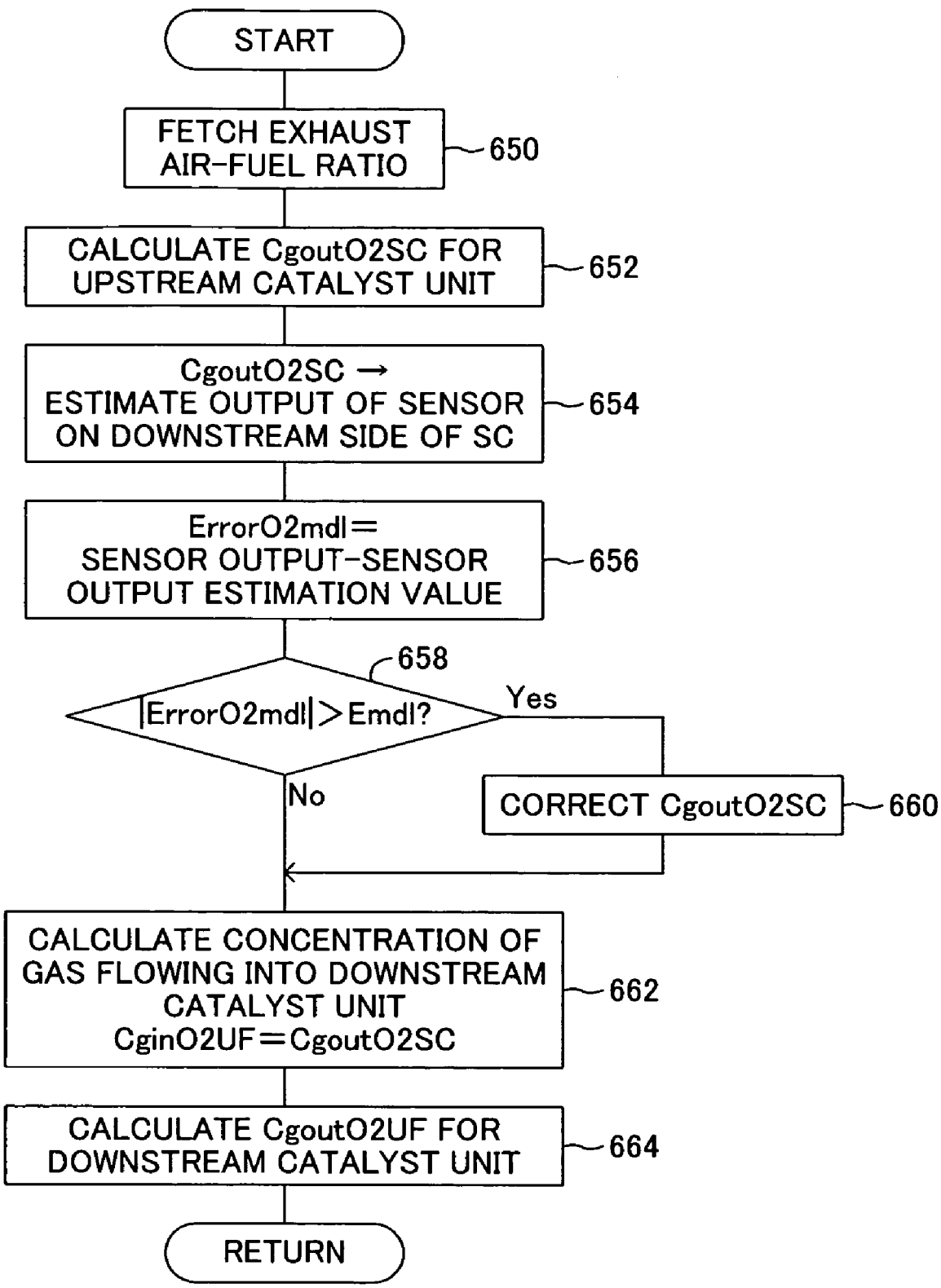
FIG. 36 is a flowchart showing air-fuel ratio control in the twelfth embodiment of the control apparatus of the present invention.

FIG. 36 shows a flowchart of the control performed in the present embodiment. The flowchart of FIG. 36 only shows a program for calculating estimation values. In the present embodiment, an estimation value is calculated, while the entirely of the upstream catalyst unit 19a is considered as a single region, and another estimation value is calculated, while the entirely of the downstream catalyst unit 19b is considered as a single region. One of the estimation values used in the present embodiment is the amount of oxygen in exhaust gas (the concentration of oxygen flowing out of the catalyst units 19a and 19b).

As to the above-described Cgin and Cgout, the following expressions are employed for each catalyst unit. That is, the concentration of a chemical species (here, oxygen) flowing into the upstream catalyst unit 19a is expressed as CginO2SC, and the concentration of the chemical species flowing out of the upstream catalyst unit 19a is expressed as CgoutO2SC. Similarly, the concentration of a chemical species (here, oxygen) flowing into the downstream catalyst unit 19b is expressed as CginO2UF, and the concentration of the chemical species flowing out of the downstream catalyst unit 19b is expressed as CgoutO2UF. Since the chemical species flowing out of the upstream catalyst unit 19a flows into the downstream catalyst unit 19b, CgoutO2SC=CginO2UF.

Specific operation will be described in accordance with the program shown by the flowchart of FIG. 36. In step 650, the CPU obtains the air-fuel ratio of exhaust gas flowing into the upstream catalyst unit 19a detected by means of the upstream air-fuel ratio sensor 25. Subsequently, the CPU proceeds to step 652, and calculates CgoutO2SC regarding the upstream catalyst unit 19a on the basis of the obtained exhaust air-fuel ratio. In actuality, the processing on the basis of these steps 650 and 652 is achieved by executing processing similar to the processing on the basis of steps 10 to 50 and step 55 shown in FIG. 18. In subsequent step 654, on the basis of CgoutO2SC calculated in the above-described step 652, the CPU estimates (predicts) an output that the intermediate air-fuel ratio sensor 27 will output.

Subsequently, the CPU proceeds to step 656, and subtracts the output estimation value estimated in step 654 from the actual output of the intermediate air-fuel ratio sensor 27 so as to obtain Error O2mdl. In subsequent step 658, the CPU determines whether the absolute value of Error O2mdl is greater than a predetermined model allowable error Emdl. When the difference between the actual output of the intermediate air-fuel ratio sensor 27 and the output estimation value estimated in step 654 exceeds the allowable range, the result of the determination in step 658 becomes "Yes." In this case, the CPU proceeds to step 660 so as to correct CgoutO2SC, and then proceeds to step 662.

The correction of CgoutO2SC in step 660 is achieved by first correcting the estimation models, and calculating CgoutO2SC again by use of the corrected estimation models. The correction of the estimation models is performed in the same manner as the correction in step 580 of the flowchart of FIG. 33.

In contrast, when the difference between the actual output of the intermediate air-fuel ratio sensor 27 and the output estimation value estimated in step 654 falls within the allowable range, the result of the determination in step 658 becomes "No." In this case, since correction of the above-described estimation model is unnecessary, the CPU proceeds directly to step 662, and substitutes CgoutO2SC for CginO2UF. Notably, when the CPU reaches step 662 via step 660, the CgoutO2SC corrected in step 660 is substituted for CginO2UF.

Subsequently, in step 664, the CPU calculates CgoutO2UF on the basis of the calculated CginO2UF regarding the downstream catalyst unit, in the same manner as in step 652. Subsequently, in unillustrated steps, the CPU calculates a air-fuel-ratio feedback correction amount on the basis of the thus-calculated CgoutO2SC and CgoutO2UF, and reflects it in the air-fuel ratio control. As described above, the exhaust gas purifying performance can be further improved by calculating estimation values for the plurality of catalyst units 19a and 19b in the exhaust passage 7 and performing air-fuel ratio control using these estimation values.

Next, a thirteenth embodiment will be described. Although the present embodiment resembles to the above-described twelfth embodiment, correction of CgoutO2SC is not performed in the present embodiment. Notably, the control of the thirteenth embodiment may be combined with the control of the twelfth embodiment. In the thirteenth embodiment, in order to maintain a high purification ratio of the downstream catalyst unit 19b, the air-fuel ratio of the exhaust gas flowing into the downstream catalyst unit 19b is controlled by use of the calculated estimation value. Specifically, in order to maintain the high purification ratio of the downstream catalyst unit 19b, the air-fuel ratio control is performed in such a manner that the cumulative value of excess-deficient amounts of oxygen in the exhaust gas flowing into the downstream catalyst unit 19b becomes zero.

Figure 37:
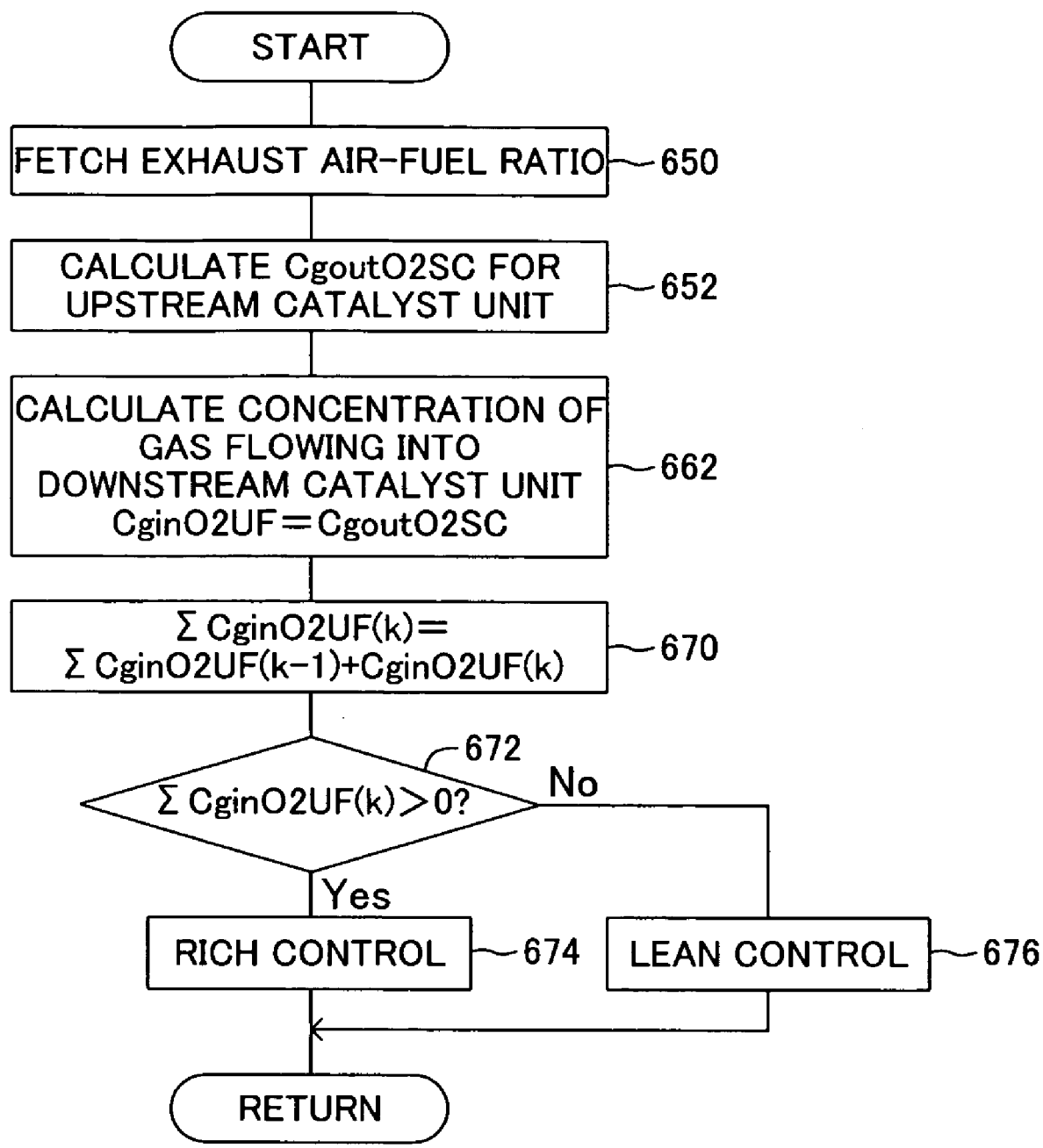
FIG. 37 is a flowchart showing air-fuel ratio control in the thirteenth embodiment of the control apparatus of the present invention.

The cumulative value of excess-deficient amounts of oxygen in the exhaust gas flowing into the downstream catalyst unit 19b indicates an excess or deficient state during the operation of bringing to zero the balance (sum total or average) of amounts of oxygen flowing into the downstream catalyst unit 19b in order to maintain the high purification ratio of the downstream catalyst unit 19b. FIG. 37 shows the flowchart of the control performed in the present embodiment.

The operation of the present apparatus will be described in accordance with this flowchart. In step 650, the CPU obtains the air-fuel ratio of exhaust gas flowing into the upstream catalyst unit 19a detected by means of the upstream air-fuel ratio sensor 25. Subsequently, the CPU proceeds to step 652, and calculates CgoutO2SC regarding the upstream catalyst unit 19a on the basis of the obtained exhaust air-fuel ratio. In actuality, the processing on the basis of these steps 650 and 652 is achieved by executing processing similar to the processing on the basis of steps 10 to 50 and step 55 shown in FIG. 18. Subsequently, the CPU proceeds to step 662 so as to substitute CgoutO2SC, calculated in step 652, for CginO2UF.

Subsequently, the CPU proceeds to step 670 so as to obtain a cumulative value of CginO2UF calculated in step 662 (expressed as $\Sigma$CginO2UF). That is, the CPU stores the previous cumulative value $\Sigma$CginO2UF (k−1), and the CPU calculates a new cumulative value $\Sigma$CginO2UF (k) by adding the CginO2UF(k) calculated in step 662 to the stored cumulative value $\Sigma$CginO2UF (k−1).

In step 672, the CPU determines whether the cumulative value $\Sigma$CginO2UF (k) is greater than zero. When the result of the determination in step 672 is "Yes," the CPU proceeds to step 674 so as to perform control (rich control) to shift the air-fuel ratio of the exhaust gas flowing into the downstream catalyst unit 19b to the rich side. Meanwhile, when the cumulative value ΣCginO2UF (k) is equal to or smaller than zero at the time of execution of step 672, the result of the determination in step 672 becomes "No," and the CPU proceeds to step 676 so as to perform control (lean control) to shift the air-fuel ratio of the exhaust gas flowing into the downstream catalyst unit 19b to the lean side.

As described above, the exhaust gas purifying performance can be further improved by calculating estimation values for the upstream and downstream catalyst units 19a and 19b and performing air-fuel ratio control on the basis of these estimation values so as to maintain the high purification ratio of the downstream catalyst unit 19b.

As described above, in the respective embodiments of the present invention, on the basis of the air-fuel ratio of exhaust gas flowing into an exhaust purifying catalyst unit, emission of a specific component discharged from the exhaust purifying catalyst unit (discharged from a specific region, which is the entirety or a portion of the exhaust purifying catalyst unit) (or a representative value indicating the state of discharged exhaust gas) is estimated; a target state for the estimated estimation value is set; and air-fuel ratio control is performed in such a manner that the estimation value reaches the target state. By virtue of this operation, the emission of the specific component discharged from the exhaust purifying catalyst unit or a specific region (specific block) of the catalyst unit in the case where the catalyst unit is divided (including the state of exhaust gas discharged from the exhaust purifying catalyst unit or the specific region, and the state of the catalyst unit represented by, for example, an oxygen storage amount of the entire catalyst unit or of a portion of the catalyst unit, from the furthest upstream position to the specific region of the catalyst unit) can be control to a desired condition, whereby the exhaust purifying performance can be improved.

The invention claimed is:

1. An air-fuel ratio control apparatus for an internal combustion engine, comprising:
   estimation means for estimating, on the basis of an exhaust air-fuel ratio of exhaust gas flowing into an exhaust purifying catalyst unit disposed in an exhaust passage of the engine, an estimation value which is an emission of at least one specific component contained in exhaust gas flowing out of the exhaust purifying catalyst unit or at least one representative value indicating the state of the exhaust gas flowing out of the exhaust purifying catalyst unit;
   target setting means for setting a target state regarding the estimating value estimated by the estimation means;
   air-fuel ratio control means for controlling the air-fuel ratio of the engine in such a manner that the estimation value estimated by the estimation means reaches the target state set by the target setting means; and
   ignition timing control means for controlling ignition timing of the engine, wherein
   the estimation value is an estimation value after a predetermined period of time which indicates a predicted value that the emission or representative value assumes after elapse of the predetermined period of time,
   the air-fuel ratio control means has a function of arbitrarily controlling the opening of a throttle value for adjusting an intake air amount of the engine; and
   when the air-fuel ratio is controlled by use of the air-fuel ratio control means in such a manner that the estimation value after a predetermined period of time estimated by the estimation means reaches the predetermined target state, control for opening the throttle valve is delayed by the air-fuel ratio control means, and the ignition timing is advanced by the ignition timing control means.

2. An air-fuel ratio control apparatus for an internal combustion engine according to claim 1, wherein the estimation means reflects a predicted value of a throttle opening in the estimation of the estimation value.

3. An air-fuel ratio control apparatus for an internal combustion engine according to claim 1, wherein the estimation means reflects a fuel behavior model in the estimation of the estimation value.

4. An air-fuel ratio control apparatus for an internal combustion engine, comprising:
   estimation means for estimating, on the basis of an exhaust air-fuel ratio of exhaust gas flowing into an exhaust purifying catalyst unit disposed in an exhaust passage of the engine, an estimation value which is an emission of at least one specific component contained in exhaust gas flowing out of the exhaust purifying catalyst unit or at least one representative value indicating the state of the exhaust gas flowing out of the exhaust purifying catalyst unit;
   target setting means for setting a target state regarding the estimating value estimated by the estimation means; and
   air-fuel ratio control means for controlling the air-fuel ratio of the engine in such a manner that the estimation value estimated by the estimation means reaches the target state set by the target setting means, wherein
   the estimation means estimates at least one estimation value relating to a component whose emission increases when the air-fuel ratio is on the rich side, and at least one estimation value relating to a component whose emission increases when the air-fuel ratio is on the lean side; and
   the target setting means sets a target state for each estimation value.

5. An air-fuel ratio control apparatus for an internal combustion engine according to claim 4, wherein the target state set by the target setting means is a state in which the estimation value falls within a predetermined range.

6. An air-fuel ratio control apparatus for an internal combustion engine according to claim 4, wherein the target setting means sets, as the target state, a state in which the estimation values becomes equal to each other.

7. An air-fuel ratio control apparatus for an internal combustion engine according to claim 4, wherein
   the estimation means estimates the estimation value for a specific region of a plurality of regions defined by dividing the exhaust purifying catalyst unit in the flow direction of exhaust gas;
   the target setting means sets a target state regarding the estimation value for the specific region; and
   the air-fuel ratio control means controls the air-fuel ratio in such a manner that the estimation value for the specific region reaches the target state set for the specific region.

8. An air-fuel ratio control apparatus for an internal combustion engine according to claim 7, wherein the estimation means sets the specific region on the upstream side of the furthest downstream region among the plurality of regions.

9. An air-fuel ratio control apparatus for an internal combustion engine according to claim 7, wherein the estimation means changes the specific region in accordance with an operating condition of the engine.

10. An air-fuel ratio control apparatus for an internal combustion engine according to claim 7, wherein the estimation means selects two regions as the specific region and estimates estimation values for these specific regions; the target setting means sets a target state regarding each of the estimation values for the specific regions; and the air-fuel ratio control means controls the air-fuel ratio in such a manner that the estimation values for the specific regions become the corresponding target states.

11. An air-fuel ratio control apparatus for an internal combustion engine according to claim 10, wherein the air-fuel ratio control means individually sets, for each specific region, a degree of influence on the air-fuel ratio control.

12. An air-fuel ratio control apparatus for an internal combustion engine according to claim 11, wherein the air-fuel ratio control means changes the degree of influence of each specific region in accordance with an operating condition of the engine.

13. An air-fuel ratio control apparatus for an internal combustion engine, comprising:
estimation means for estimating by using an estimation model, on the basis of an exhaust air-fuel ratio of exhaust gas flowing into an exhaust purifying catalyst unit disposed in an exhaust passage of the engine, an estimation value which is an emission of at least one specific component contained in exhaust gas flowing out of the exhaust purifying catalyst unit or at least one representative value indicating the state of the exhaust gas flowing out of the exhaust purifying catalyst unit;
target setting means for setting a target state regarding the estimating value estimated by the estimation means;
air-fuel ratio control means for controlling the air-fuel ratio of the engine in such a manner that the estimation value estimated by the estimation means reaches the target state set by the target setting means;
a downstream air-fuel ratio sensor for detecting the exhaust air-fuel ratio of the exhaust gas flowing out of the exhaust purifying catalyst unit; and
estimation model correction means for correcting the estimation model on the basis of the estimation value estimated by the estimation means and a result of detection by the downstream air-fuel ratio sensor.

14. An air-fuel ratio control apparatus for an internal combustion engine, comprising:
estimation means for estimating, on the basis of an exhaust air-fuel ratio of exhaust gas flowing into an exhaust purifying catalyst unit disposed in an exhaust passage of the engine, an estimation value which is an emission of at least one specific component contained in exhaust gas flowing out of the exhaust purifying catalyst unit or at least one representative value indicating the state of the exhaust gas flowing out of the exhaust purifying catalyst unit;
target setting means for setting a target state regarding the estimating value estimated by the estimation means;
air-fuel ratio control means for controlling the air-fuel ratio of the engine in such a manner that the estimation value estimated by the estimation means reaches the target state set by the target setting means;
a downstream air-fuel ratio sensor for detecting the exhaust air-fuel ratio of the exhaust gas flowing out of the exhaust purifying catalyst unit; and
sensor diagnosis means for diagnosing the downstream air-fuel ratio sensor on the basis of the estimation value estimated by the estimation means and a result of detection by the downstream air-fuel ratio sensor.

15. An air-fuel ratio control apparatus for an internal combustion engine, comprising:
estimation means for estimating, on the basis of an exhaust air-fuel ratio of exhaust gas flowing into an exhaust purifying catalyst unit disposed in an exhaust passage of the engine, an estimation value which is an emission of at least one specific component contained in exhaust gas flowing out of the exhaust purifying catalyst unit or at least one representative value indicating the state of the exhaust gas flowing out of the exhaust purifying catalyst unit;
target setting means for setting a target state regarding the estimating value estimated by the estimation means; and
air-fuel ratio control means for controlling the air-fuel ratio of the engine in such a manner that the estimation value estimated by the estimation means reaches the target state set by the target setting means, wherein:
an upstream exhaust purifying catalyst unit and a downstream exhaust purifying catalyst unit are provided in the exhaust passage as the exhaust purifying catalyst unit; and
the estimation means estimates the estimation value for both the upstream and downstream exhaust purifying catalyst units.

16. An air-fuel ratio control apparatus for an internal combustion engine according to claim 15, further comprising an intermediate air-fuel ratio sensor for detecting an exhaust air-fuel ratio of exhaust gas flowing out of the upstream exhaust purifying catalyst unit and flowing into the downstream exhaust purifying catalyst unit,
wherein the air-fuel ratio control means controls the exhaust air-fuel ratio of the exhaust gas flowing out of the upstream exhaust purifying catalyst unit and flowing into the downstream exhaust purifying catalyst unit on the basis of the estimation value regarding the upstream exhaust purifying catalyst unit and a result of detection by the intermediate air-fuel ratio sensor.

17. An air-fuel ratio control apparatus for an internal combustion engine according to claim 15, wherein:
the estimation value regarding the upstream exhaust purifying catalyst unit relates to an excess-deficient amount of oxygen in exhaust gas; and
the target setting means sets the target state regarding the estimation value in such a manner that a cumulative value of the excess-deficient amount of oxygen in the exhaust gas flowing into the downstream exhaust purifying catalyst unit becomes zero.

18. An air-fuel ratio control apparatus for an internal combustion engine in which an exhaust purifying catalyst unit is disposed in an exhaust passage, the catalyst unit including a space through which inflow gas passes, and a coating layer exposed to the space and carrying a substance for providing a catalytic function and a substance for providing an oxygen storage-release function, the air-fuel ratio control apparatus comprising:
estimation means for estimating, as estimation values, values corresponding to emissions of specific components contained in exhaust gas of the engine having passed through a portion of the exhaust purifying catalyst unit; and
air-fuel ratio control means for controlling the air-fuel ratio of the exhaust gas flowing into the exhaust purifying catalyst unit in such a manner that at least one of the estimation values estimated by the estimation means reaches a predetermined target state, wherein each estimation value is formed on the basis of an amount of the specific component diffused in the space through which inflow gas passes to the coating layer and an amount of the specific component consumed at the coating layer.

19. An air-fuel ratio control apparatus for an internal combustion engine in which an exhaust purifying catalyst unit is disposed in an exhaust passage, the catalyst unit including a space through which inflow gas passes, and a coating layer exposed to the space and carrying a substance for providing a catalytic function and a substance for providing an oxygen storage-release function, the air-fuel ratio control apparatus comprising:

estimation means for estimating, as estimation values, values corresponding to emissions of specific components contained in exhaust gas of the engine having passed through the entirety or a portion of the exhaust purifying catalyst unit; and air-fuel ratio control means for controlling the air-fuel ratio of the exhaust gas flowing into the exhaust purifying catalyst unit in such a manner that at least one of the estimation values estimated by the estimation means reaches a predetermined target state, wherein the specific component is at least one component selected from the group consisting of reduction components which are contained in the exhaust gas of the engine flowing into the exhaust purifying catalyst unit and having a reducing function, and storage components which are contained in the exhaust gas and capable of supplying oxygen to the reduction components; and the estimation means estimates the estimation value on the basis of an estimation model which is formed in consideration of the mass balance of the specific component.

20. An air-fuel ratio control apparatus for an internal combustion engine according to claim 19, wherein the specific component is oxygen.

21. An air-fuel ratio control apparatus for an internal combustion engine according to claim 19, wherein the specific component is oxygen and carbon monoxide.

22. An air-fuel ratio control apparatus for an internal combustion engine according to claim 19, wherein the estimation model of the estimation means is formed in such a manner that attention is paid to a specific region among a plurality of regions obtained by dividing the exhaust purifying catalyst unit in the flow direction of exhaust gas; and the estimation model is formed on the basis of an amount of the specific component flowing into the space of the specific region, an amount of the specific component flowing out of the space of the specific region, and an amount of the specific component diffused from the space of the specific region to the coating layer in the specific region.

23. An air-fuel ratio control apparatus for an internal combustion engine according to claim 22, wherein the model of the estimation means is formed on the basis of an amount of the specific component diffused from the space of the specific region to the coating layer in the specific region, and an amount of the specific component consumed at the coating layer.

* * * * *